(12) United States Patent
Dai et al.

(10) Patent No.: US 11,954,814 B1
(45) Date of Patent: Apr. 9, 2024

(54) COMPUTER GRAPHICS PRODUCTION CONTROL SYSTEM AND METHOD

(71) Applicant: Wombat Studio, Inc., Gilbert, AZ (US)

(72) Inventors: Tianxin Dai, Gilbert, AZ (US); Aric G. S. Bartle, Gilbert, AZ (US); Alexis R. Haraux, Seattle, WA (US)

(73) Assignee: Wombat Studio, Inc., San Jose, CA (US)

( * ) Notice: Subject to any disclaimer, the term of this patent is extended or adjusted under 35 U.S.C. 154(b) by 0 days.

(21) Appl. No.: 18/170,871

(22) Filed: Feb. 17, 2023

(51) Int. Cl.
*G06T 19/20* (2011.01)

(52) U.S. Cl.
CPC ...... *G06T 19/20* (2013.01); *G06T 2219/2016* (2013.01)

(58) Field of Classification Search
CPC .................. G06T 2219/2016; G06T 19/20
See application file for complete search history.

(56) References Cited

U.S. PATENT DOCUMENTS

| | | | |
|---|---|---|---|
| 2012/0218262 A1* | 8/2012 | Yomdin | G06T 13/40 345/473 |
| 2019/0035149 A1* | 1/2019 | Chen | G06V 40/166 |
| 2019/0206145 A1* | 7/2019 | Li | G06T 15/503 |
| 2022/0410000 A1* | 12/2022 | Ohashi | A61B 5/11 |

* cited by examiner

*Primary Examiner* — Matthew Salvucci
(74) *Attorney, Agent, or Firm* — Maier & Maier, PLLC

(57) ABSTRACT

A computer graphics production control system is configured to generate scenes (including three-dimensional, deformable characters ("3DD characters")) that can be manipulated to produce still images and/or animated videos. Such control systems may utilize 3DD characters that are controlled by a series of control points that are positioned and/or moved under the control of the artist. Body characteristics of 3DD characters are modeled as a series of inter-related points (e.g., skin triangles) that can be manipulated under the control of the model and the reference points (e.g., bones) of the body.

19 Claims, 45 Drawing Sheets
(45 of 45 Drawing Sheet(s) Filed in Color)

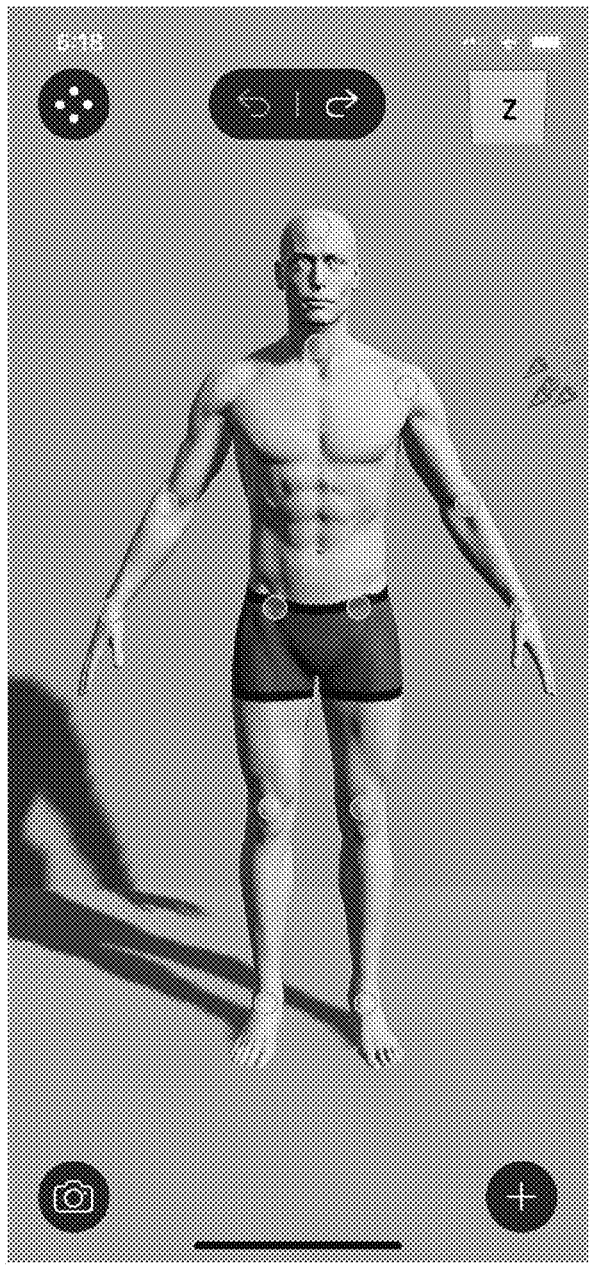
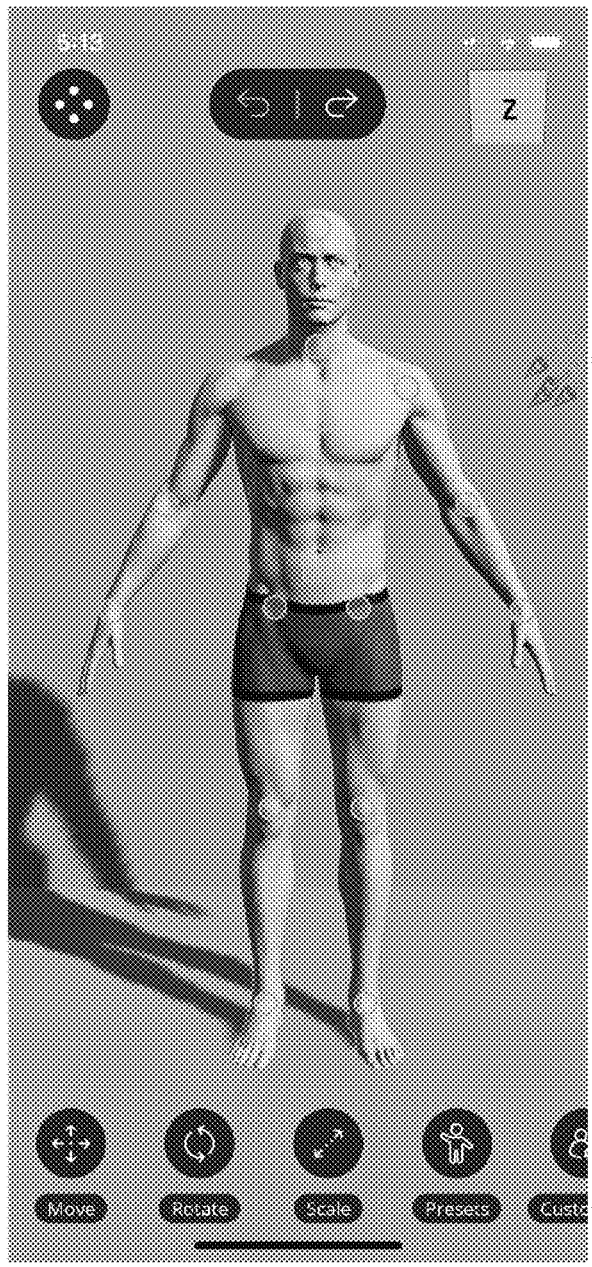
FIG. 1A
FIG. 1B

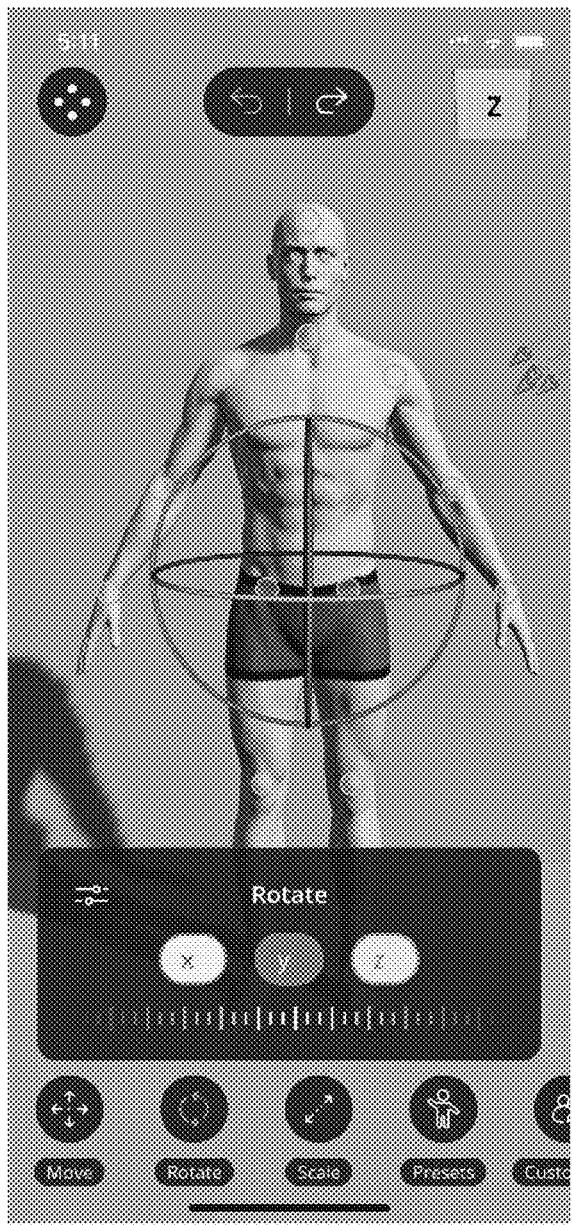
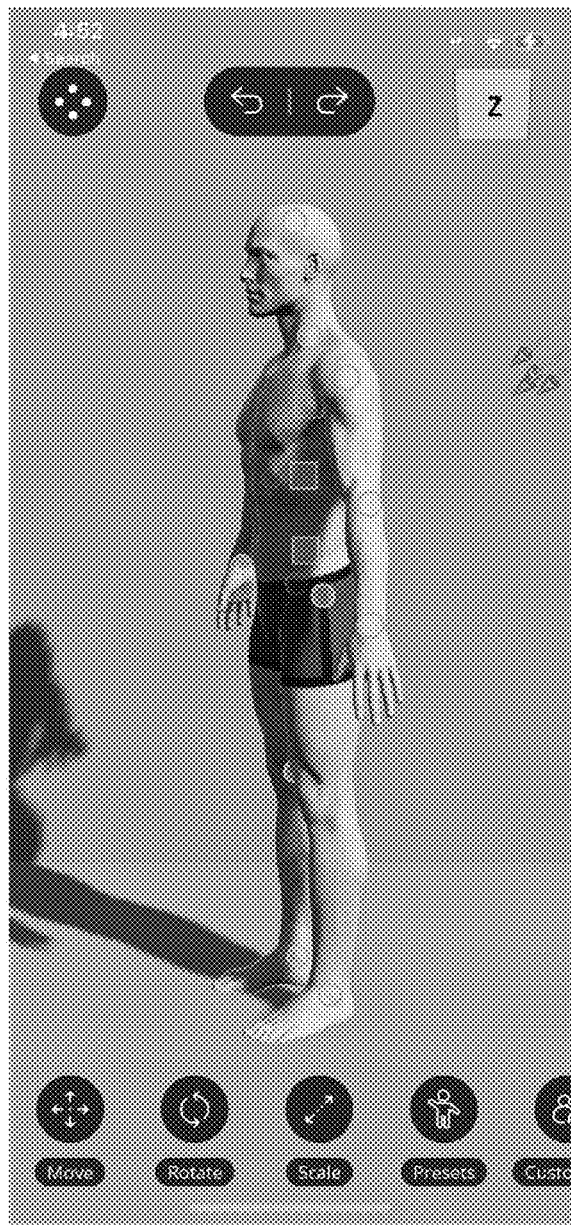
FIG. 1C
FIG. 1D

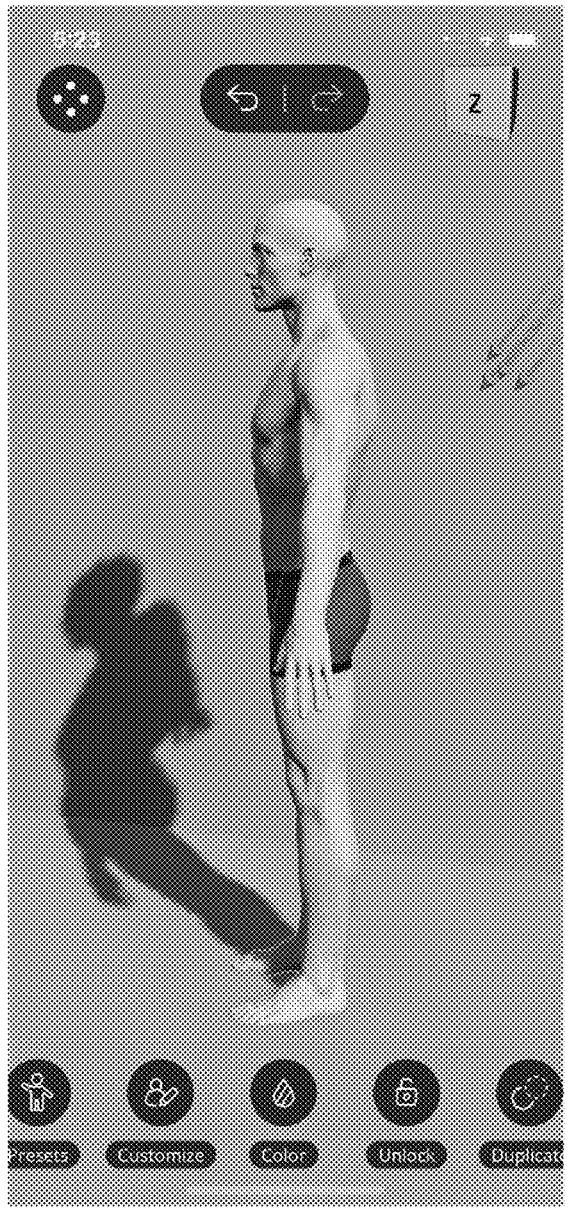
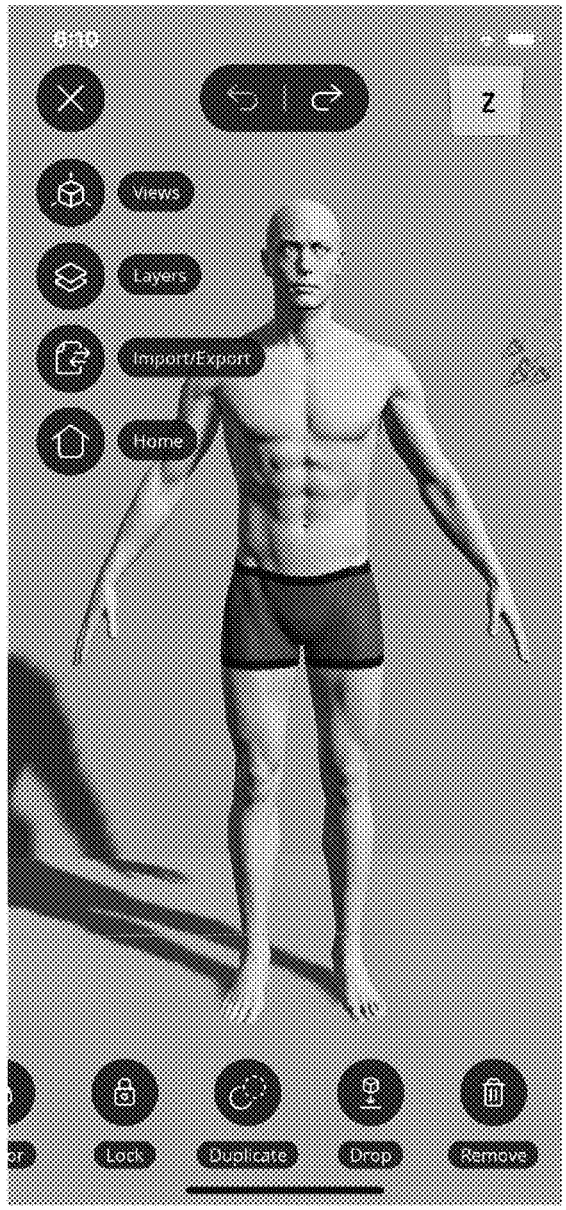
FIG. 1E
FIG. 1F

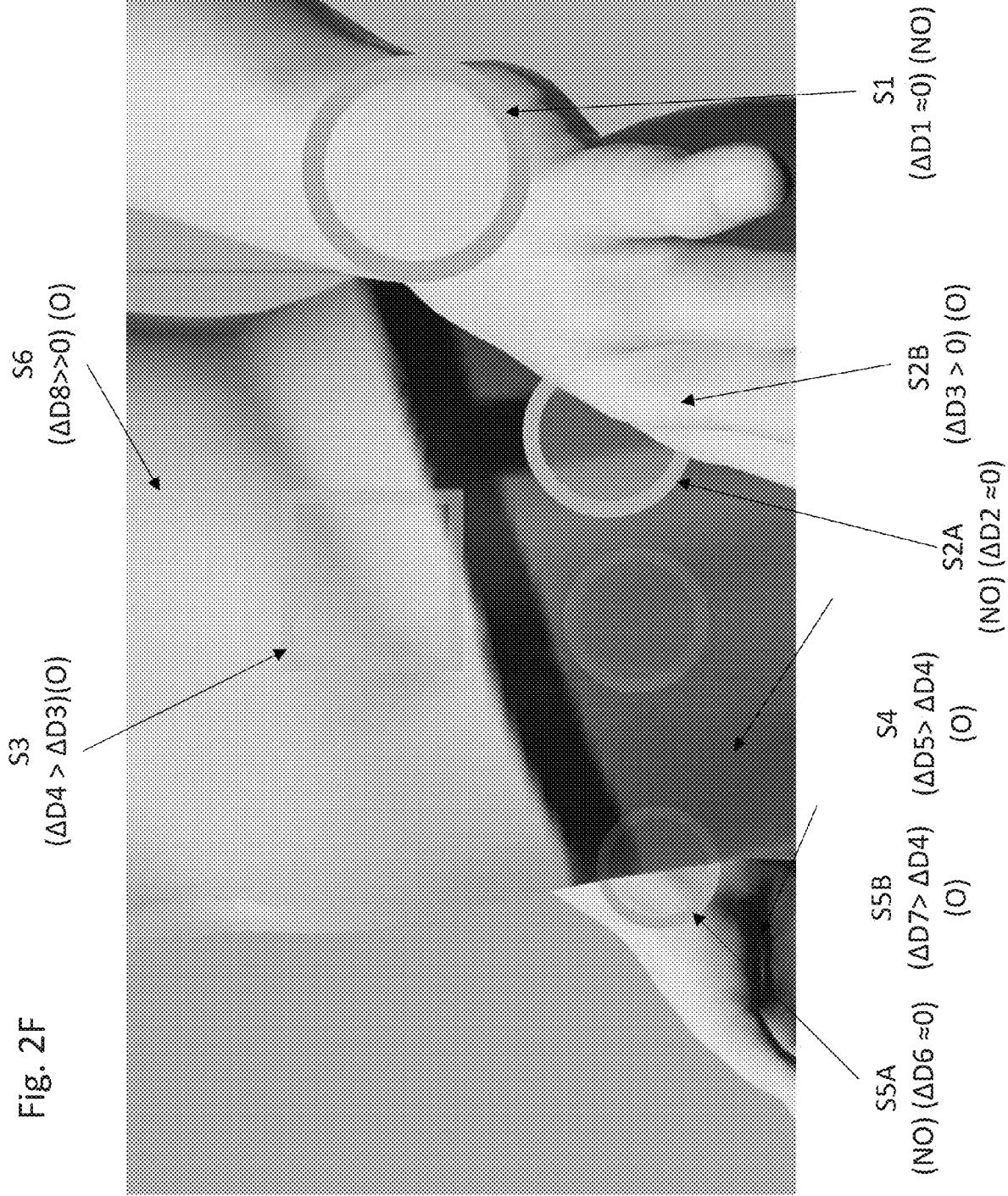

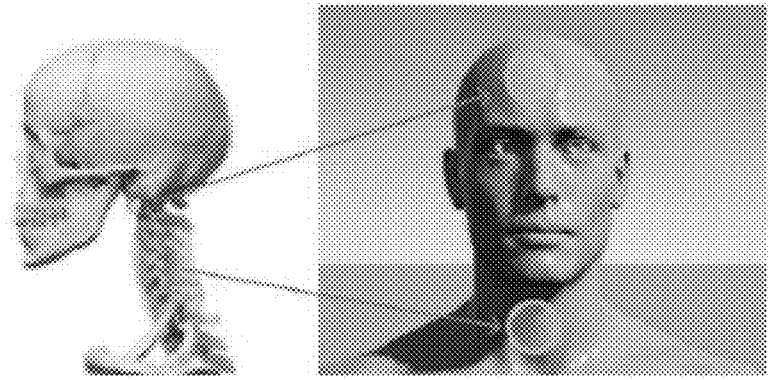
FIG. 3A        FIG. 3B
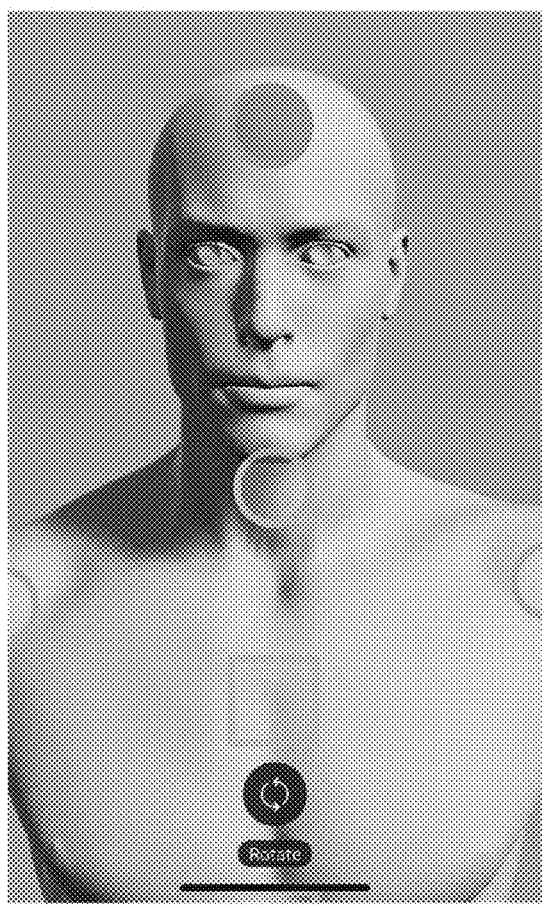
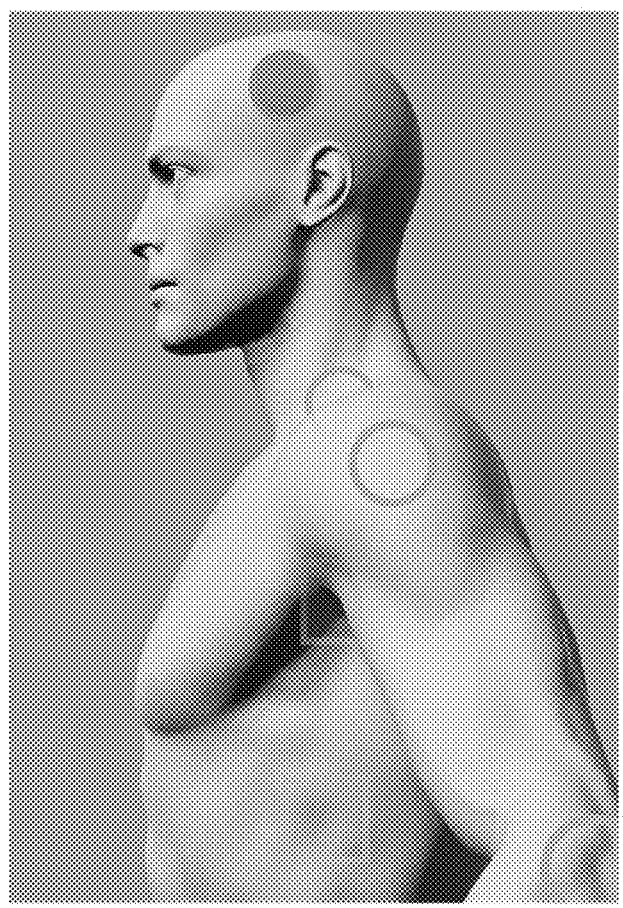
FIG. 3C        FIG. 3D

COMPUTER GRAPHICS PRODUCTION CONTROL SYSTEM AND METHOD

BACKGROUND OF THE INVENTION

Field of the Invention

The subject matter described in this application is directed to a computer graphics production control system and method, and in one embodiment to a computer graphics production control system and method that enables character control points and/or scenes to be manipulated with at least one of (1) multi-style control points with varying transparency, (2) multipoint head and neck controls, (3) a multiplicity of torso control points including a chest control point, a waist control point, and a pelvic control point, (4) camera rotation using locked objects, (5) an appendage posing control for displaying digit-by-digit control points, (6) percentage-based preset poses, and (7) a flip pose interface for exchanging a first pose of at least one of a first limb and a first appendage from a first side of the deformable character with a second pose of at least one of a second limb and a second appendage from a second side of the deformable character opposite the first side.

Discussion of the Background

Computer graphics production control systems allow artists to generate scenes (including computer-based, three-dimensional, deformable characters) that can be manipulated to produce still images and/or animated videos. Such control systems may utilize articulated computer-based, three-dimensional, deformable characters (referred to herein as "3DD characters") whose motion are controlled by a series of control points that are positioned and/or moved under the control of the artist. Body characteristics of 3DD characters are modeled as a series of inter-related points (e.g., skin triangles) that can be manipulated under the control of the model and the reference points (e.g., bones) of the body.

Within this application, the following terminology will be used:

"Characters" are generally 3DD characters and include, but are not limited to, human-like characters (e.g., a male model, a female model), although other body forms (e.g., real and imaginary creature forms) are possible.

"Deformable objects" include characters and other 3D objects with rigs/skeletons.

"Objects" generally include deformable and non-deformable objects (e.g., a wall, a table, a light) in the scene.

"Scene" includes all elements of the entire 3D scene including, but not limited to, all objects, lighting, shading, and camera setups. Some scene elements (e.g., shadows, special effects (such as smoke, explosions) and reflections) are not separate objects but instead are the result of an object interacting with other scene elements.

"Camera" is a viewing direction of the artist.

"Computer graphics environment" represents the environment in which an artist works to interact with a scene and includes, but is not limited to, the scene and the user interface that is superimposed over the scene (e.g., the menus and/or user interface controls that are overlaid over the scene that allow scene elements to be selected and manipulated).

In the computer graphics production control systems described herein, generally, dragging on a control point allows an artist to make bigger, global changes (as compared to rotations discussed below). When an artist drags on any control point, other body parts move along naturally according to a model of the 3DD character's interconnections (e.g., bones and joints). For example, when an artist drags the ankle joint control point upward, the whole leg moves along.

To achieve this, in the first step, the new orientations of the bones are calculated. Control points control the skeleton or bones of the character through means of the technique of inverse kinematics. That is, when a user drags a control point to a new location the control point creates a constraint between the location of the control point and the locations of several bones controlled by the control point. Satisfying this constraint may require moving/rotating the bone the control point is attached to as well as moving/rotating other bones of the skeleton.

Such a constraint is referred to as an inverse kinematics problem and may be solved by a variety of methods like the Jacobian inverse technique, FABRIK, or cyclic coordinate descent. Each control point in the character forms an inverse kinematics problem, but the difference between each problem is in the matter of specifying which bones of the skeleton should be affected by the problem and also what are the maximal extents at which the joint of a bone can rotate to. For instance, dragging on the ankle should cause the leg to move, but should not cause the knee to invert, or cause the arm of the character to move.

In the second step, how the skin of the character moves and deforms is calculated based on the new orientations of the bones. For a 3DD character, the skin of a character is modeled as a set of triangles connected together forming the surface of the skin. This digital skin is then coupled to nearby bones such that any movement from the bones causes the triangles of the digital skin to move. In some cases such as at a knee joint, there may be multiple bones that are coupled to the same set of triangles. This triangle bone coupling is something that is determined by an application developer when the character is created.

FIGS. 16A and 16B are screenshots showing how dragging an ankle control point causes movement of a 3DD character's whole leg (e.g., thigh, knee, shin and foot). The leg of FIGS. 16A and 16B is modeled as two interconnected bones (the thigh and the shin) represented by two line segments having endpoints and connection points labeled as P1, P2, and P3. P3 is the location of the ankle joint control point that a user can drag on. As shown in FIG. 16B, a user has dragged point P3 to a new location P3'. First, the new rotation angles of the bones are calculated using IK techniques mentioned above so that P3 would be closest to P3'.

The location of every vertex on the skin of the character is calculated based on the new locations of the bones—P1, P2', and P3'- and the coupling of the vertex to the bones. For example, a point Q on the thigh will have a 100% coupling to the thigh bone. So when the thigh bone lifts up, the new point Q' will shift upward with the thigh bone as well.

FIGS. 16C and 16D are screenshots showing how rotation of a knee control point causes movement of at least a 3DD character's knee and foot. As compared to dragging a control point, rotating a control point allows artists to make smaller, local changes. When an artist rotates a control point, only the orientations of those bones controlled by the control point and the children of those bones change by an amount proportional to the amount the artist rotates the control point, and no other bones are affected. The new locations of the triangles are calculated in the same way as described above, based on the new orientations of the rotated bones.

For example, in the rotational movement at point P2 in FIG. 16D (as compared to FIG. 16C), the knee rotates the shin without affecting the orientation of the thigh. The knee joint control point is first selected and then rotated using a loop rotational control of the user interface. The rotation causes the shin (represented as line segment P2P3') to rotate around P2, whereas the thigh (represented by line segment P1P2) stays the same as in FIG. 16C. A point Q on the shin is shifted to the new location Q' by applying the same rotation as that of the shin bone.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete understanding of this disclosure is provided by reference to the following detailed description when considered in connection with the accompanying drawings, wherein:

FIG. 1A is a screenshot of a front view of an exemplary 3DD character in a computer graphics environment;

FIG. 1B is a screenshot of a front view of the 3DD character of FIG. 1A in which a series of manipulation options are shown overlaying the bottom of the computer graphics environment;

FIG. 1C is a screenshot of the 3DD character of FIGS. 1A and 1B including rotation controls after having selected a "Rotate" option using the interface of FIG. 1B;

FIG. 1D is a screenshot of a substantially side view of the 3DD character of FIG. 1A after using the interface of FIG. 1C to rotate (by nearly 90 degrees in the y direction) the character at a fixed position within the scene;

FIG. 1E is a screenshot of a substantially side view of the 3DD character of FIG. 1D after dragging on a locked character to rotate the camera by nearly 15 degrees in the y direction;

FIG. 1F is a screenshot of a four dot menu icon representing a menu control interface such that a series of additional menu choices is displayed;

FIG. 2F is a screenshot of an enlarged portion of a rendered character having 6 different control points, each displayed with different control point styles;

FIG. 3A is a side view of a human skeleton accentuating (1) the human neck which is modeled as a set of bones approximating the entirety of the cervical spine and (2) the atlanto-occipital joint which connects the skull to the top of the neck;

FIG. 3B is a front view of a portion of a character showing (1) an atlanto-occipital joint control point for controlling movement about the atlanto-occipital joint and (2) a neck control point for controlling movement about the human neck;

FIGS. 3C and 3D are screenshots of a frontal view and a side view, respectively, of a 3DD character with an atlanto-occipital joint control point selected;

DETAILED DESCRIPTION

Figure 2A:
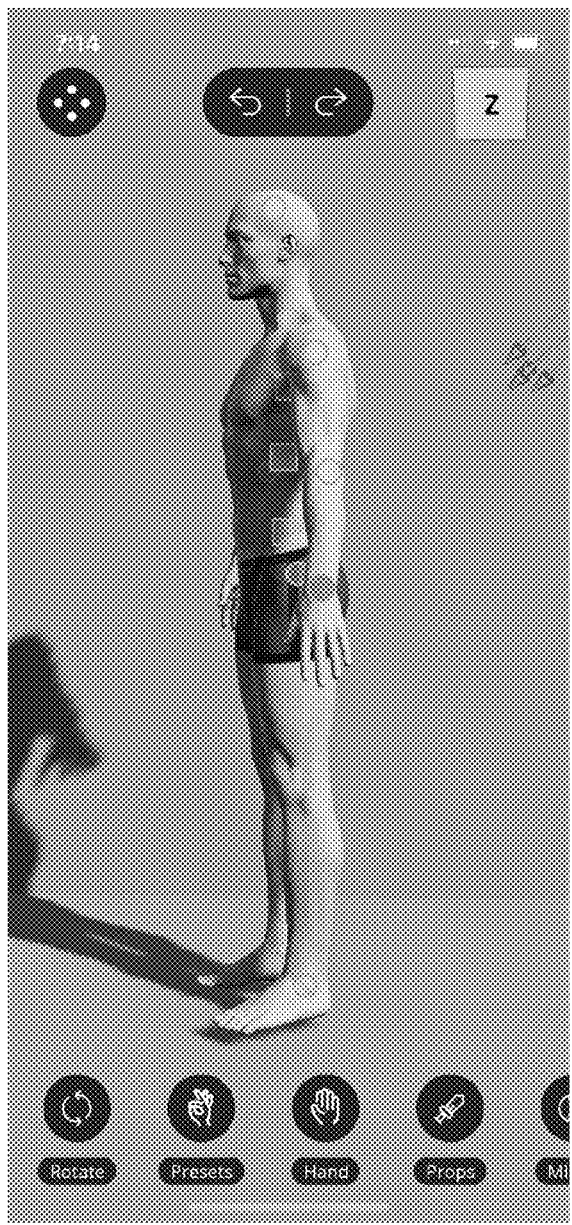
FIG. 2A is a screenshot of a substantially side view of the 3DD character of FIG. 1A with a wrist control point having been selected and illustrating control points being rendered in multiple control point styles based on a corresponding amount of occlusion.

In general, in the area of computer graphics production control systems, computer programs, including "apps" running on restricted environments (e.g., the iOS environment of Apple Inc. utilized on iPhones and iPads), are written to enable artists to generate scenes (sometimes containing characters) that can be manipulated to produce still images and/or animated videos. Such control systems may utilize articulated characters that are controlled by a series of control points that are positioned and/or moved under the control of the artist. In an alternate embodiment, any of the sprite control points described herein can be implemented instead as a highlighted body part (acting as a control point) that is manipulated in a manner consistent with the manipulation of sprite control points described herein. For example, the head control point can be implemented as a whole head that is highlighted, and the waist control point can be implemented as a highlighted band around the waist. In yet another embodiment, control points can be implemented as 3D objects (e.g., spheres) that are placed on top of rendered characters.

The body characteristics of a 3DD character are modeled as a series of inter-related points that can be manipulated under the control of the model and the reference points of the body. The scenes (including posed characters) can be saved as one or more still images, animated videos or 3D models.

In an embodiment where a series of images are created as part of an animation, the motion of the generated characters can be controlled by the motion of the control points over time. Additional features (e.g., lighting, body morphs, field of view, time of day) can be controlled with respect to the still images and animations that are produced. For example, the lighting direction, intensity, diffusion, and lighting shapes can be controlled for each applied light source, and the number of light sources can be selected as well (e.g., one or more). The 3DD characters can be morphed to various body types (e.g., muscular, fat and skinny body types). The field of view can be adjusted to change the type of camera lens used to view the scene. The time of day can be set to any time during a 24-hour period to change the sky to that at dawn, noon, evening, sunset, midnight, etc.

By timing changes to the generated scenes (including any aspect or portion of the generated scenes), artists can generate animated movies depicting changes in the generated scenes. Such movies can be in the form of commercials, full length motion pictures, and "shorts." Such generated scenes may include one or more characters in the scene, and, when they do, the number of characters may change over the course of the movie.

In one embodiment, an "app" is utilized that has been built (e.g., written and compiled or written and interpreted) for the iOS environment, although other operating systems (e.g., Apple MacOS, Microsoft Windows, and Linux) can similarly be used to build an application for those environments. (As used herein, "application" will refer to the executed code, whether it is an "app" or another executable program, regardless of the language that it was developed in and whether it is compiled or interpreted at run-time.) Scene components as used herein can include, but are not limited to, objects, lighting setup, preset poses, environment settings (such as tone mapping, rendering style), and character morphing. In such an embodiment, the artist can utilize one or a combination of different user input devices (e.g., a touchscreen, a mouse, a tablet, and a keyboard) to create characters, scenes, scene components, and animations and to manipulate previously created characters, scenes, scene components, and animations, either from an existing template or from an artist's previous work. Such characters, scenes, scene components, and animations, in the form of data files, may be stored on the artist's local computer, stored on a remote storage device (e.g., a cloud-based storage and retrieval system), or a combination of both. In some embodiments, the characters, scenes, scene components, and animations may need to be downloaded to an artist's local device before being manipulated, although the characters, scenes, scene components, and/or animations can be re-stored on the remote storage device after manipulation (e.g., to reduce local storage needs).

The application is run in a computer environment including a processor (e.g., a processor by Apple, Intel, or ARM) that runs on the desktop computer, tablet or phone (any of which is generally referred to as a "computer") that provides the interface to the user. As would be appreciated by those of skill in the art, the application may control the user interface only (e.g., by off loading the manipulation and rendering functions to a remote computer that is in communication with the app computer) or may locally control the user interface as well as the manipulation and rendering. The computer may be either a single-core computer (with one or more threads) or may be a multi-core computer (each with one or more threads). The application may be written in a compiled language, an interpreted language, or any combination of at least one of each of a compiled language and an interpreted language. For example, an application may be written using any one or a combination of C/C++/C #, Python, Objective-C, Java, Rust, Kotlin, and Swift.

A series of manipulations and effects is described hereinafter to illustrate a number of features that can be utilized to manipulate at least one of a character and the environment surrounding the character. As shown in the screenshot of FIG. 1A, a 3DD character is depicted in a computer graphics environment including (1) a floor on which the 3DD character is standing and (2) a wall in front of which the 3DD character is standing. The arrows on the right-hand side of the character indicate the direction of the lighting effect of the environment. The lighting effect causes the 3DD character to cast a shadow of the character's body behind the character and to the left of the character from the viewer's perspective (but to the character's right hand side from the character's perspective). As used herein, "right" and "left" will be used with respect to the viewer's perspective. Other options may be used to manipulate the scene or the environment itself and may include an "add" option (e.g., adding additional 3D characters, props and lights to the environment). The interface may additionally include a "preview" control (e.g., in the form of a camera icon) that allows a user to view the 3D scene in a manner that hides unnecessary user control and disallows edits so that review functions (e.g., rotating, zooming and panning of the whole scene) can be more easily performed.

The character further is depicted with a series of control points (illustrated as partially transparent circles and squares with solid-lines at the edges of the circles or squares). The color of the transparent and solid portions may be altered to aid in the recognition of the control points if the colors are too close to the color of the character. Similarly, the amount of transparency of the control points may be changed to alter their visual representations. Although other embodiments are described later, the illustrated control points are implemented as a series of two-dimensional sprites that are overlaid over the body of the 3DD object. The transparent and solid portions of the illustrated control points can be implemented using RGBa color techniques where the "a" factor is an amount of transparency. As such, portions of the control point may have the same RGB values but are different colors because of different amounts of transparency.

Figure 13A:
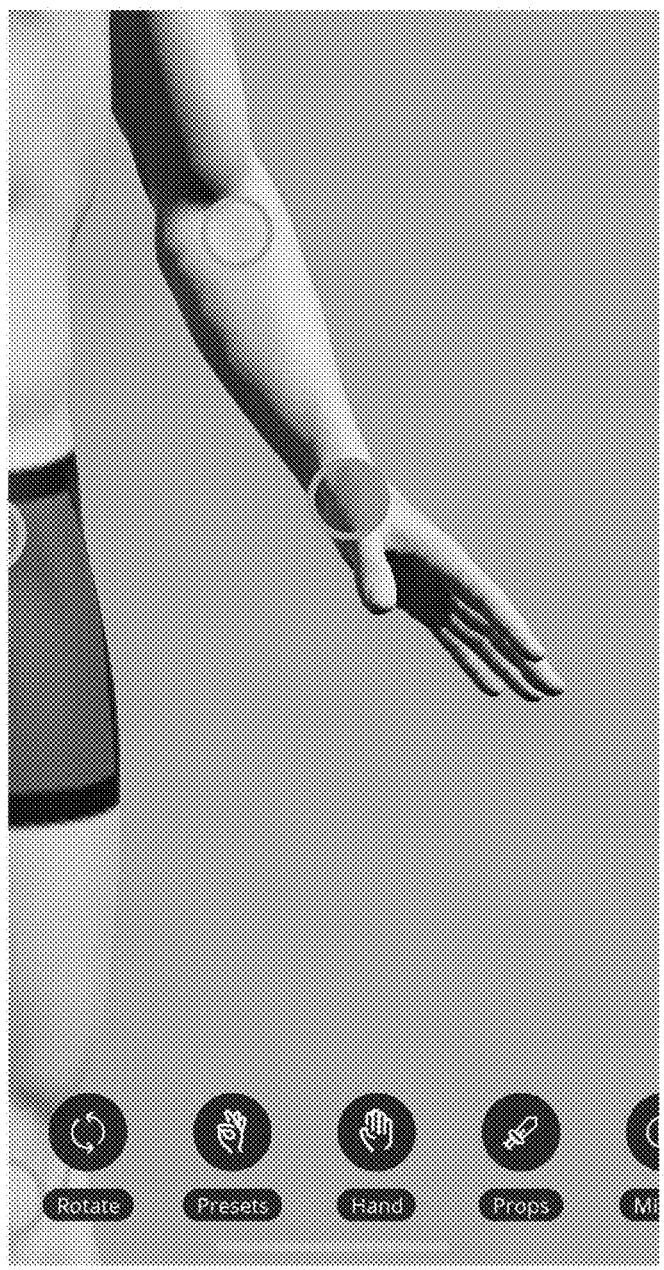
FIG. 13A is a screenshot of sub-controls presented to an artist when a wrist control point is selected by an artist.
Figure 15:
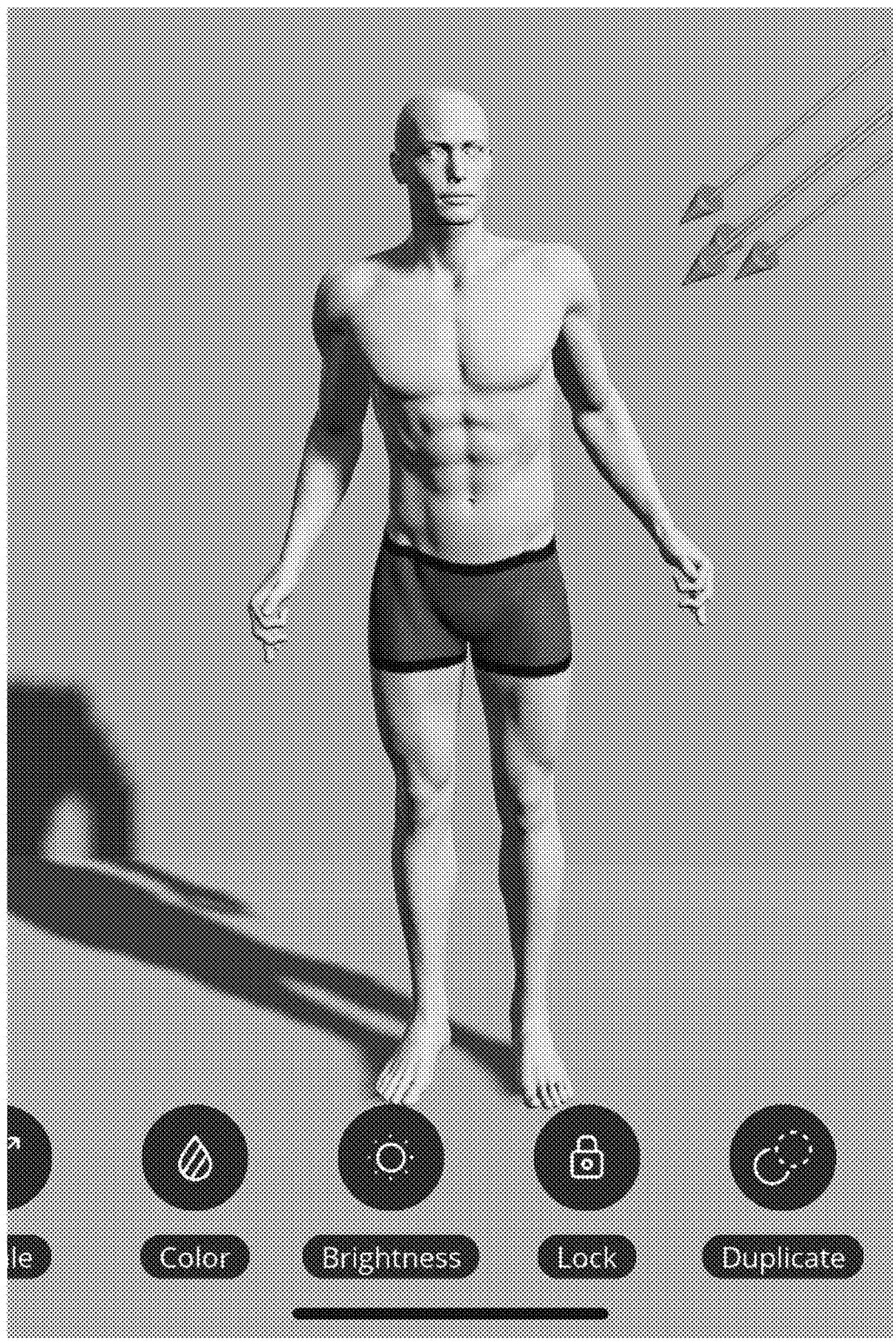
FIG. 15 is a screenshot showing a series of lighting menu options (e.g., color and brightness) that are presented to a user when a light source is selected by the user.
Figure 16A:
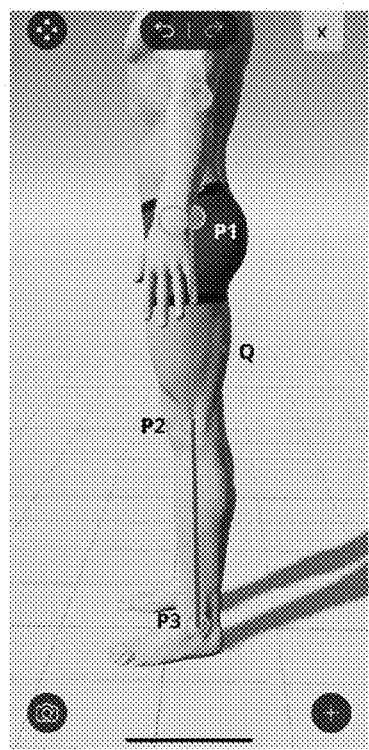
FIGS. 16A and 16B are screenshots showing how movement of an ankle control point causes movement of a 3DD character's thigh, shin, knee and foot.
Figure 16B:
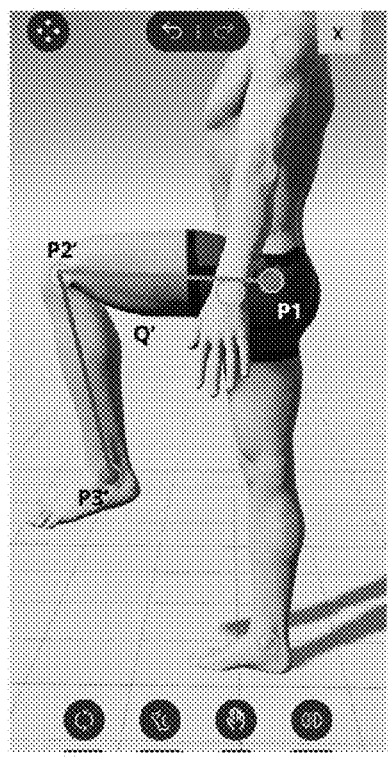
Figure 16C:
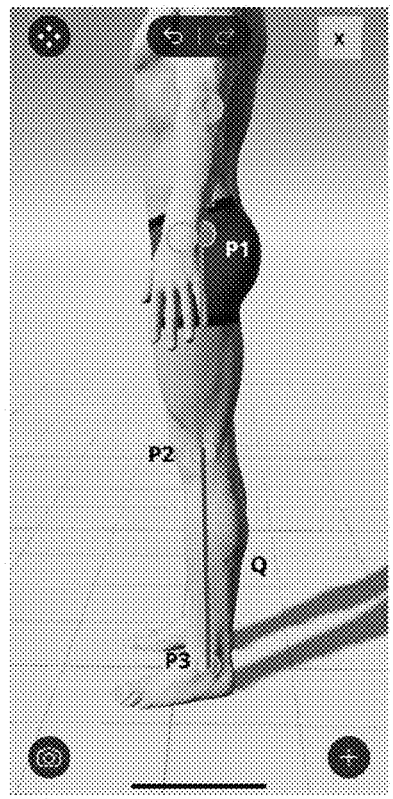
FIGS. 16C and 16D are screenshots showing how rotation of a knee control point causes movement of at least a 3DD character's knee, shin and foot.
Figure 16D:
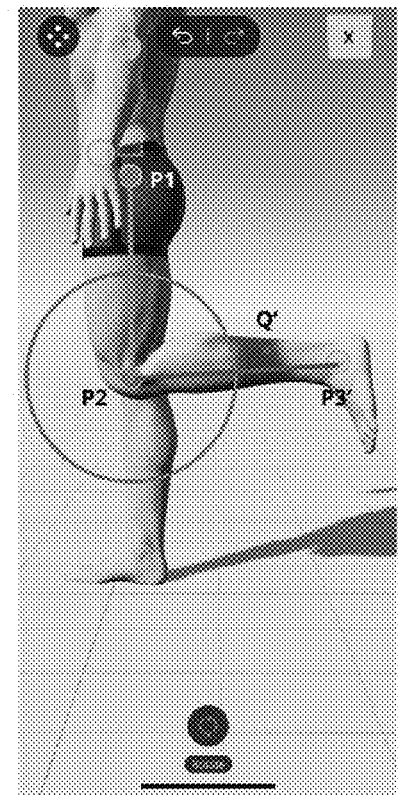

FIG. 1B is a screenshot of a front view of the 3DD character of FIG. 1A in which a series of manipulation options are shown overlaying the bottom of the computer graphics environment. For example, the manipulation options may be depicted as icons above or below text describing the function of the icons. As shown in FIG. 1B, exemplary functions to operate on a character include Move, Rotate, Scale, Color, Lock/Unlock, Duplicate, Drop (to the ground) and Remove. Additional options to manipulate the character may include Presets (for setting a character's pose) and Customize (for customizing physical aspects of the character (e.g., skinny, fat, muscular), external character additions (e.g., eyebrow shapes, cosmetics, hair style, clothing), and switching between characters but keeping similar poses). Depending on what the user selects in a scene, different manipulation options are presented to the user. If a user selects a 3DD character in the scene, then the manipulation options (e.g., shown in FIG. 1B) are presented to the user. If a user selects a control point (for example, the wrist control point), then a different set of wrist-specific manipulation options are presented to the user (e.g., as shown in FIG. 13A). If a user selects a light, then another set of manipulation options is presented to the user (e.g., as shown in FIG. 15).

At the top of the user interface, additional controls are provided that allow additional functions to be performed in the environment. In the upper left hand corner, a four dot menu icon represents a menu control interface such that a series of additional menu choices is displayed, as shown in FIG. 1F. Having selected the menu icon, the artist is able to close the menu interface (using the "X" icon), process views, process layers, import/export (a) 2D images and (b) 3D models, scenes, scene components, and animations, and return to a home interface (e.g., (a) to review/choose other scenes, scene components, 3D models, and animations, (b) access account operations, (c) browse and download scenes other users uploaded to the community, and/or (d) browse tutorials of the app). Additional illustrated control interfaces are undo/redo in the center and a perspective cube illustrating what direction the artist is looking at, aka the "camera". By selecting the perspective cube, the camera can be rotated in the direction in which the perspective cube is rotated.

FIG. 1C is a screenshot of the 3DD character of FIGS. 1A and 1B including rotation controls after an artist has selected a "Rotate" option using the interface of FIG. 1B. The Rotate option allows the selected element (e.g., character, control points or objects in general (e.g., wall or a light)) to be rotated in any of the x, y, and z directions. Having selected element to be rotated, the element can be rotated in the environment, either by (1) selecting the oval corresponding to the direction to rotate and then using the slider bar under the ovals to control the rotation or (2) by selecting the corresponding loop rotational control encircling the selected element. For example, by selecting the character and then selecting the Rotate option, the character is able to be rotated in place at its current location.

FIG. 1D is a screenshot of a substantially side view of the 3DD character of FIG. 1A after using the interface of FIG. 1C to rotate (by nearly 90 degrees in the y direction) the character at a fixed position within the environment. As can be seen from the character's position relative to the wall and from the character's shadow, only the character has rotated, not the camera.

In a situation where an artist wants to view the scene (and the objects in it) from different angles, as opposed to moving or rotating objects, an artist can do so by selecting an unused portion of the scene and then dragging this unused portion thereby reorienting the camera. However, in situations where there is no visible unused portion of the scene (e.g., in FIG. 1D where there is a floor and wall occupying the whole visible scene), rather than rotating the camera, the computer graphics production control system would understand that the artist was trying to move the object that the artist was touching at the beginning of the drag operation. To enable the artist to quickly reorient the camera, the artist may select the Lock option to lock a particular object in the scene (e.g., the character or a wall), and then drag on the locked object to manipulate the camera (rather than just the locked object). For example, having locked the character of FIG. 1A (such that it is now outlined in a different color), the camera can be rotated by dragging on the character. In one embodiment, when an object is locked, no change is shown on the object. In an alternate embodiment, when an object is locked, the system provides visual feedback to the user within the computer graphics environment. For example, locked objects may be outlined in a particular color or have its appearance changed in some other form (e.g., such as having its color changed). In embodiments where colors of locked objects are changed, the color may be changed by changing an amount of transparency of the object by changing the "a" value in the RGBa colors of the object. Instead or in addition, an additional sprite (e.g., a lock icon) may be superimposed over the locked object to indicate that it is locked.

FIG. 1E is a screenshot of a substantially side view of the 3DD character of FIG. 1D after dragging on a locked character to rotate the camera by nearly 15 degrees in the y direction. Because the camera is rotated (as opposed to rotating the character), the resultant illustrated image shows the entirety of the shadow, and the angle of the wall behind the character is no longer at 90 degrees to the camera. However, if the artist drags on an unlocked object (e.g., an unlocked wall or floor), the object will continue to be moved according to the dragging motion of the artist. The artist can return to the normal processing of the object by unlocking the object (using the illustrated Unlock function after having locked the object).

As shown in FIGS. 1A and 1B, a number of semi-transparent control points are depicted as two-dimensional sprites that allow control of various portions of a character (e.g., by dragging the control points or selecting a control point-specific menu option after selecting the control point). As a character is rotated, the control points that are not directly visible from the current perspective, for example, the right hip control point and the right elbow control point, are faded out from the visible rendering of the character (as in FIG. 1D) to avoid interface clutter (without being completely removed from view). In an alternate embodiment, the occluded control points are removed entirely. Such an occlusion processing is performed in real-time based on the current orientation of the selected character.

Figure 2B:
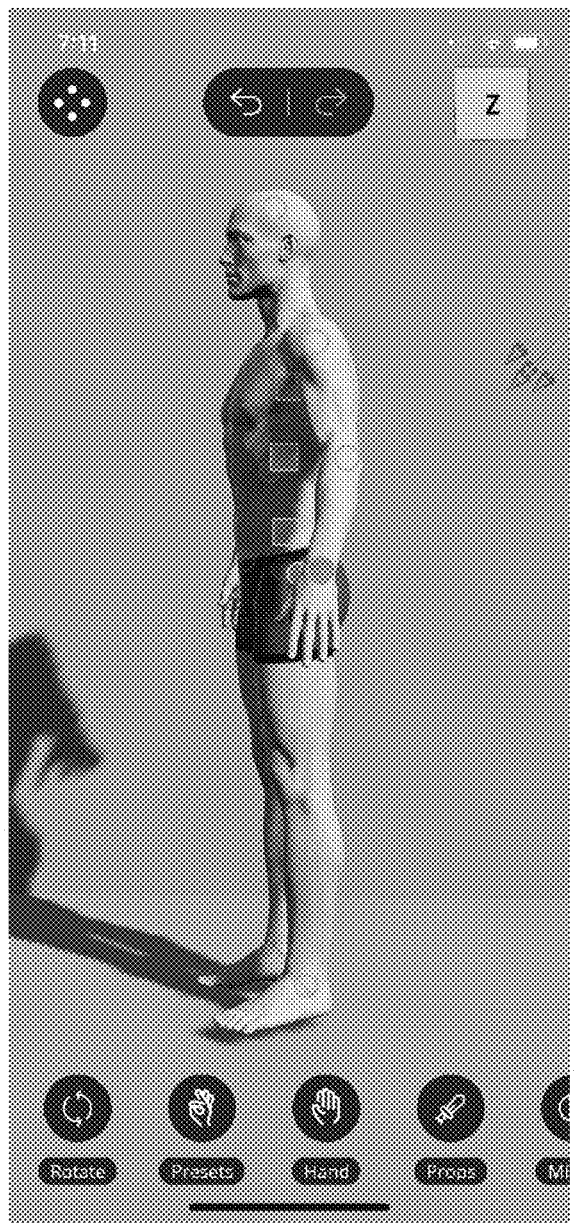
FIG. 2B is a screenshot of a substantially side view of the 3DD character of FIG. 2A with a wrist control point having moved the left arm of the character so that it more fully occludes the left hip control point.

For example, FIG. 2A is a screenshot of a substantially side view of the 3DD character of FIG. 1A with a wrist control point having been selected. In the screenshot of FIG. 2A, the left hip control point is mostly not obscured such that the majority of the left hip control point can be seen. However, FIG. 2B is a screenshot of a substantially side view of the 3DD character of FIG. 2A after the selected wrist control point has been moved upward. The movement of the left wrist control point (according to the model of the character) causes the left elbow to move backwards as the left hand moves upward. As a result, the left hand more completely occludes the (circular) left hip control point which is faded out to accentuate the left wrist control point as opposed to the left hip control point.

Figure 2C:
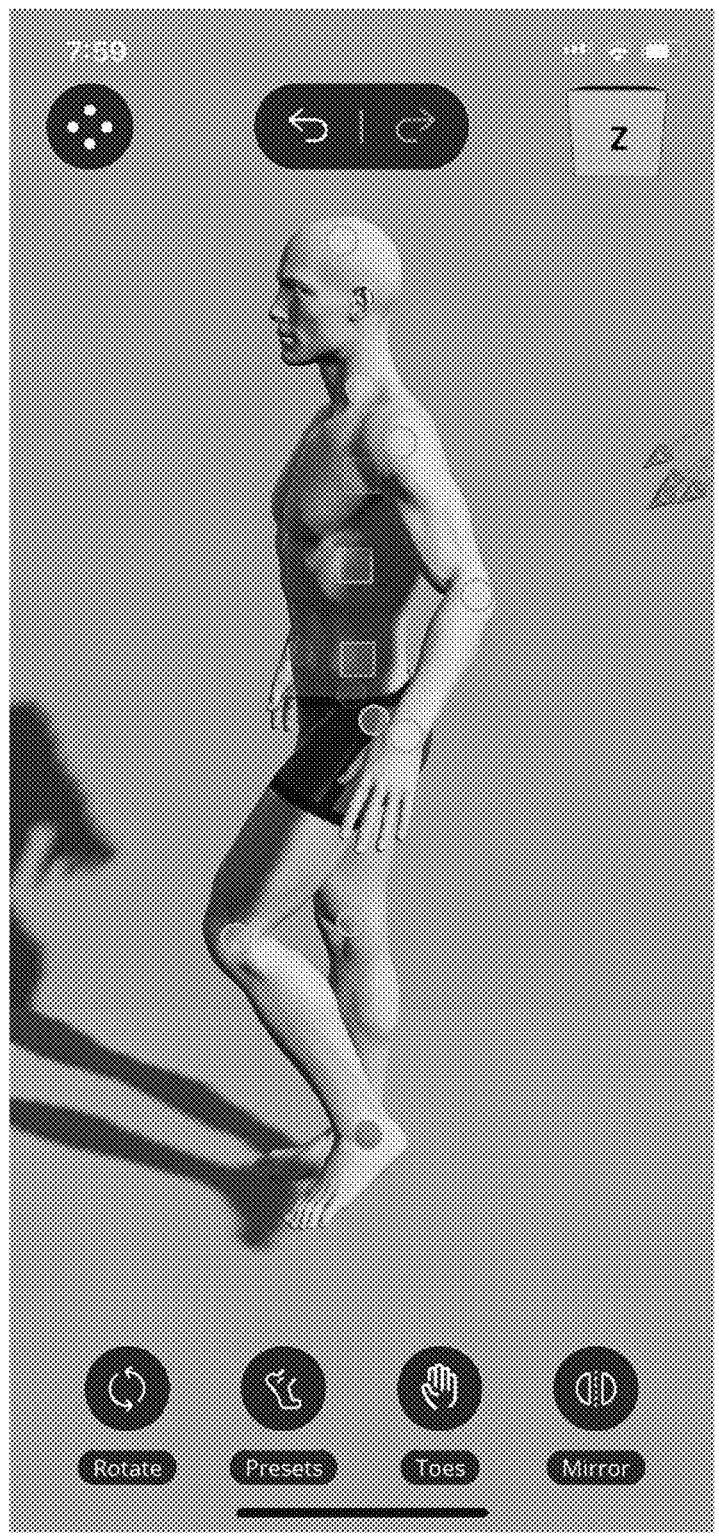
FIG. 2C is a screenshot of a substantially side view of the 3DD character of FIG. 2A with a left ankle control point having moved the left leg of the character so that it more fully occludes the right ankle control point but exposes the right knee control point.

By contrast, some movements will more greatly expose previously occluded control points. FIG. 2C is a screenshot of a substantially side view of the 3DD character of FIG. 2A with a left ankle control point having moved the left leg of the character so that it more fully occludes the right ankle control point but exposes the right knee control point. Similarly, the changes in position between FIGS. 2A and 2B also move a portion of the left bicep such that more of the (square) chest control point becomes less occluded while at the same time causing more of the neck control point to become occluded. Thus, the movement of the body parts of the character are able to expose and occlude control points in real-time.

To achieve this real-time display and occlusion, in one embodiment, a camera aligned sprite is drawn at each control point location. In one embodiment (e.g., as shown in FIG. 1A), on the spine this sprite will be that of a square shape, but everywhere else that sprite will have the shape of a circle to aid in an artist being able to differentiate between control points. In another embodiment (not shown), the sprites all have the same shape.

The transparency and hence occlusion of the sprite is calculated on a per pixel basis by means of calculating a pixel transparency factor. A pixel transparency factor can be calculated in a number of ways, potentially using a number of sub-factors (e.g., two). In a first embodiment, a pixel transparency factor is calculated based on a distance from the camera to the particular pixel of the sprite. In a second embodiment, the pixel transparency factor is calculated based on a distance from the camera to the first point of intersection on the character along the ray from the camera to the given pixel of the sprite. In a third embodiment, the pixel transparency factor is calculated based on a function of both the distances in the prior two embodiments (e.g., as a "delta distance value" calculated as the absolute value of the difference of these two distances). In general, this technique causes (1) portions of non-occluded control points to be displayed in a first control point style (e.g., using at least one RGBa color representative of non-occluded control points) and (2) portions of occluded control points to be displayed in a second control point style (e.g., using at least one RGBa color representative of occluded control points), although other sub-factors could be used as well. A single control point, based on what occlusions there are in the scene, may be displayed using both the first and second control point styles as is described in greater detail below.

Figure 2D:
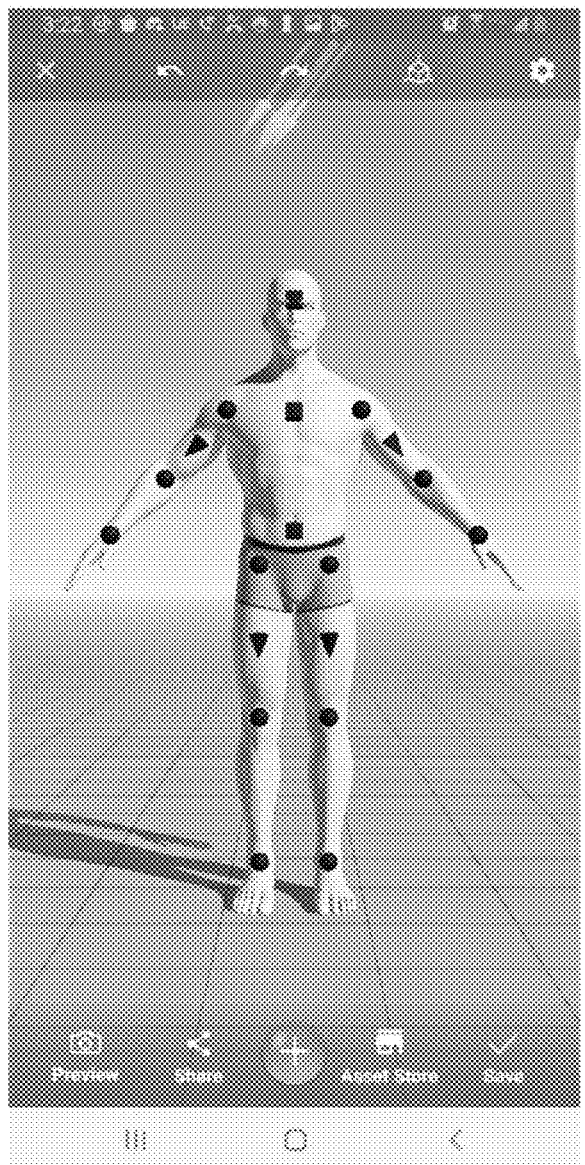
FIGS. 2D and 2E are screenshots of a front view and a side view, respectively, of a known system in which control points are not subjected to being displayed in different control point styles.
Figure 2E:
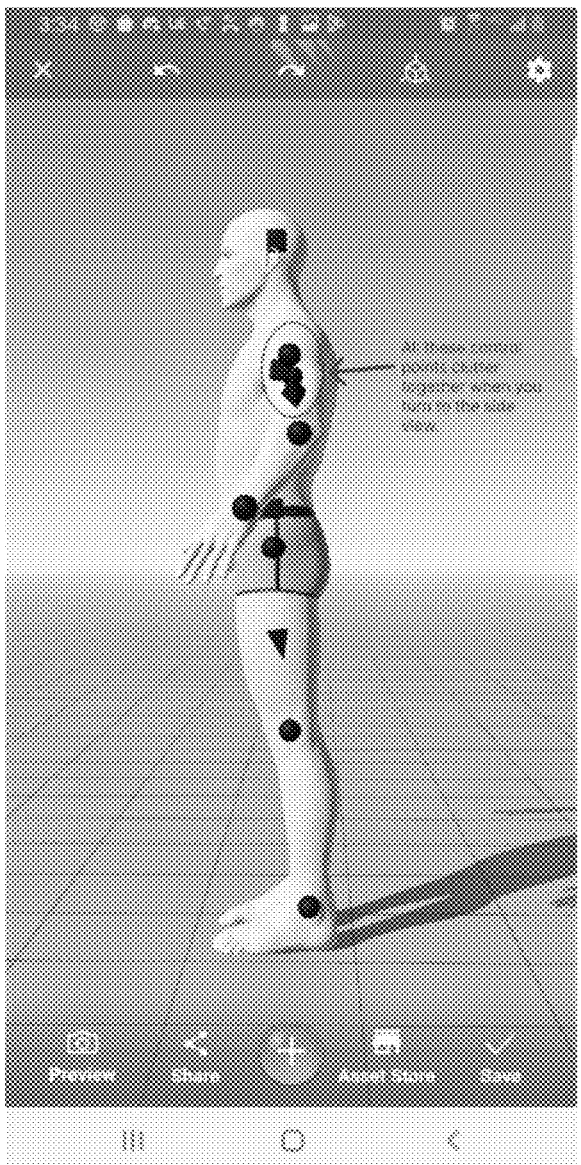

By comparison, systems which do not cause control points to be faded out create confusion with the artist as to which control point is able to be manipulated on the currently viewed side of the character. For example, a character with a set of control points in a known system is shown in FIG. 2D. In that known system, when the character is rotated 90 degrees as shown in FIG. 2E, a number of the control points in the upper body continue to be shown, even if they cannot be seen from the current perspective. This creates a confusion of points that make it less clear which control point corresponds to which area (e.g., chest vs. right shoulder vs. left shoulder vs. right bicep vs. left bicep).

The screenshot of FIG. 2F illustrates a set of multi-style control points applied to six different control points, each with a different control point style (using varying transparency). For each pixel of the control point sprite, the "delta distance value" is calculated on a pixel-by-pixel basis so that the absolute value of the difference of two distances is computed to form the pixel transparency factor. The first distance is the distance from the camera to the pixel of the control point sprite. The second distance is the distance from the camera to the first point of intersection on the character along the ray from the camera to the given pixel of the control point sprite, and the absolute value is calculated therebetween. The first style (S1) is the style of the character's left wrist control point. It is a non-occluded (NO) style (because for every pixel of the control point sprite, the distance between the camera and the pixel is the same as or essentially the same as the distance between the camera and where a ray from the camera to the pixel first intersects the body). As a result, in the illustrated embodiment, its delta distance value ($\Delta D1$) is essentially zero.

The control point on the character's left hip is displayed using two styles: S2A and S2B. Style S2A is displayed based on the fact that the corresponding portion is not occluded (NO) by any other object in the scene from the perspective of the camera. Like with S1, its delta distance value ($\Delta D2$) is essentially zero, and its style S2A is illustrated as the same as S1. However, in an alternate embodiment, even non-occluded control points can be displayed using different styles (e.g., based on a distance from the camera rather than the delta distance value). The second style S2B of the left hip control point (that differs from the illustrated first style S2A) is applied to the occluded portion of the left hip control point. Because that portion is occluded (designated by (O)) by the character's left hand, the distance between the camera and a pixel in that portion is different from the distance between the camera and where a ray from the camera to that pixel first intersects the body. The distance therebetween (i.e. the delta distance value ($\Delta D3$)) is essentially a distance corresponding to the thickness of the character's left hand and a distance between the character's left hand and the left hip control point on the character's left hip. Its exemplary applied style (i.e., its amount of fade/transparency) is illustrated as being based on its delta distance value $\Delta D3 > 0$.

The style of the third illustrated control point (i.e., the waist control point) is also a style indicating that the waist control point is a style of an occluded (O) control point, and its style is further controlled by its delta distance value $\Delta D4$ which is illustrated being larger than $\Delta D3$. As $\Delta D4$ is larger than $\Delta D3$, the style S3 is more faded than the style S2B (i.e., is more transparent). The style of the fourth illustrated control point (i.e., the right hip control point) is also a style indicating that the right hip control point is a style of an occluded (O) control point, and its style is further controlled by its corresponding delta distance value ($\Delta D5$). As $\Delta D5$ is illustrated as larger than $\Delta D4$, the style S4 is more faded than the style S3.

The control point on the character's right wrist is displayed using two styles: S5A and S5B. Style S5A is displayed based on the fact that the corresponding portion is not occluded (NO) by any other object in the scene from the perspective of the camera. Like with S1, its delta distance value ($\Delta D6$) is essentially zero, and its style S5A is illustrated as the same as S1. However, in an alternate embodiment where even non-occluded control points can be displayed using different styles (e.g., based on a distance from the camera), the styles S1, S2A, and S5A would all be different. The second style S5B of the right wrist control point (that differs from the illustrated first style S5A) is applied to the occluded portion (O) of the right wrist control point. Its applied style is illustrated as being based on its delta distance value ($\Delta D7$) which is illustrated as being larger than $\Delta D4$.

The farthest illustrated control point (for the right elbow assuming that the right elbow is farther away than the right wrist) has the last illustrated style: S6. It is an occluded style and has the greatest delta distance value ($\Delta D8$) that is substantially greater than zero and greater than any of the other illustrated delta distance values. Thus, it is illustrated as the most faded control point.

Other methods of calculating the transparency factor could be used, such as using a constant transparency factor across all pixels of the sprite, or calculating the factor based upon the number of times a ray from the camera to a pixel of the sprite intersects with the character the sprite is associated with.

Other styles can be applied to the control points other than just amounts of fade. For example, instead of changing the "a" value in the RGBa colors used for the control point, the RGB values could be changed as well with colors across the spectrum indicating a distance (potentially along with a changing "a" value). For example, close control points can be made red, medium distance control points can be made green, and far distance control points can be made blue. Other styles may include changes in shape and size of the control points.

As would be understood by those of ordinary skill, the multi-style control points can be applied not only to 3DD characters but also to any deformable object having at least one control point. Furthermore, the use of multi-style rendering is not limited to being used with control points. In a further embodiment, multi-style rendering can be applied to bones of a character such that non-occluded bones and more occluded bones are rendered using different styles (e.g., amounts of fade). Multi-style rendering can be applied to objects generally within a scene. For example, a scene with two semi-transparent cubes changes the rendering style of each cube depending on whether it is occluded by the other and how far from one cube the other is.

As can be seen in greater detail in FIG. 2F, in the illustrated embodiment, an amount of transparency of the border and inside the border can vary. In one embodiment, the border is completely opaque, but other variations are possible, such as nearly opaque (95% opaque/5% transparent), virtually opaque (90% opaque/10% transparent), and substantially opaque (80% opaque/20% transparent). The amount of transparency of interior portions of the control point are based on whether the interior portions are occluded, just like as with the border. The interior of the control points can be made more transparent than their corresponding borders. The left hip control point is illustrated such that the non-occluded portion of the interior of the control point clearly shows the stripe on the shorts. Similar parts of the stripes on the shorts can be seen inside the right wrist control point and the waist control point.

As shown in FIG. 1A, a character includes a series of control points which are different from known systems with different control points (as in FIG. 2D). In one embodiment described herein, control points are at least provided at the head and neck of the character (as shown in FIG. 1A) rather than just at the head (as shown in FIG. 2D). To more accurately replicate real human anatomy of the head and neck in an animation system, there are at least two major challenges. The first is that the anatomy of the head and neck is complex, and it is hard to make sure that a 3D character and posing model accurately reflect the real anatomy and the range of motion of the human head and neck. The second is that a design should abstract many joints in the head and neck to two control points that are easy for users to learn and use.

To address realism while reducing complexity, the head and neck are modeled herein in a way that is anatomically correct while mapping all the joints in the head and neck to a small number of control points (e.g., two control points) that reduce the head and neck motion to be based on movement/control of (1) the neck and (2) the atlanto-occipital joint. In one embodiment, the neck is modeled as a set of bones approximating the entirety of the cervical spine.

The mechanism of a two control-point system is described below and is intuitive for artists to understand. In general, the system allows artists to control the entire neck with one dragging or rotating action instead of needing to adjust different parts of the neck separately, and it allows artists to control the atlanto-occipital joint separately from the neck, so that it is possible to achieve poses that only move the atlanto-occipital joint (e.g., tucking in one's chin without moving the neck).

As shown in FIG. 3B, the first control point is the "head" control point and corresponds to the atlanto-occipital joint of FIG. 3A which connects the skull to the top of the neck. This joint allows a person to tilt its head forward and backward and laterally, but only to a small extent. For example, one can tuck in one's chin by only rotating the atlanto-occipital joint. The bottom control point of FIG. 3B (the "neck" control point) approximates the entire neck (the cervical spine). The neck control point allows one to make much bigger movements with one's head, such as shaking one's head from side to side. These two control points give a model a wide range of movements for the head and neck without increasing complexity for an artist.

Figure 3E:
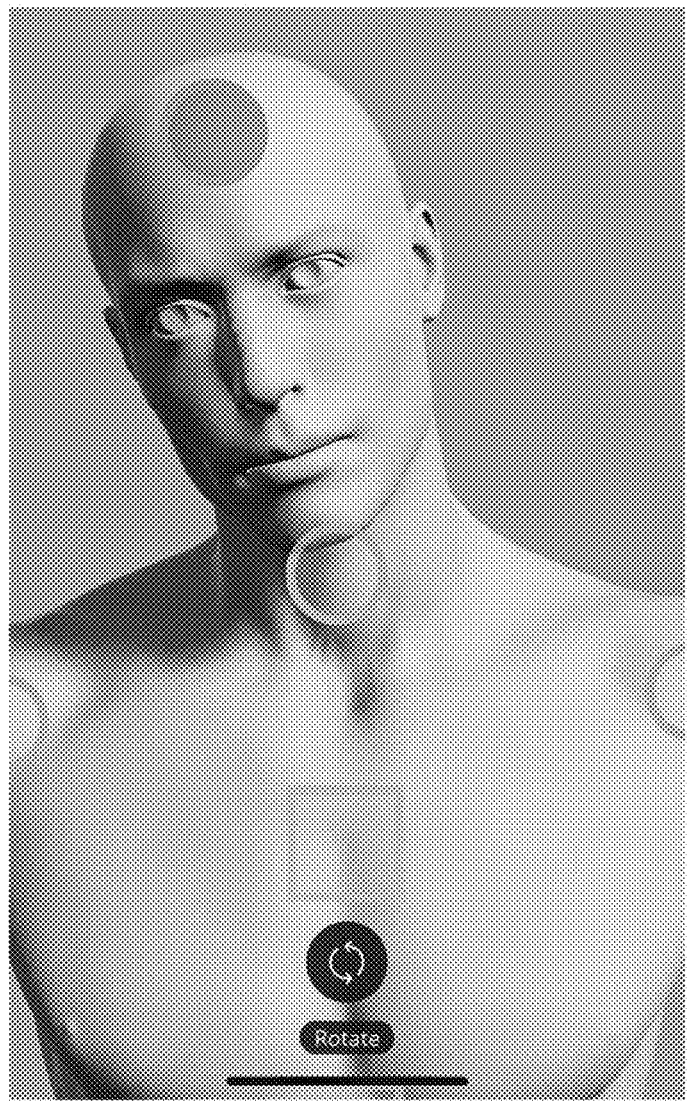
FIG. 3E is a screenshot of a frontal view of the 3DD character of FIG. 3C with an atlanto-occipital joint control point selected and having dragged the atlanto-occipital joint control point to one side.
Figure 3F:
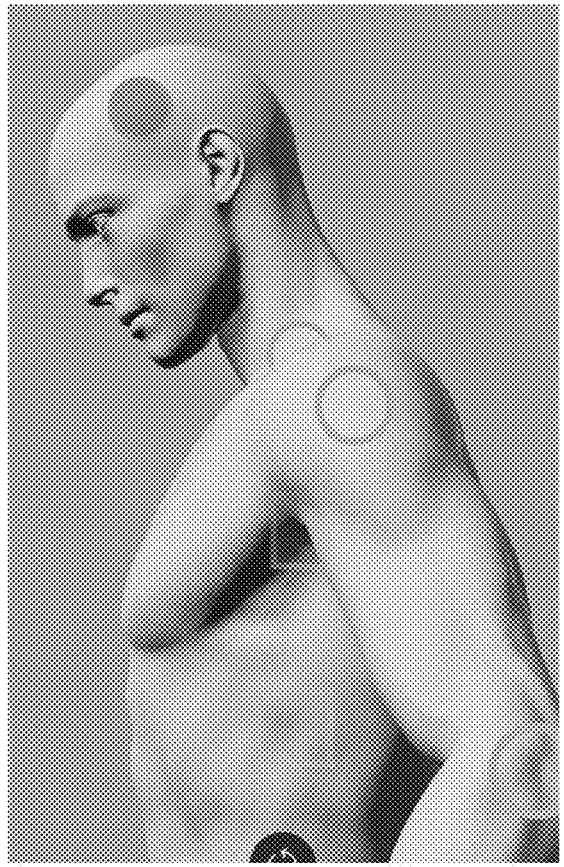
FIG. 3F is a screenshot of a side view of the 3DD character of FIG. 3C with an atlanto-occipital joint control point selected and having dragged the atlanto-occipital joint control point toward the front of the 3DD character's body.
Figure 3G:
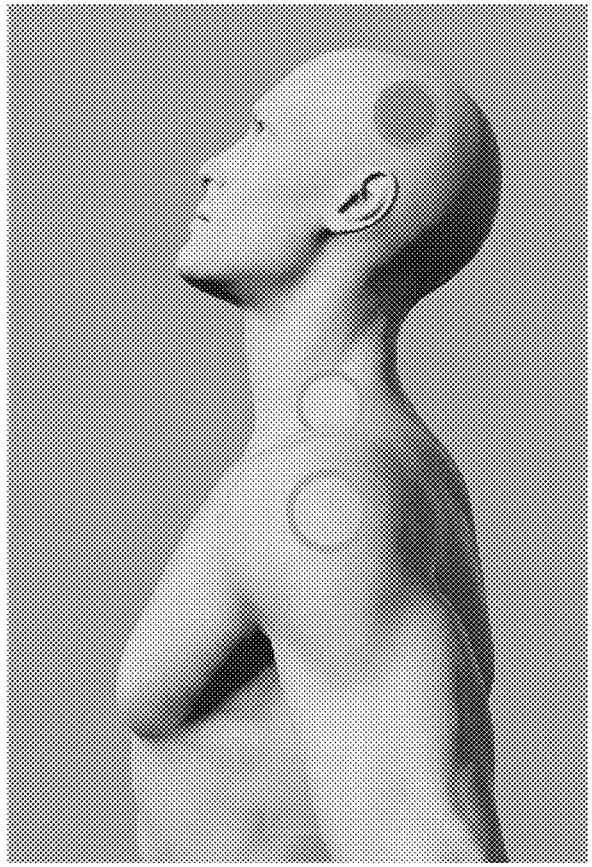
FIG. 3G is a screenshot of a side view of the 3DD character of FIG. 3C with an atlanto-occipital joint control point selected and having dragged the atlanto-occipital joint control point toward the back of the character's body.
Figure 3H:
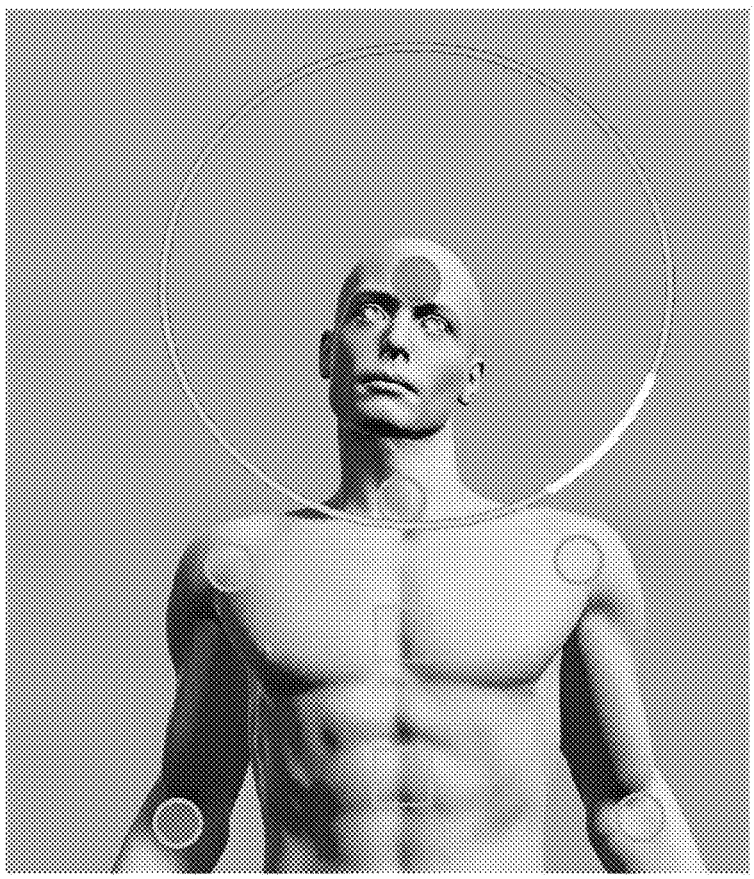
FIG. 3H is a screenshot of a frontal view of the 3DD character of FIG. 3C with an atlanto-occipital joint control point selected and having rotated the head to the side at the atlanto-occipital joint using a rotational control in the form of a loop ("a first loop rotational control")
Figure 3I:
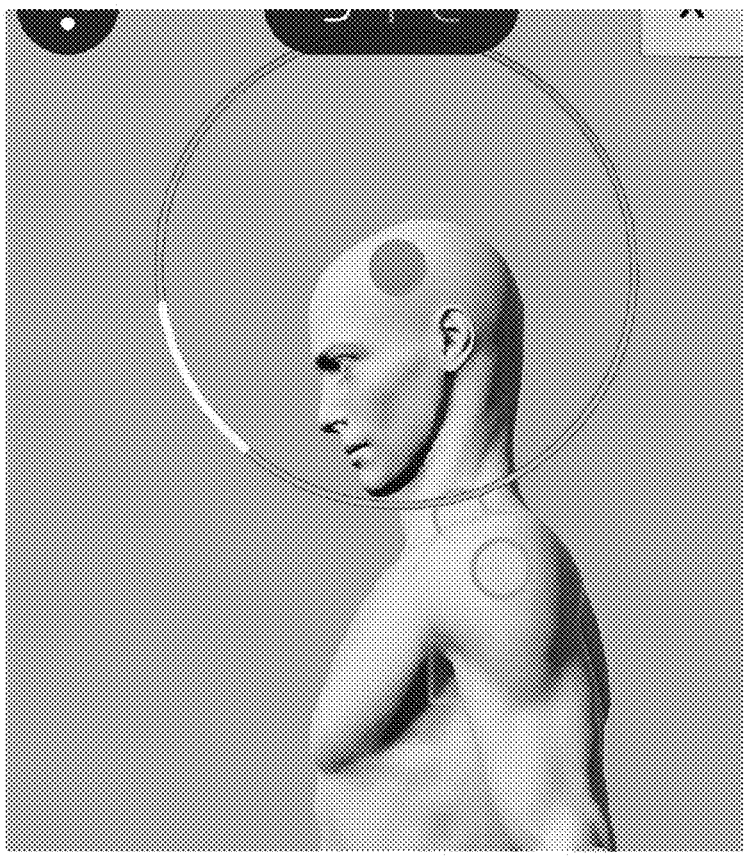
FIG. 3I is a screenshot of a side view of the 3DD character of FIG. 3C with an atlanto-occipital joint control point selected and having rotated the head forward at the atlanto-occipital joint using a second loop rotational control.

By separating the control of the atlanto-occipital joint from that of the neck, human anatomy can be more accurately modeled (as compared to a single control point for both) (as shown in FIG. 3I when tucking a character's chin). If they are not separated, a user cannot achieve poses that only require the atlanto-occipital joint, such as tucking in a character's chin. Instead, in an attempt to tuck the chin, a portion of the neck is bent unrealistically at a point below the base of the skull without keeping the neck straight. In addition, each of these control points can be rotated and dragged to pose a model.

Dragging the head control point allows users to bend the neck. As shown in FIGS. 3C and 3D, the head control point can be selected by an artist. The artist can then tilt the head to the side (as shown in FIG. 3E) or bend the neck forward (as shown in FIG. 3F) and backward (as shown in FIG. 3G). Using a dragging of head control point produces a very smooth and realistic curve of the neck during a video of the movement of head.

Rotating the head control point side-to-side is equivalent to rotating the atlanto-occipital joint in the real human skeleton as shown in FIG. 3H (where the head is rotated using the loop rotational control). The atlanto-occipital joint has a rather small range of motion, because most of the big head movements (such as swiveling the head to say "no") actually come from the neck. The atlanto-occipital joint allows a person to rock his/her head back and forth a little bit, as when nodding "yes" (as shown in FIG. 3I). As can be seen in comparing the effect of dragging the head control point in FIG. 3F and rotating in the forward and back direction in FIG. 3I, dragging the head results in a more extended neck while rotating results more in dropping the chin without moving the neck. The loop rotational controls illustrated in FIGS. 3H and 3I include two different colors in each loop to provide the user with an indication of the range of motion possible using the respective loop rotational controls. Similar multi-colored loop rotational controls showing ranges of motion are illustrated in FIGS. 3K, 3M, 8C, 8D, 10B-10G, and 12B-12G.

Figure 3J:
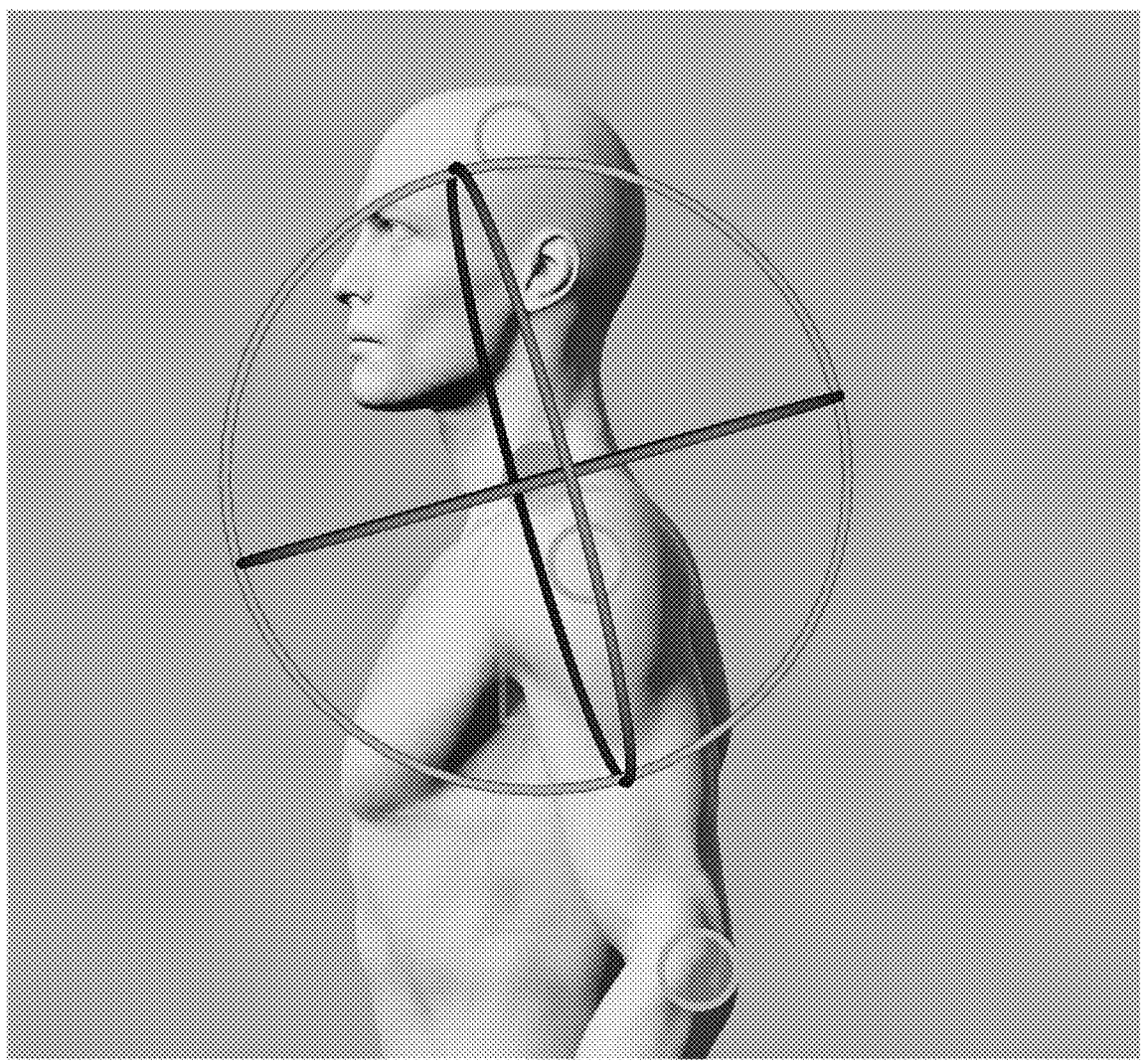
FIG. 3J is a screenshot of a side view of a 3DD character with a neck control point selected and three loop rotational controls visible that enable the 3DD character to have its neck rotated in each of three directions.
Figure 3K:
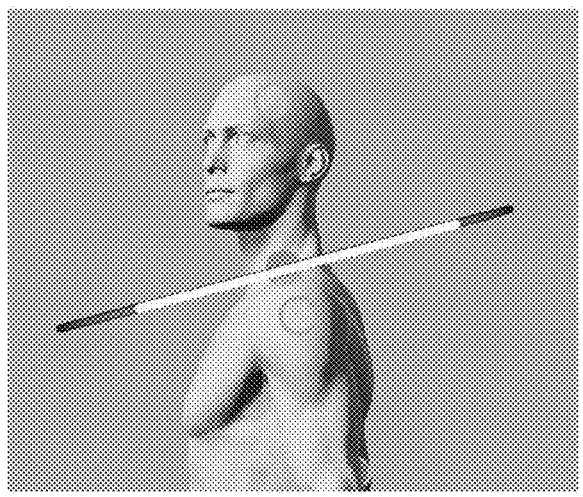
FIG. 3K is a screenshot of a side view of the 3DD character of FIG. 3J with a neck control point selected and having rotated the head and neck using the neck control point in a first direction using a first loop rotational control.
Figure 3L:
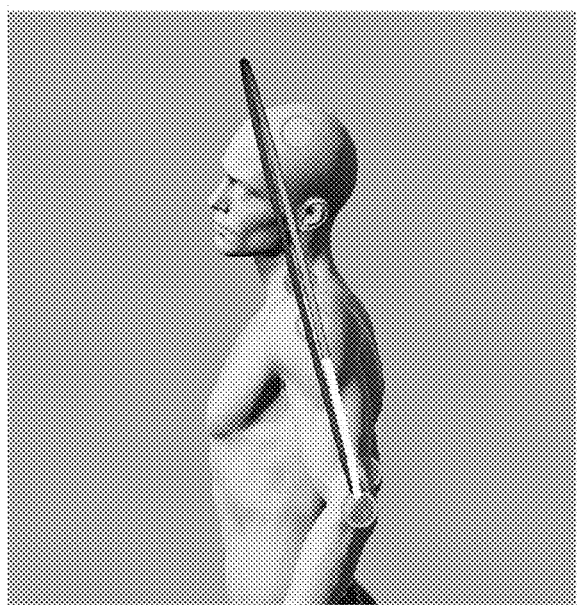
FIG. 3L is a screenshot of a side view of the 3DD character of FIG. 3J with a neck control point selected and having rotated the head and neck using the neck control point in a second direction using a second loop rotational control.
Figure 3M:
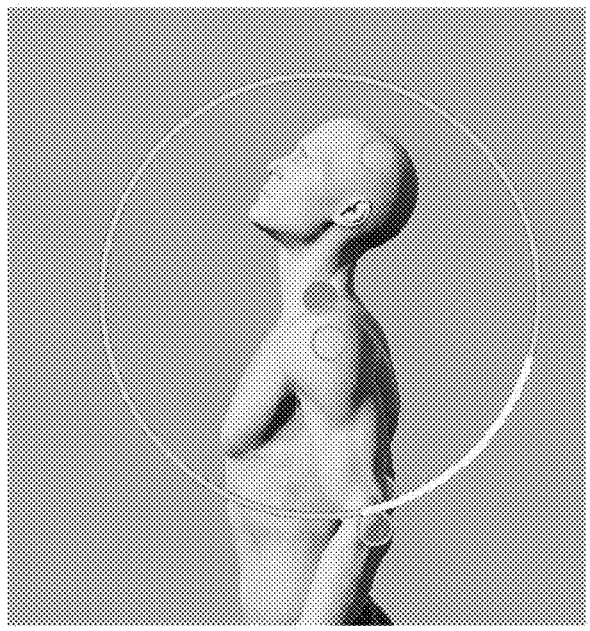
FIG. 3M is a screenshot of a side view of the 3DD character of FIG. 3J with a neck control point selected and having rotated the head and neck using the neck control point in a third direction using a third loop rotational control.

Additional movements can be controlled via the neck control point which is shown as selected in FIG. 3J. Rotating the neck control point allows a user to bend the neck along all 3 possible axes, i.e. swiveling it over the shoulder as shown in FIG. 3K, bending the head forward and backward (as in FIG. 3M), and tilting it sideways as in FIG. 3L. In one embodiment, selection of the neck control point by default brings up the loop controls for allowing rotation about the neck control point. This avoids an artist needing to select the Rotate option with respect to that control point because rotation is the only way an artist can manipulate the neck control point. Such an embodiment saves the artist an extra step with respect to that control point.

As described with respect to FIG. 1B, one exemplary option is to utilize character presets that act as templates, and, in the presets, a range of bone locations, skin locations, and/or control point locations controlling the pose of a character are predefined for the character. For example, a preset pose can include whole body poses for standing, sitting, everyday actions, walking, running, lying, crawling, squatting, kneeling, jumping, fighting, and shooting, two-person interactions, multi-person interactions, sports, dancing, health and yoga, martial arts, poses with props and weapons, poses inspired by classical art, aerial and acrobatics. Additionally, a preset pose can include partial body poses such as hand and feet poses (e.g., for making a first or standing on toes), head poses (e.g., for nodding or shaking a head), leg and arm poses (e.g., lifting a leg or an arm), torso poses, etc. As would be understood by those of skill in the art, respective object-specific preset poses can be created and applied as well to any deformable objects.

Like other functionality described herein, the bone locations, skin locations and/or control point locations for preset poses can be stored within the application (e.g., as code), stored locally as data, or stored remotely on a remote storage source and downloaded locally as needed. For example, when a user tries to use the presets for a character that are not available locally, the application will send the server a request for the corresponding preset file. That preset file is then applied to the specific character (and may not be applicable or authorized for other characters). Alternatively, in other embodiments, the preset file may be applied to any character with the same number of bones, or even combine presets for multiple characters in one file.

In one embodiment, poses can be provided as add-ons to an application that may be purchased in addition to the application itself. Preset poses may be created by the same developer as the application or may be created (as sold/ distributed) by other developers. By utilizing preset poses made by others, an artist is freed from the development time of creating commonly used poses from scratch. The ability to create, reuse and distribute poses greatly speeds up an artist's posing process and can provide users inspiration for creating their own poses too.

By extending the information for a single pose to be a range of poses instead, an artist can more quickly find an appropriate pose for a single image and/or appropriate poses for a series of motions to move a posed character from one pose to another over a fixed period of time. In a known system of preset poses, an artist user chooses a pose from a list of preset poses and then clicks a user interface control (e.g., a button) to apply the preset pose. However, such an implementation misses that a desired pose may be similar to a preset pose but not quite the same. As a result, the control system described herein provides a mechanism to specify at least one parameter (e.g., using at least one slider bar or a numeric percentage amount) to establish where within a range of poses a character should be posed, such as an amount that a first should be opened or closed or an amount through a particular walking motion a character should be. For example, with respect to making a fist, a first may be 100% closed (i.e., a tightly closed fist), an 80% closed fist, a half-closed fist, and so on.

Figure 4A:
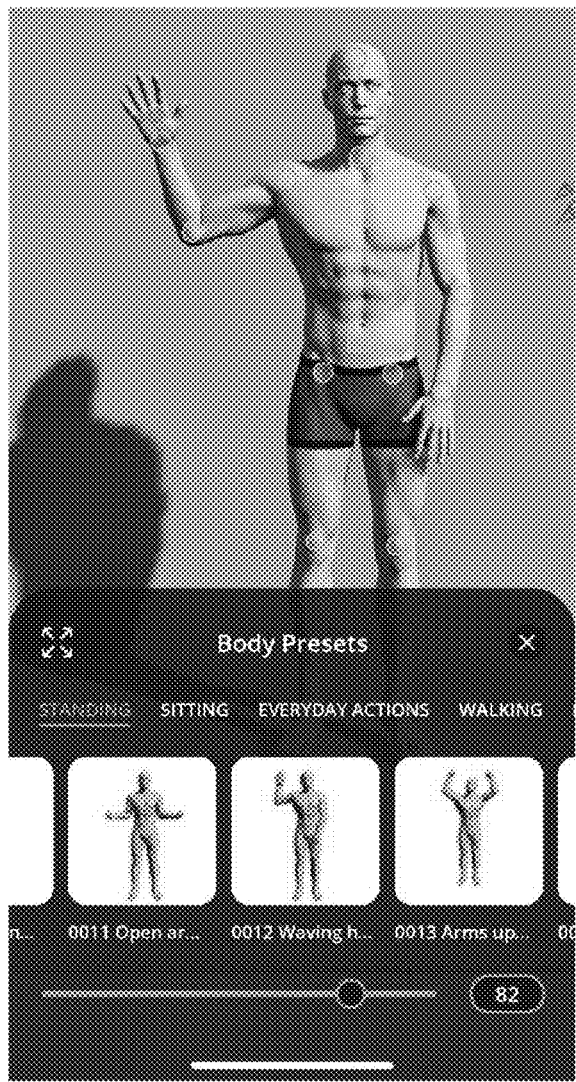
FIGS. 4A-4H are a series of paired screenshots showing first and second poses, respectively, of four exemplary preset ranges of standing poses that are each selectable using a slider bar to select where within a range of poses a 3DD character should be posed.
Figure 4B:
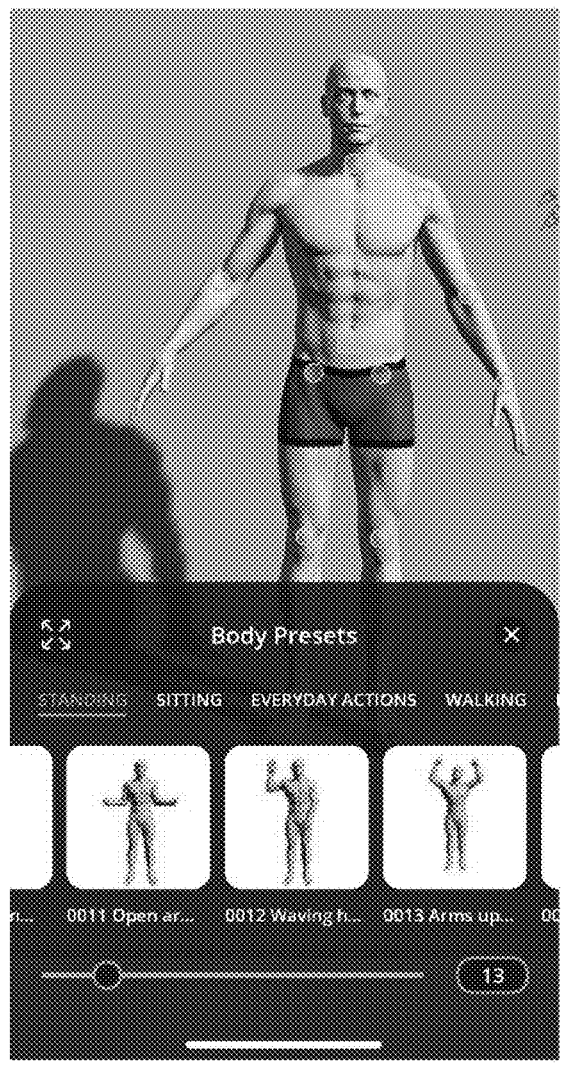
Figure 4C:
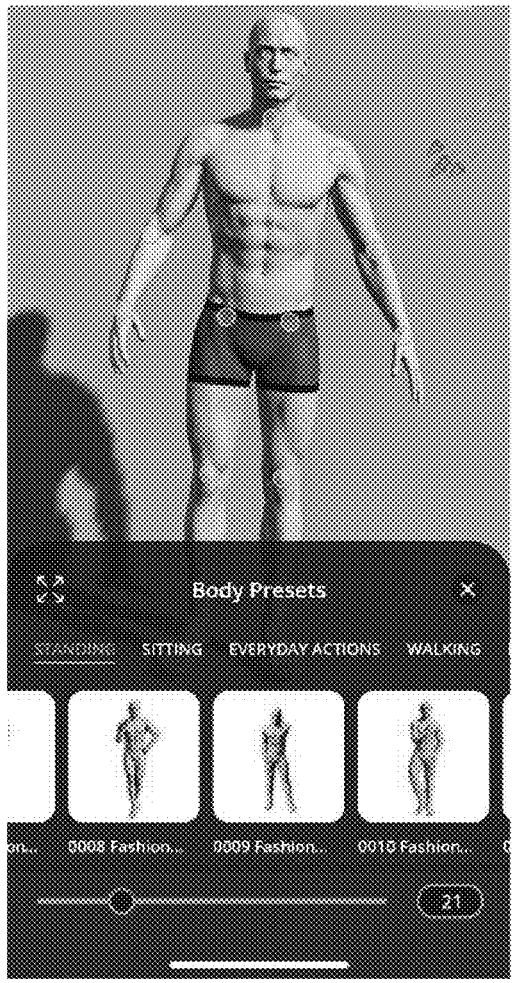
Figure 4D:
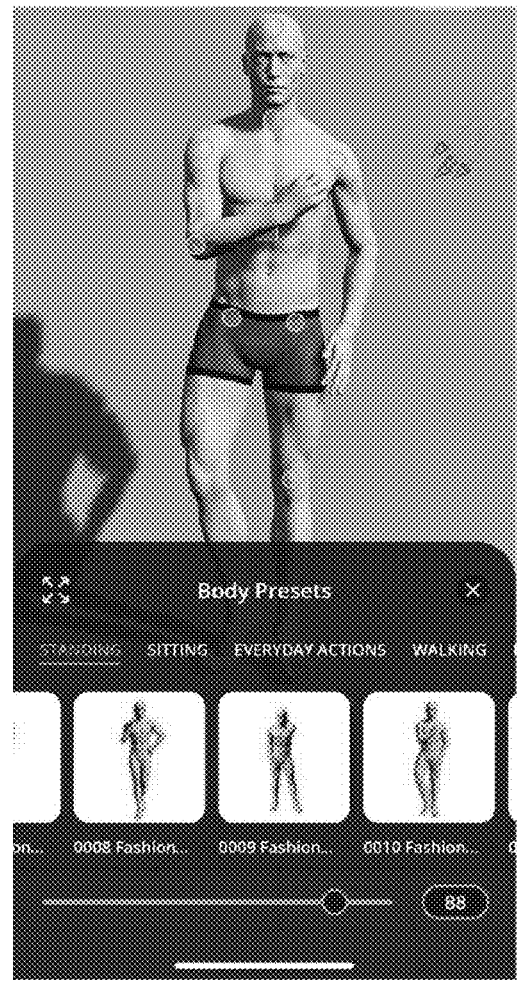

FIGS. 4A and 4B are first and second poses within a range of poses for a waving action of a standing character. The standing character of FIG. 4A has completed 82% of the waving action (by having slid the slider bar) versus the character of FIG. 4B that has completed only 13 percent of the waving action. FIGS. 4C and 4D are first and second poses within a range of poses for a character crossing his right arm over his chest having started with his right arm at his side. The character of FIG. 4C has completed 21% of the arm crossing action (by having slid the slider bar) versus the character of FIG. 4D that has completed 88 percent of the arm crossing action.

Figure 4E:
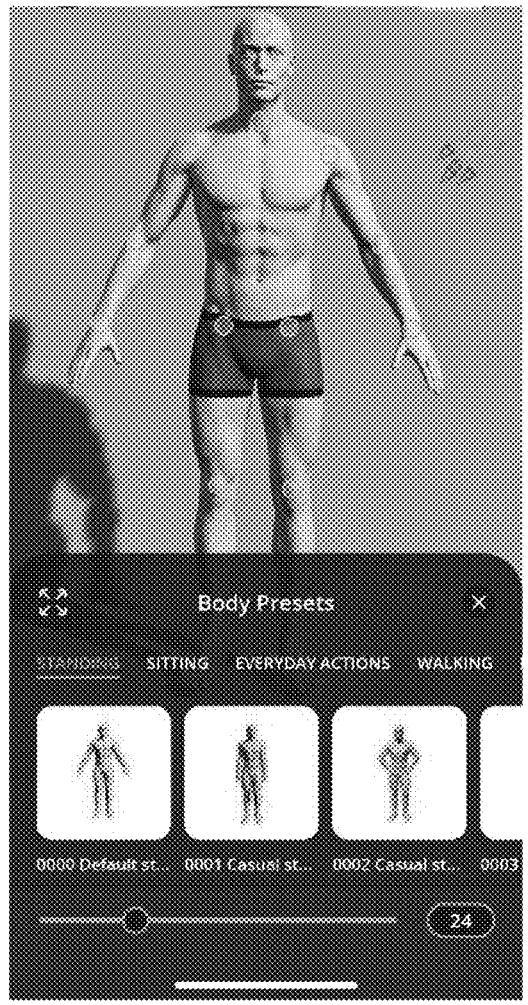
Figure 4F:
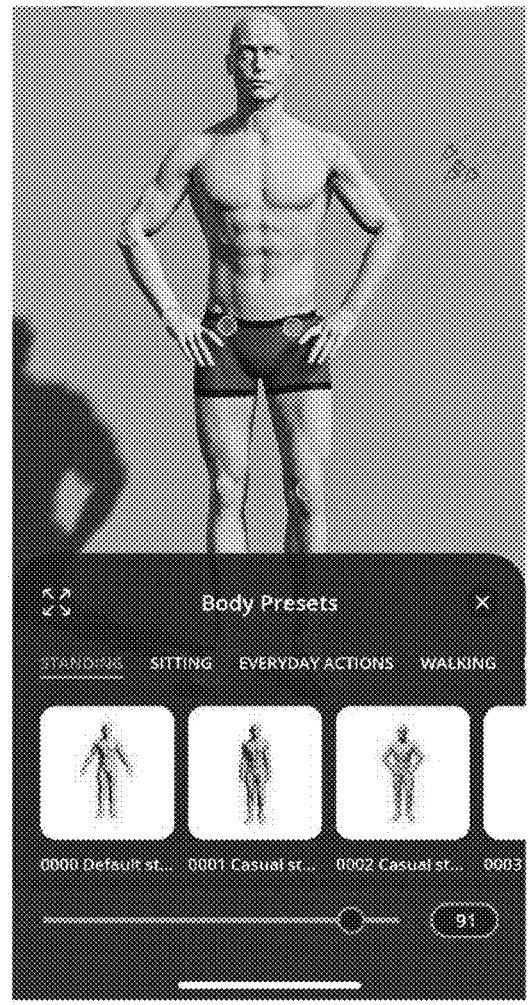
Figure 4G:
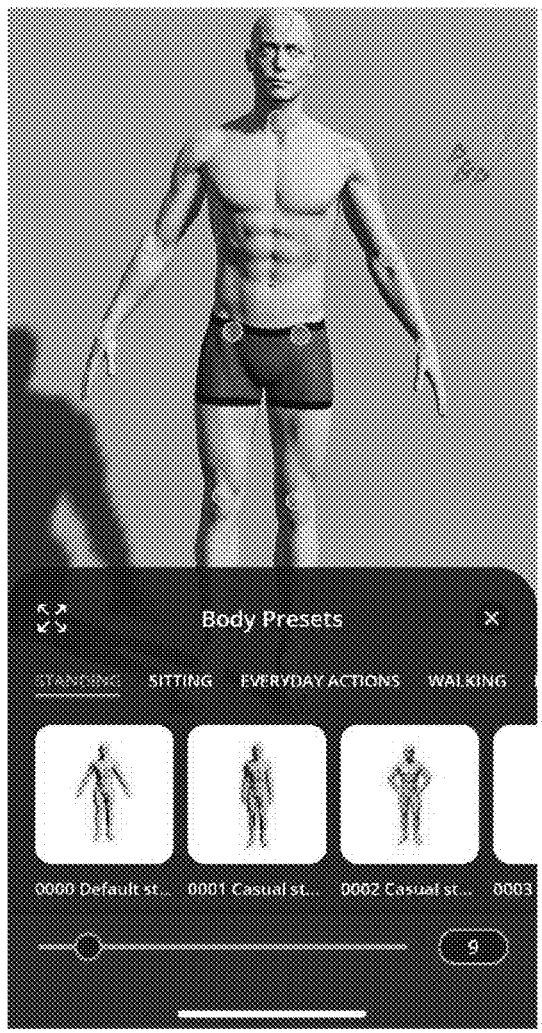
Figure 4H:
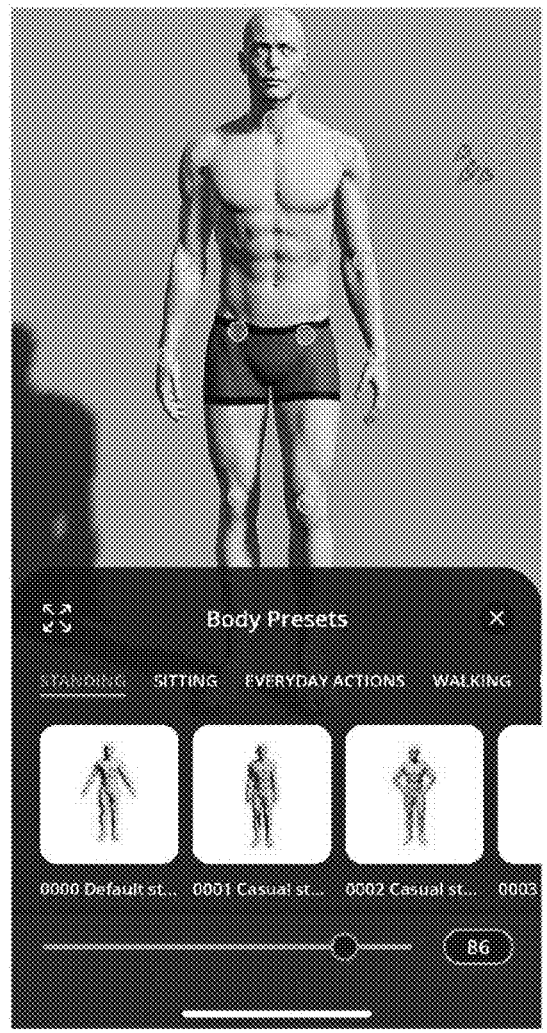

FIGS. 4E and 4F are first and second poses within a range of poses for a character placing his hands on his hips having started with his arms angled away from his sides. The character of FIG. 4E has completed 24% of the arm action (by having slid the slider bar) versus the character of FIG. 4F that has completed 91 percent of the arm action. FIGS. 4G and 4H are first and second poses within a range of poses for a character bringing his hands to his sides having started with his arms angled away from his sides. The character of FIG. 4G has completed 9% of the arm action (by having slid the slider bar) versus the character of FIG. 4H that has completed 86 percent of the arm action.

To calculate the pose of the character based on the percentage the user has selected, the rotations of the bones between the start pose and the target pose are calculated. The start pose can either be the current pose of the character before the user starts applying the percentage-based preset pose, or the default pose of the character. For example, the default pose can be based on a known pose (such as the standing pose shown in FIG. 1A). The target pose is what the character's final pose would be if the pose threshold were set to 100 percent. To calculate the rotation of each bone at an arbitrary percentage (t) of the full final pose, an interpolation is performed between the rotation of the bone in the start pose and in the target pose at percentage t using at least one interpolation technique (e.g., linear interpolation or spherical interpolation).

For example, in FIG. 1A, the character is shown in its start pose, i.e. a default standing character. In the center sub-box of FIG. 4A, the character is shown in its target pose, (i.e., a standing and waving character with its hand closer to the character's head than the elbow is to the spine). In FIG. 4A, the percentage is set to 82%, so the character's pose is interpolated as 82% between the start pose and the target pose (or nearly at the target pose compared to the default pose). In FIG. 4B, the percentage is set to 13%, so the character's pose is interpolated as 13% between the start pose and the target pose (or nearly at the default pose compared to the target pose).

Figure 5A:
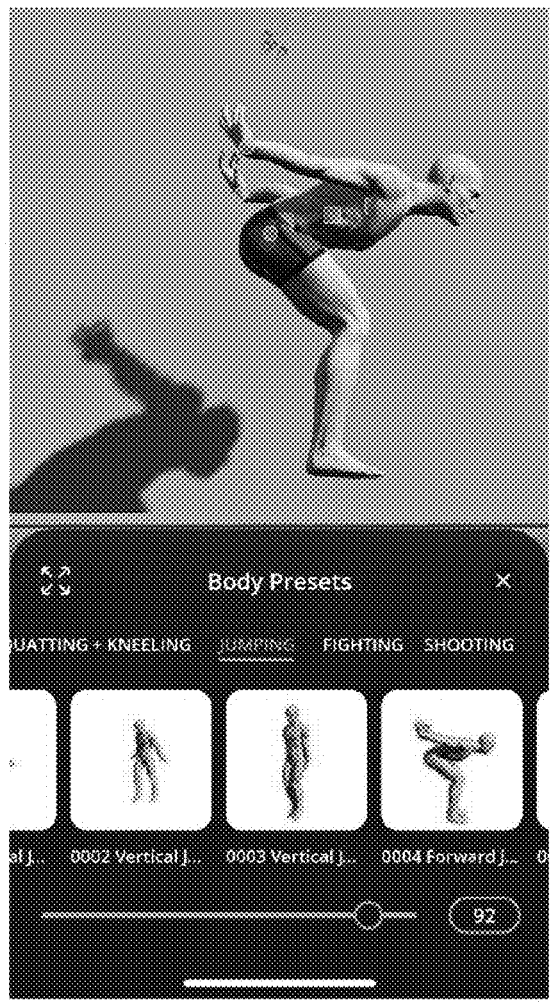
FIGS. 5A and 5B are a pair of screenshots showing a first and second pose, respectively, of a preset range of a jumping pose that is selectable using a slider bar to select where within a range of poses a 3DD character should be posed.
Figure 5B:
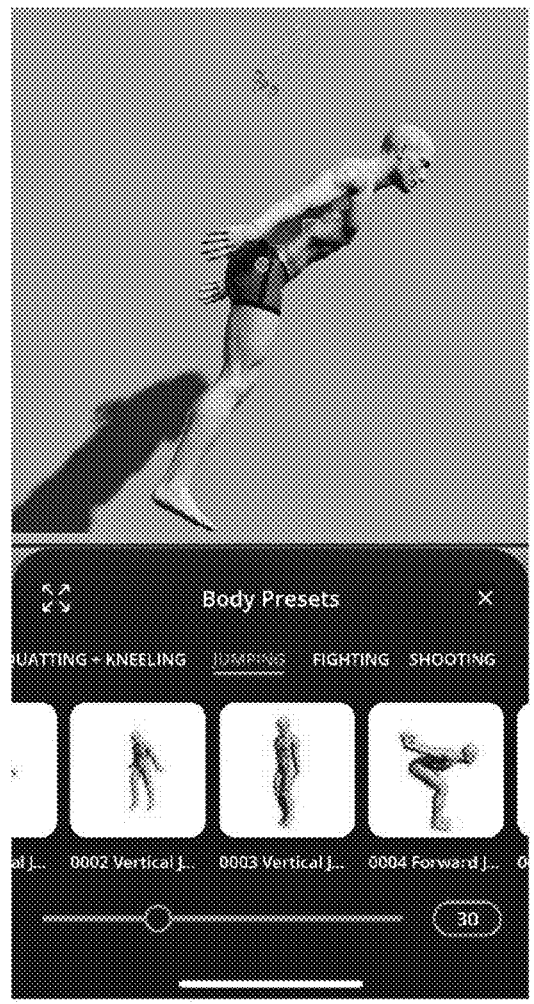

As noted above, the range of preset poses does not need to be limited to standing poses. FIGS. 5A and 5B are a pair of screenshots showing a first and second pose, respectively, of a preset range of a jumping pose that is selectable using a slider bar to select where within a range of poses a character should be posed.

Figure 5C:
FIGS. 5C and 5D are a first pair of screenshots showing a first hand position pose and a second hand position pose, respectively, of a preset range of hand poses that can be added to a previously selected whole-body pose such as in FIG. 5B (or applied to a manually posed character as well)
Figure 5D:
Figure 5E:
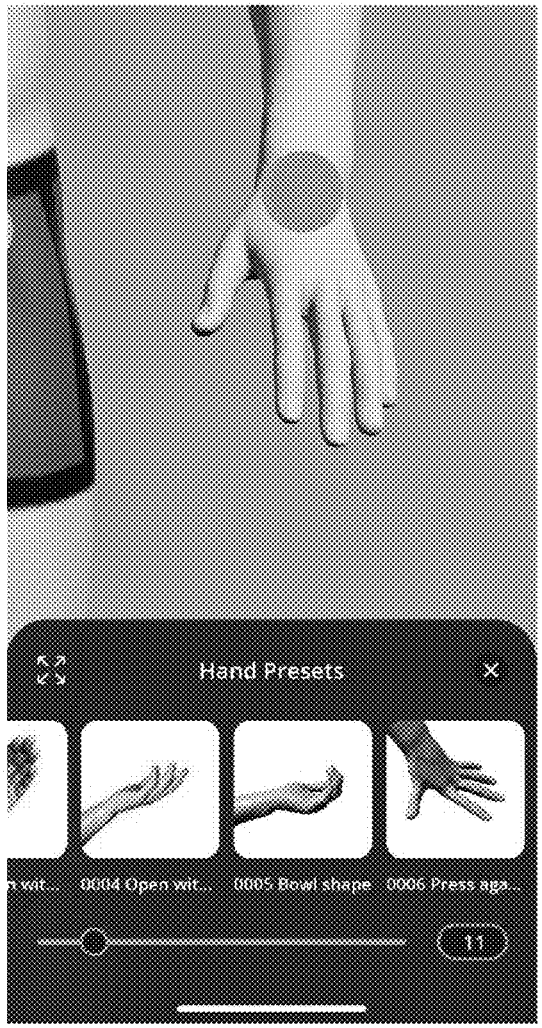
FIGS. 5E and 5F are a second pair of screenshots showing an enlarged first hand position pose (with the left hand more open) and an enlarged second hand position pose (with the left hand further along to making a bowl shape), respectively, of a preset range of a hand pose that is selectable using a slider bar.
Figure 5F:
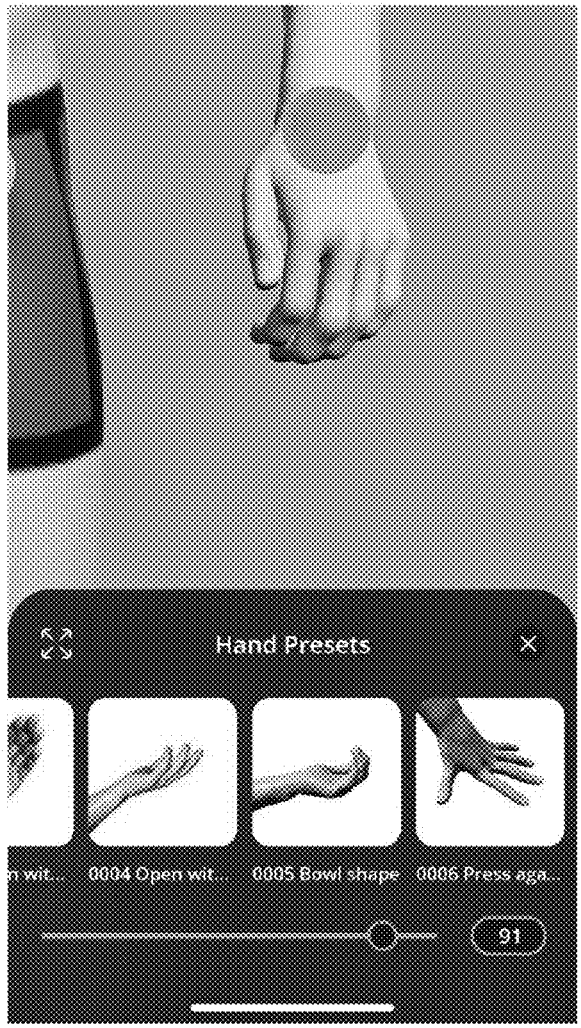

As noted above, whole body presets and partial body presets can be used. In one embodiment, the option of applying whole body presets is provided at the bottom of the user interface when the whole body of a character is selected. Alternatively, if a specific joint control point is selected (e.g., the wrist joint control point), then the option for selecting presets for the selected control point (e.g., making a first) is provided at the bottom of the user interface. FIGS. 5C and 5D are a first pair of screenshots showing (within the jumping pose) a first hand position pose (with the right hand more open) and a second hand position pose (with the right hand more closed), respectively, of a preset range of a hand pose that is selectable using a slider bar to select where within a range of poses a character's hand should be posed. FIGS. 5E and 5F are a second pair of screenshots showing an enlarged first hand position pose (with the left hand more open) and an enlarged second hand position pose (with the left hand further along to making a bowl shape), respectively, of a preset range of a hand pose that is selectable using a slider bar.

While the above illustrations have been described with respect to a single slider bar, it is possible to use plural user interface controls (e.g., slider bars) to parameterize more than one kind of motion simultaneously. For example, using two slider bars, it is possible to apply a partial preset pose for the arm that is a raised up arm to the left and right arm at different percentages, such as 50% for the left arm and 100% for the right arm, so that the left arm is raised up half way but the right arm is raised up all the way.

In addition to controlling poses based on the other control points described herein, it also is possible to control the posing of the torso (spine and pelvis) using at least three control points. Because the human spine and pelvis have many joints and are very flexible, the human body is capable of achieving a vast range of poses. However, controlling the complexity of the movement in the application cannot be made so complex that the artist is incapable of learning how to use the control points to create the desired position or motion. Therefore, a balance is created between the number of control points and the anatomic realism of the posed character when creating a three control point torso posing system. The joints in the torso (spine+pelvis) can be mapped to a realistic model including only three control points when those control points are for (1) chest (modeled as a set of bones approximating the entirety of the thoracic spine), (2) waist (modeled as a set of bones approximating the entirety of the lumbar spine) and (3) pelvis. Empirical evidence has shown that the use of the three control points is intuitive for artists to understand.

Figures 6A, 6B:
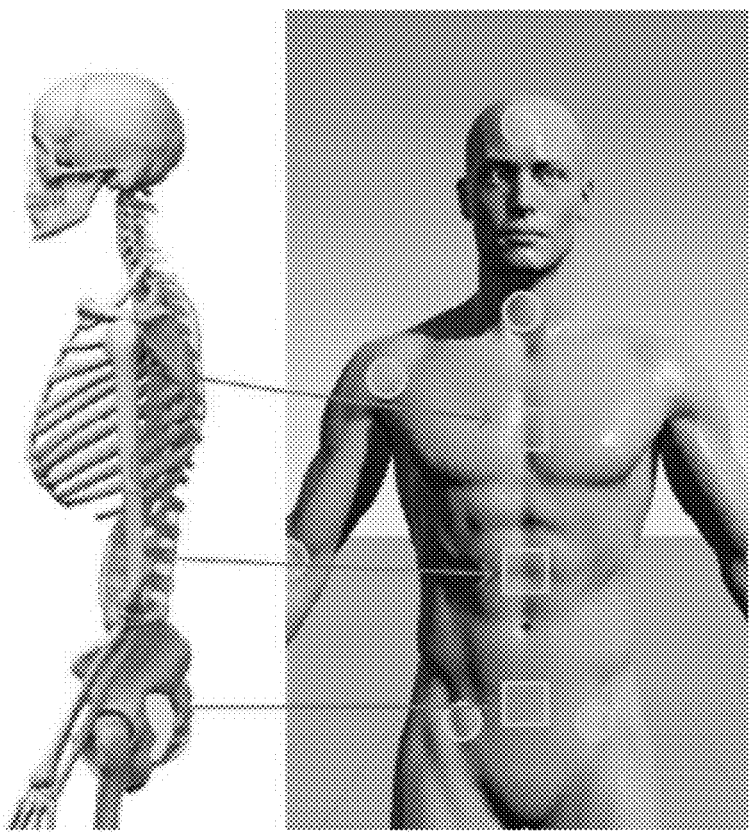
FIG. 6A is an illustration of a portion of a human skeleton.
FIG. 6B is a screenshot of a character including three torso control points for controlling the positioning and movement of a character.

As shown in FIGS. 1A and 1B, there are three control points on the torso that appear as squares instead of circles. Those control points are shown in FIG. 6B in enlarged form with reference to their corresponding parts in a human skeleton as shown in FIG. 6A. Each of those control points can be dragged and rotated to pose a character.

Figure 7C:
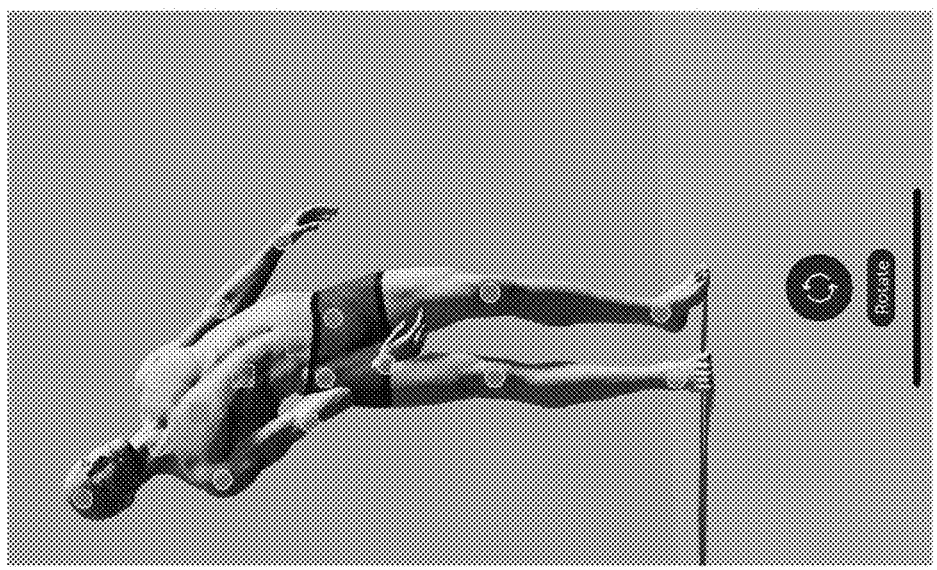
FIGS. 7A-7C are a series of screenshots showing how a character bends when a chest control point is selected and dragged.
Figure 7B:
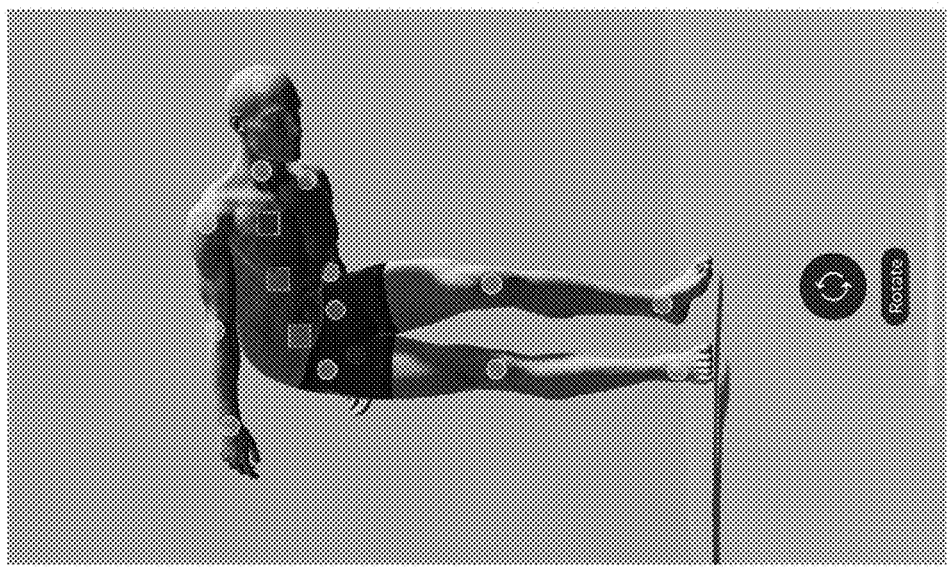
Figure 7A:
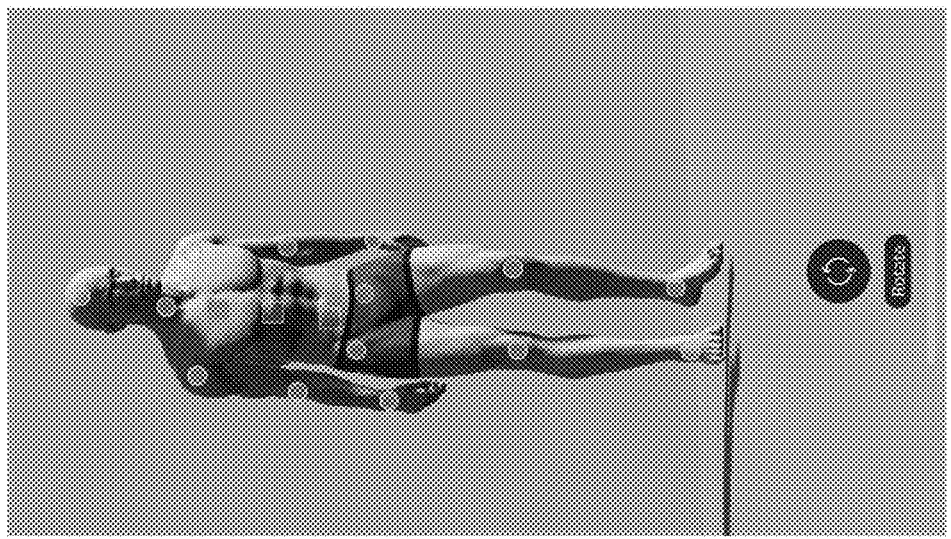
Figure 7D:
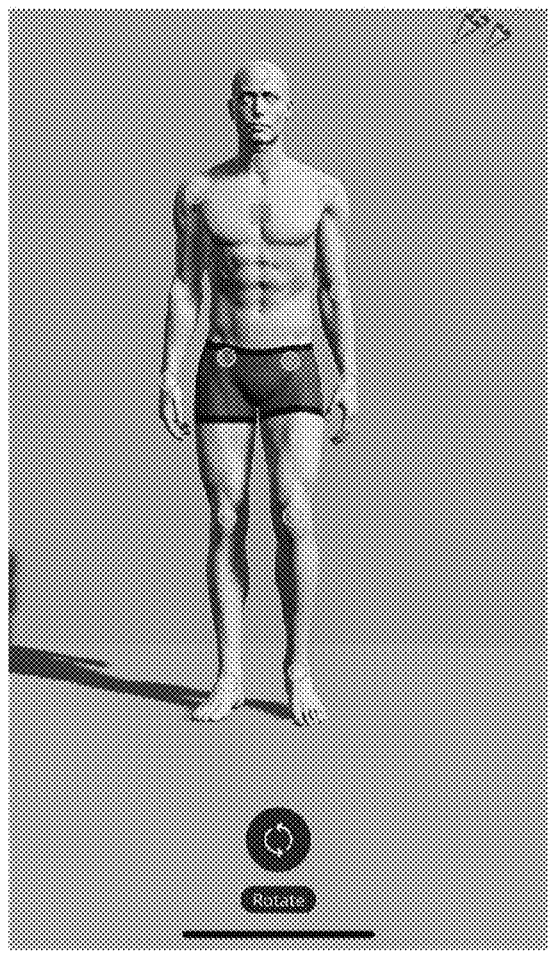
FIGS. 7D and 7E are a set of screenshots showing how an initially straight standing character can be made to lean in a single motion by dragging the chest control point.
Figure 7E:
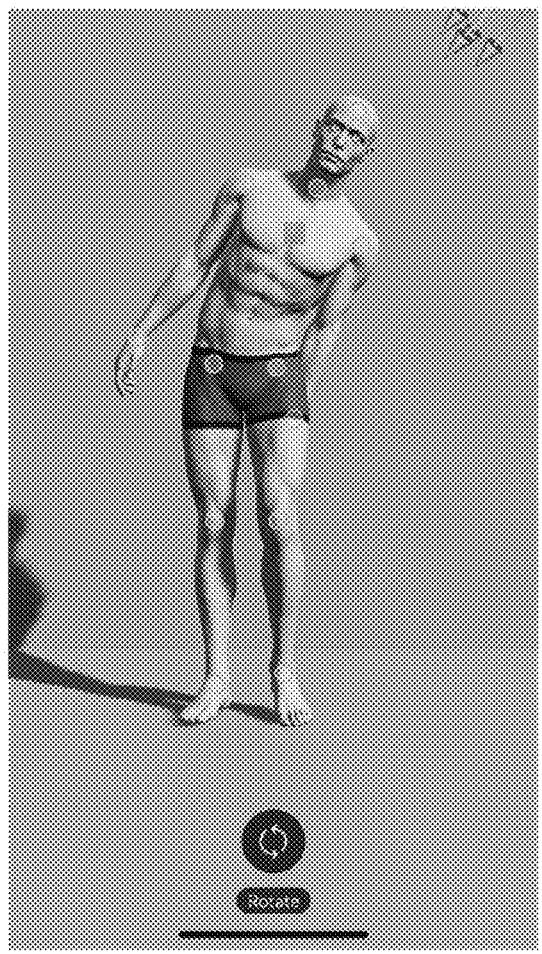

As shown in FIGS. 7A-7C, when a chest control point is selected, dragging on the chest control point bends the waist. A character initially standing as shown in FIG. 7A is pulled forward into a bowing position (bends the waist forward) by dragging the selected chest control point down and in front of the character's chest (as shown in FIG. 7B). Conversely, the character initially standing as shown in FIG. 7A leans backwards (bends the waist backwards) by dragging the selected chest control point behind its initial position (as shown in FIG. 7C). As shown in FIG. 7C, the character also can be made to lean sideways (bends the waist sideways) using the same chest control point. As shown in FIGS. 7D and 7E, an initially straight standing character (FIG. 7D) can be made to lean sideways (bends the waist sideways) (FIG. 7E) in a single motion by moving the chest control point such that head, shoulders, arms, waist and back all move cooperatively.

Figure 8A:
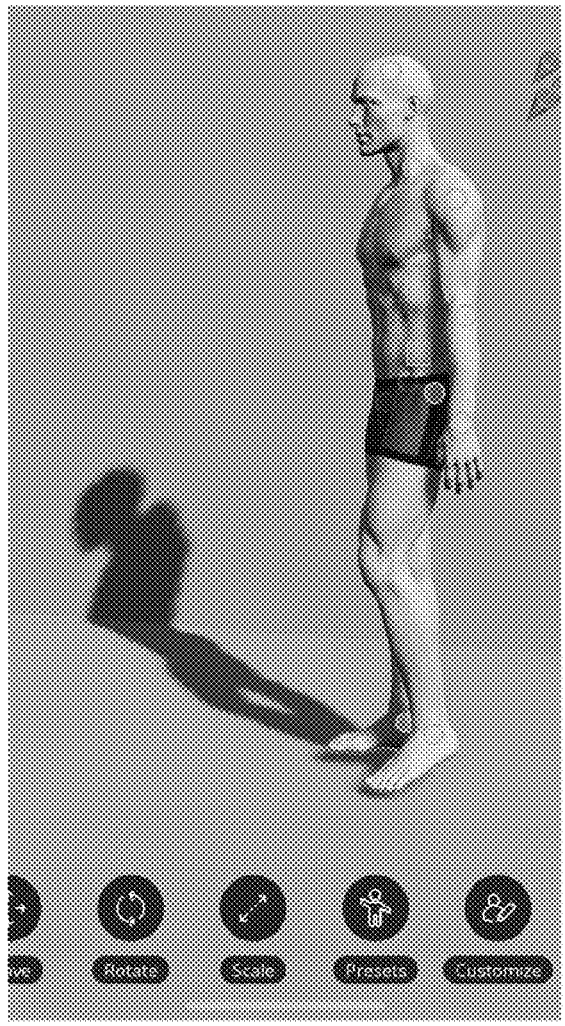
FIGS. 8A-8F are a series of screenshots showing how an initially posed character can be moved by selecting its chest control point and rotating the character using a "front-to-back" control loop or a "side-to-side" control loop.
Figure 8B:
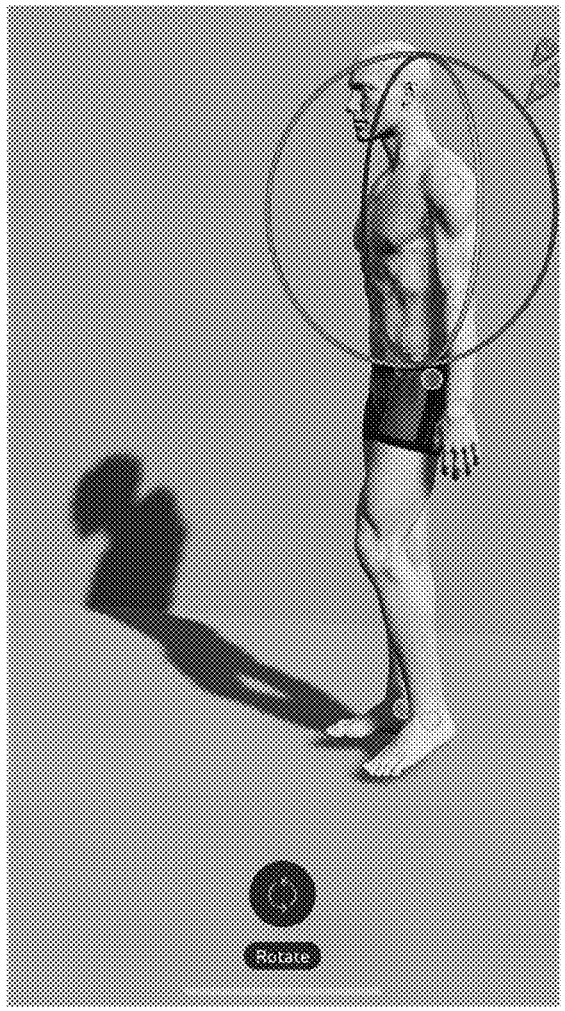
Figure 8C:
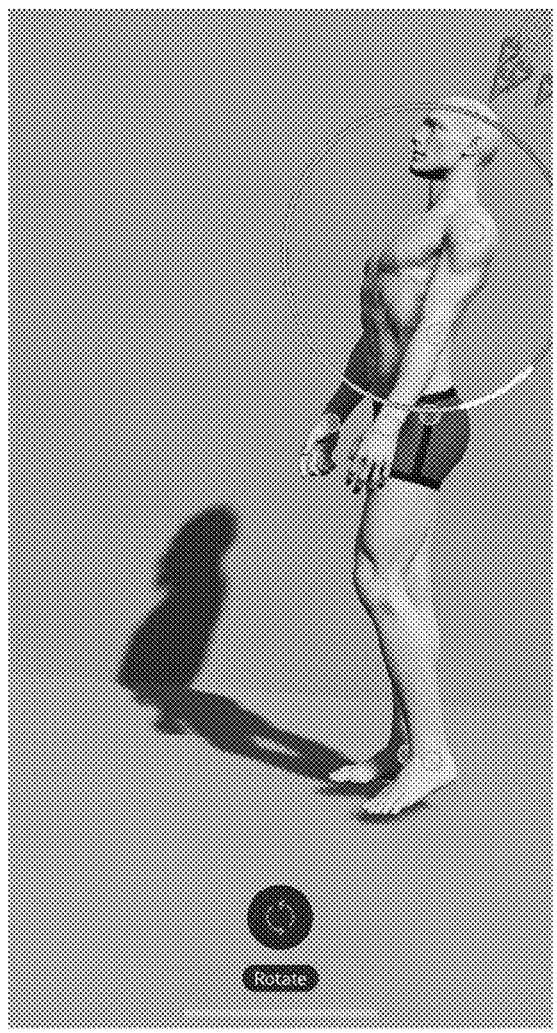
Figure 8D:
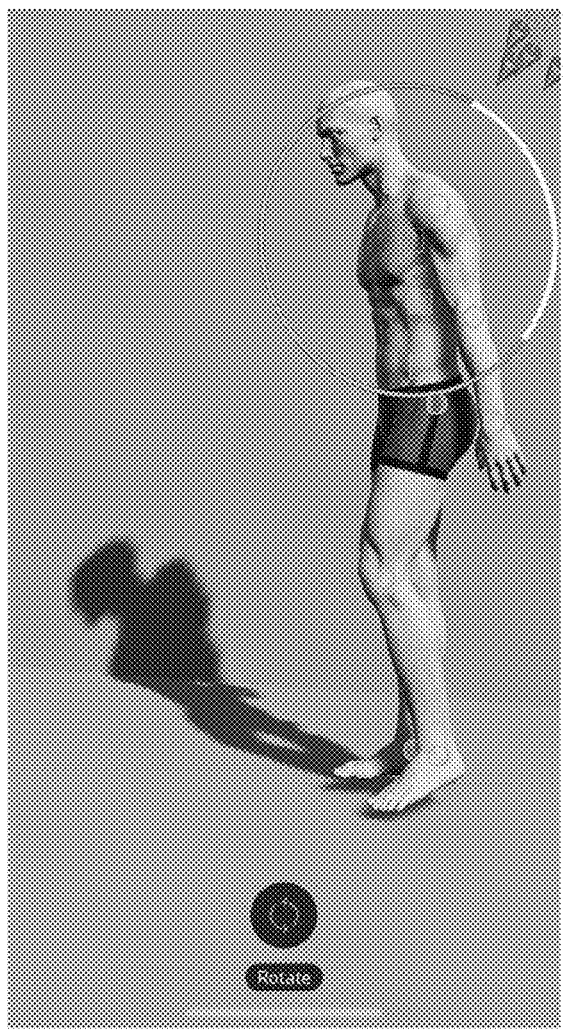
Figure 8E:
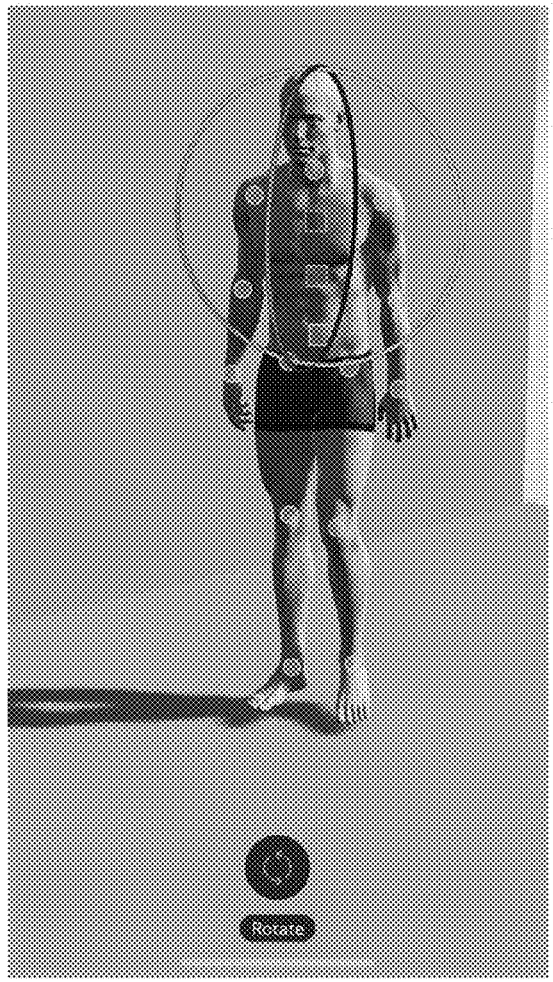
Figure 8F:
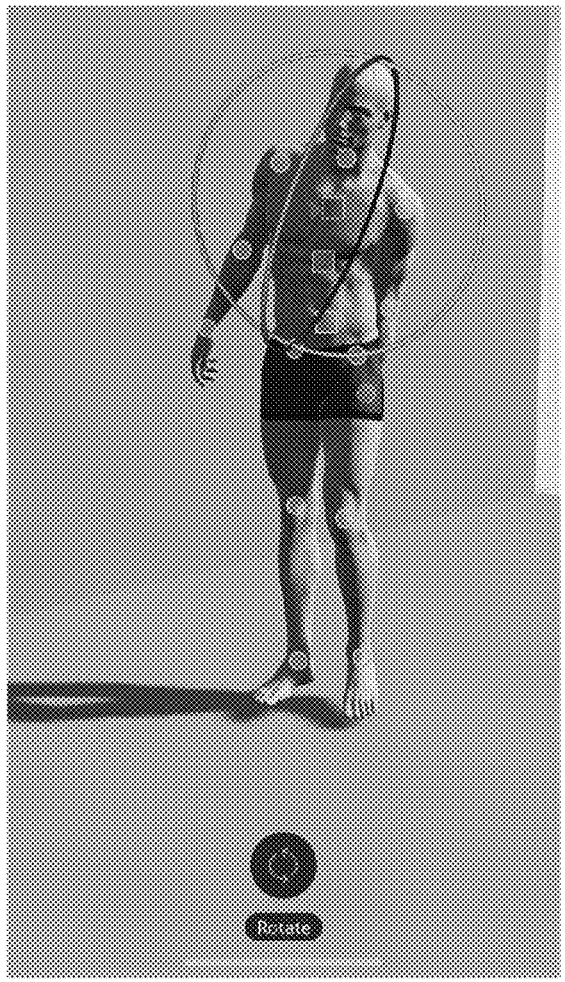

In addition to being able to drag the chest control point, the chest control point can be used for rotational movement as well (by selecting the Rotate option at the lower portion of the user interface). An initially posed character shown in FIG. 8A has its chest control point selected and the Rotate option selected such that a set of two loops are shown indicating the rotational directions for the chest control point (as in FIG. 8B) to allow manipulation of the chest. By manipulating the "Front-to-back" control loop, the character bends forward and backward to achieve poses like "pushing out chest" or "hunching back" as shown in FIGS. 8C and 8D. By manipulating the "side-to-side" control loop, an initially straight character (FIG. 8E) bends sideways so that only the chest moves while keeping the waist static (FIG. 8F). This leaning process automatically causes corresponding movements of the head, shoulders, arms, chest and abdominal sections.

Figure 9C:
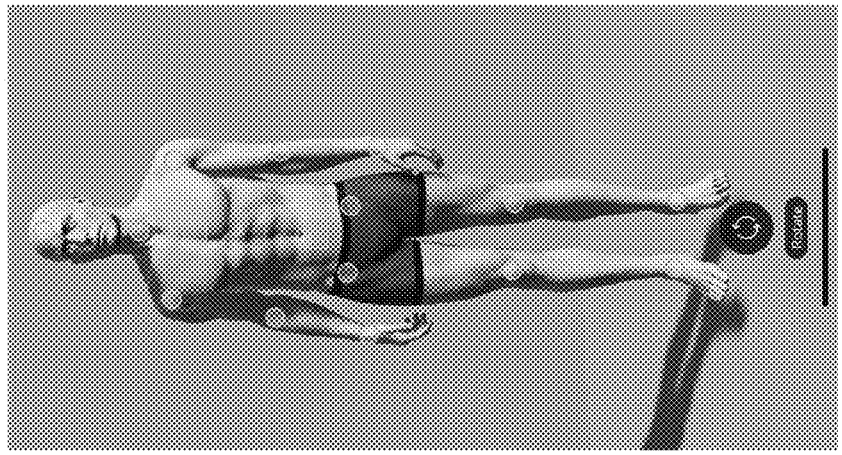
FIGS. 9A-9C are a series of screenshots showing how an initially posed character moves in response to a waist control point moving to the right and the left.
Figure 9B:
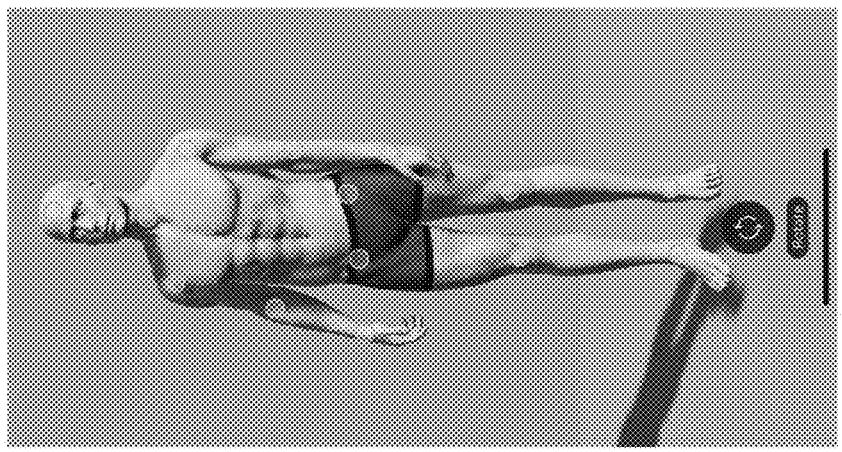
Figure 9A:
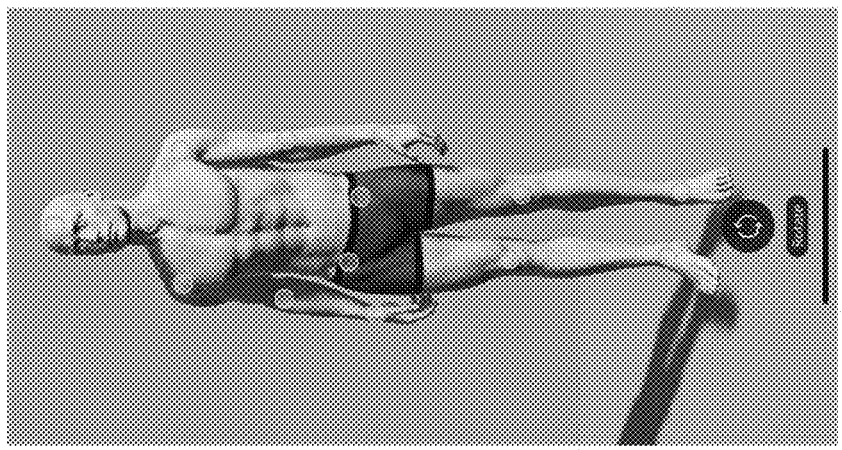

Similar to manipulating the chest control point, the waist control point (the middle of the three square control points) can be dragged and rotated as well to produce consistent motion/positioning of the character's body. As shown in FIG. 9A, an initially posed character has had its waist control point selected to allow manipulation of the waist. By moving the control point to the left and the right, the waist is curved, and the hips below move as well as the abs, chest, shoulders, arms and head above. As shown in FIG. 9B, movement of the waist control point to the character's right causes the character's left hip to rise and right hip to lower as well as a c-shape to form on the character's left side. Similarly, the left shoulder drops, and the right shoulder rises. As shown in FIG. 9C, movement of the waist control point to the character's left causes the reverse movement (i.e., the character's right hip rises and left hip lowers, and a reverse c-shape form on the character's right side while the right shoulder drops, and the left shoulder rises).

Figure 9F:
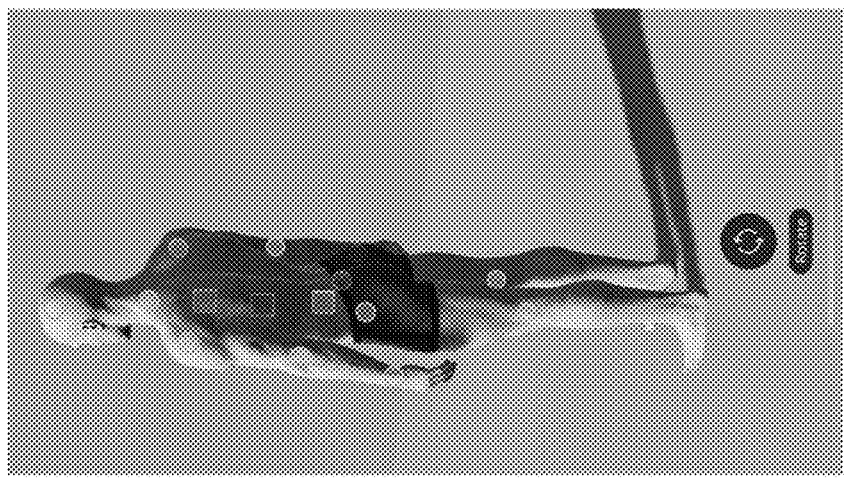
FIGS. 9D-9F are a series of screenshots showing how an initially posed character moves in response to a waist control point moving forward and backward.
Figure 9E:
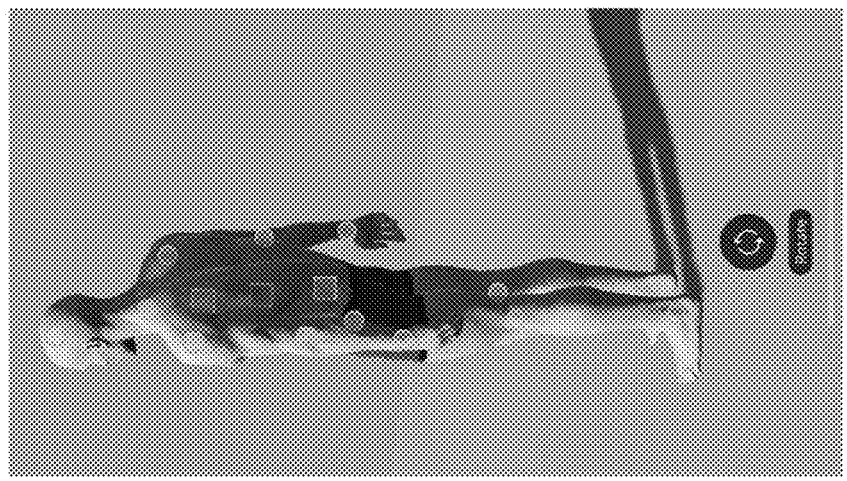
Figure 9D:
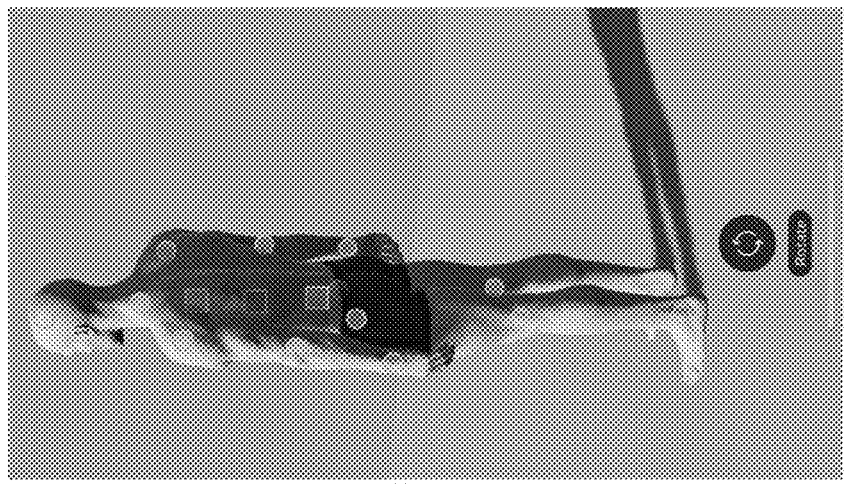
Figure 10C:
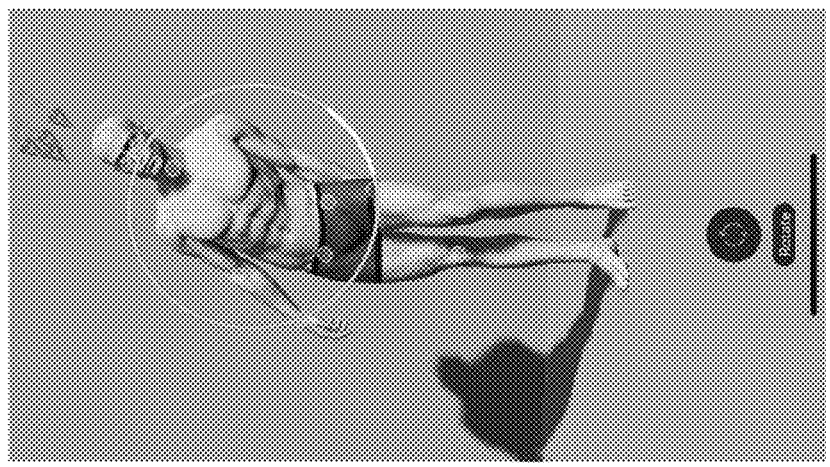
FIGS. 10A-10C are a series of screenshots showing how rotation about the waist control point in a first direction causes a character to lean left and right.
Figure 10B:
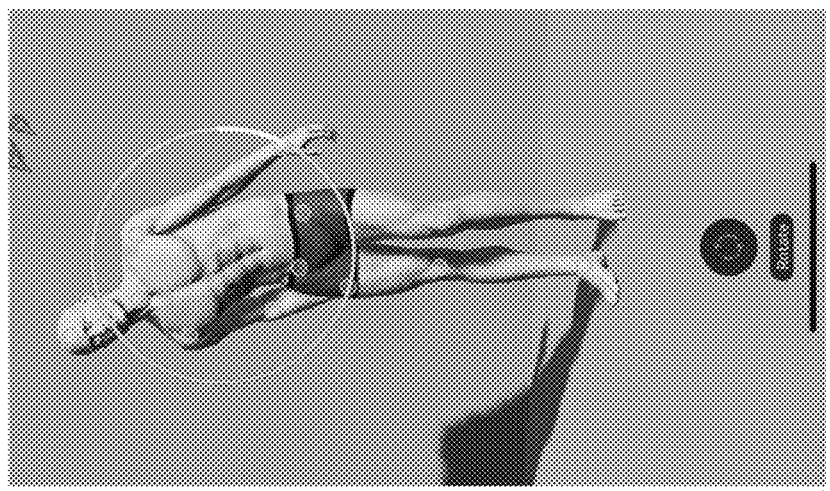
Figure 10A:
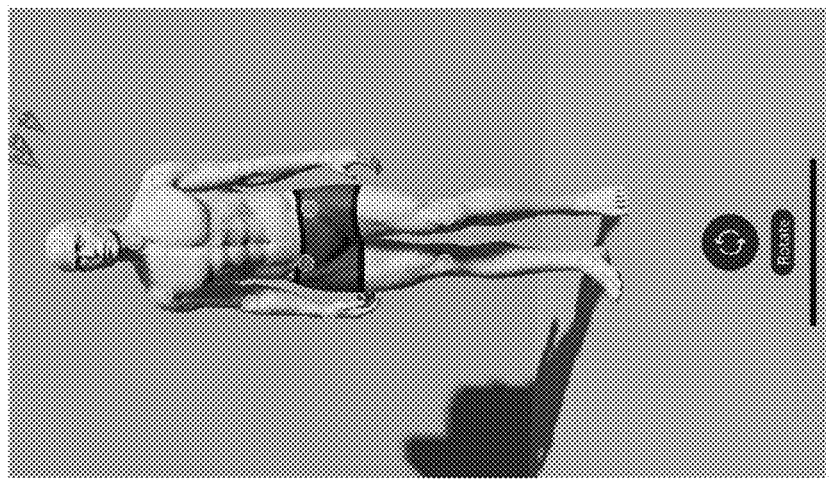
Figure 10D:
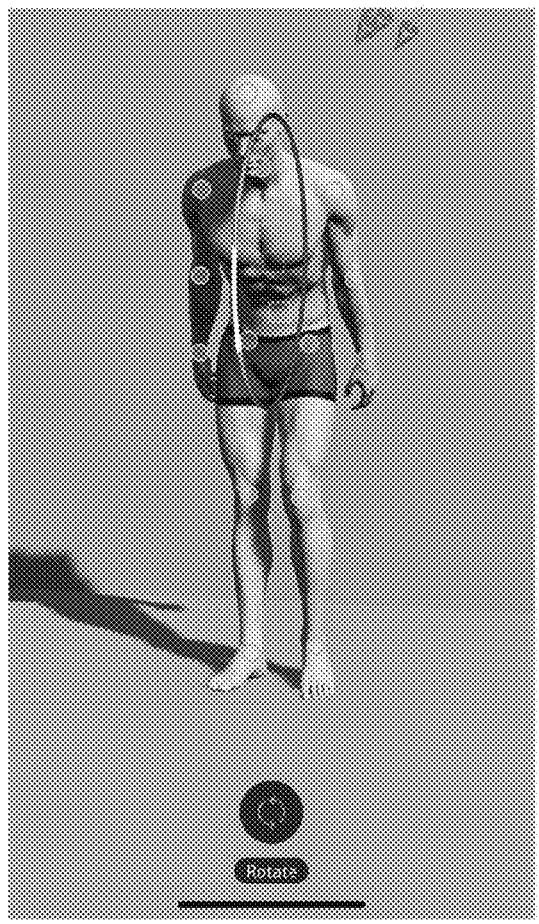
FIGS. 10D and 10E are a pair of screenshots showing how rotation about the waist control point in a second direction causes a character to lean forward and backward.
Figure 10E:
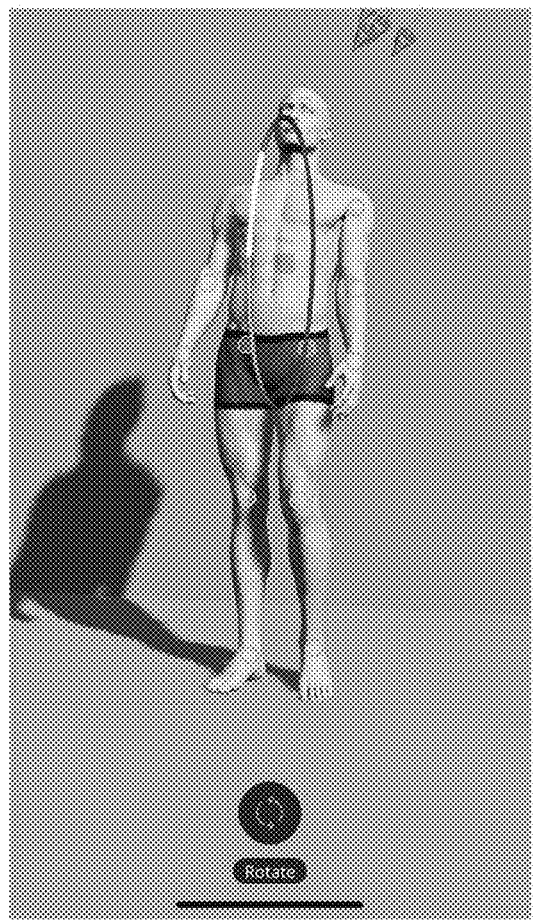
Figure 10F:
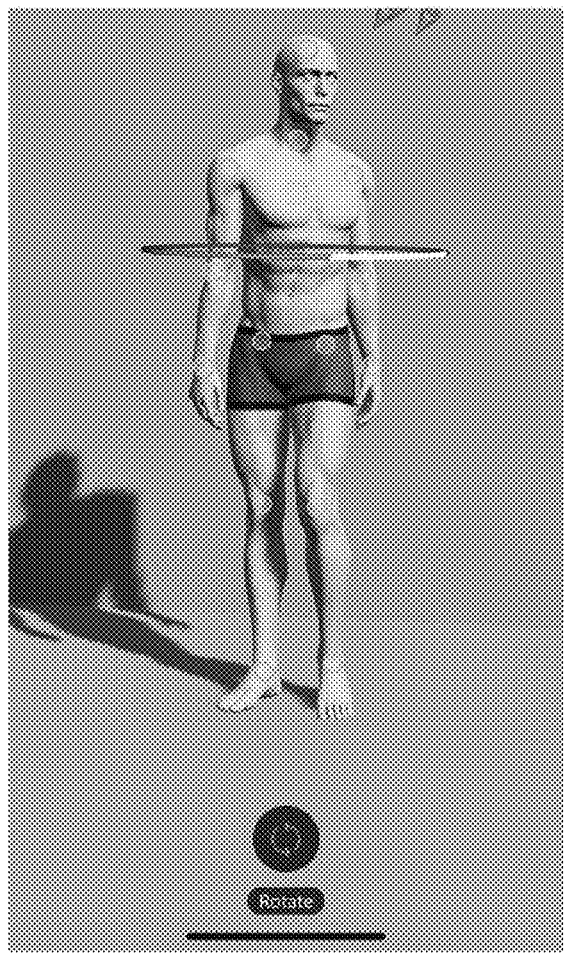
FIGS. 10F and 10G are a pair of screenshots showing how rotation about the waist control point in a third direction causes a character to rotate left and right.
Figure 10G:
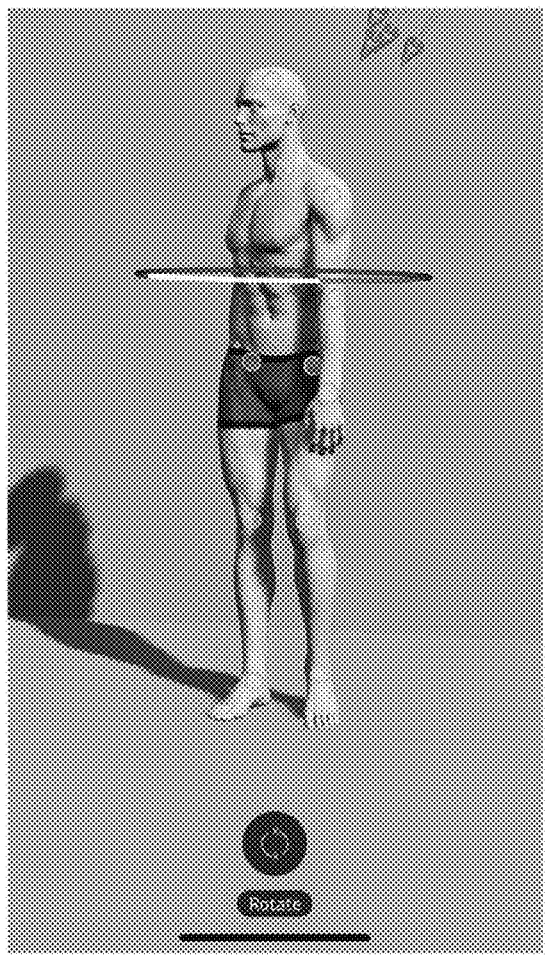

In addition to being able to move the waist control point left and right, it also can be moved forward and backward. As shown in FIG. 9D, an initially posed character has had its waist control point selected. By moving the control point forward and backward, the waist is curved, and the hips and buttocks below move as well as the abs, chest, shoulders, arms and head above. As shown in FIG. 9E, movement of the waist control point backward causes the waist to curve, forming a reverse c-shape on the character's front. As shown in FIG. 9F, movement of the waist control point forward causes the waist to curve, forming a c-shape on the character's front. FIGS. 10A-10C show a series of screenshots showing how rotation about the waist control point in a first direction causes a character to lean left and right (i.e. waist bends left and right). FIGS. 10D and 10E show how rotation about the waist control point in a second direction causes a character to lean forward and backward (i.e., waist bends forward and backward). FIGS. 10F and 10G show how rotation about the waist control point in a third direction causes a character to twist left and right (i.e., waist twists left and right).

Figure 11C:
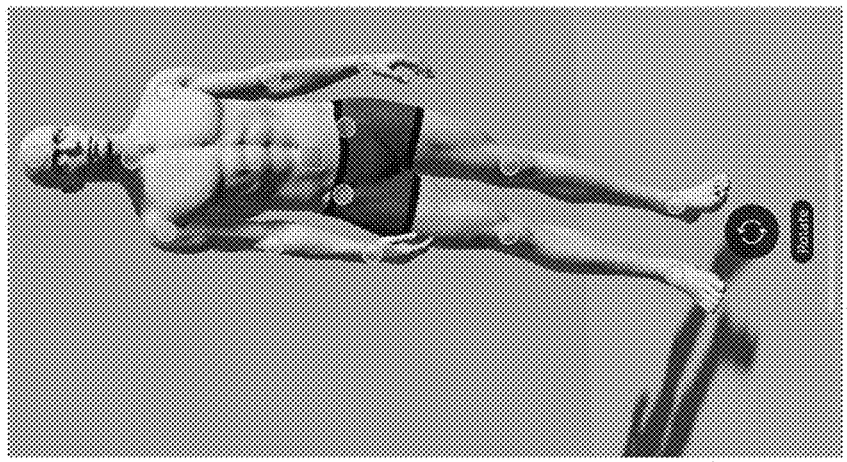
FIGS. 11A-11C are a series of screenshots showing how dragging a selected pelvic control point right and left moves the entire body as a single unit.
Figure 11B:
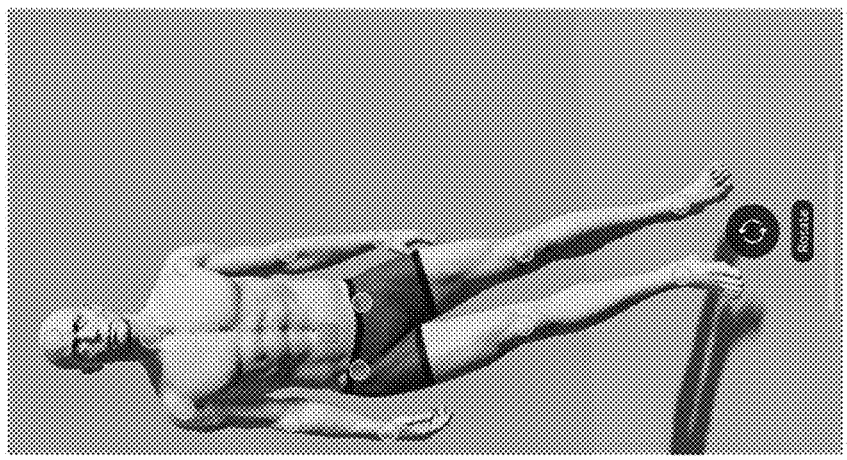
Figure 11A:
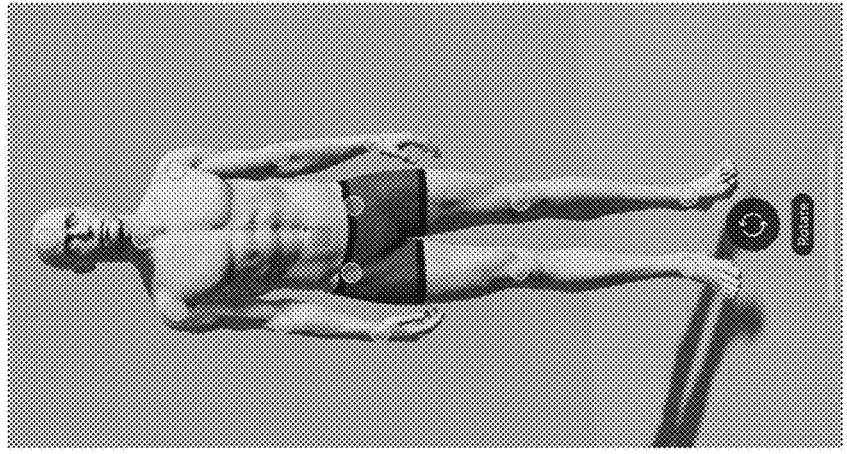
Figure 11D:
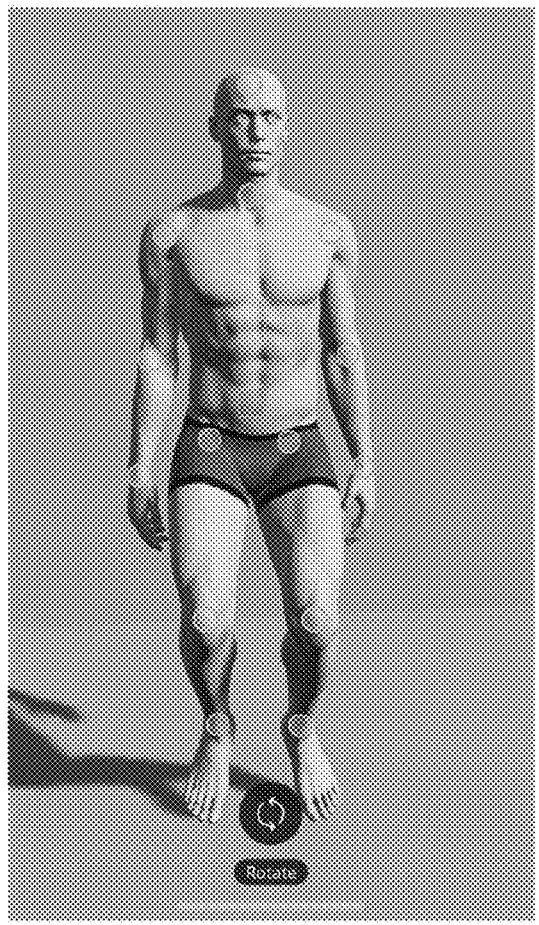
FIGS. 11D and 11E are screenshots showing how, as a pelvic control point is dragged down, the model reduces the distance between the pelvis and the ankles which causes the character to bend at the hip and knees as if beginning to sit down.
Figure 11E:
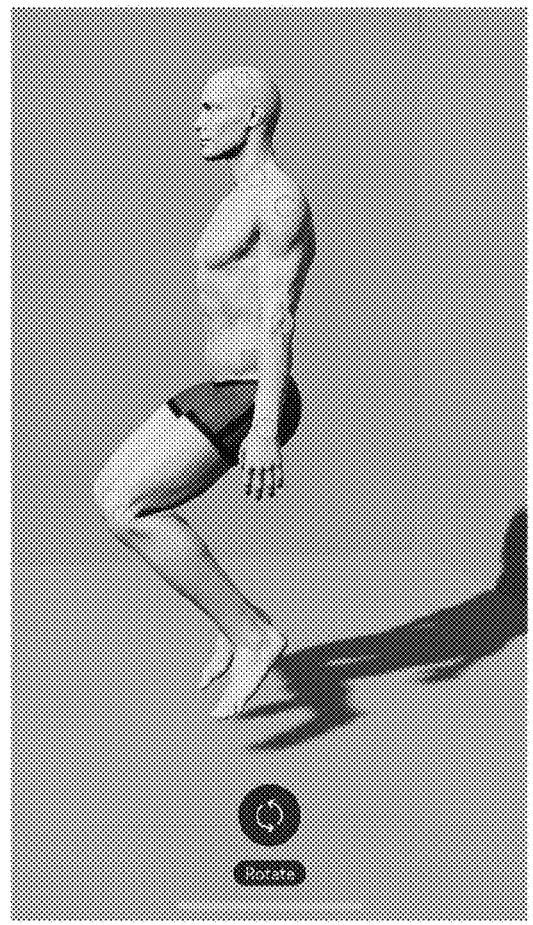

Similar to manipulating the waist control point, the pelvis control point (the bottom of the three square control points) can be dragged and rotated as well to produce consistent motion/positioning of the character's body. As shown in FIG. 11A, an initially posed character has had its pelvic control point selected. When the pelvic control point is dragged, the entire character is moved while satisfying these two constraints: 1) the feet stay in their original positions as much as possible, and 2) the pose of the entire upper body stays the same. As shown in FIGS. 11B and 11C, movements of the pelvic control point to the character's right and left, respectively, cause the character's hips, and legs to move while the feet stay as closely as possible to their original positions and the upper body keeps its original pose. As shown in FIGS. 11D and 11E, by dragging the pelvic control point down, the model reduces the distance between the pelvis and the ankles which causes the character to bend at the hips and knees as if beginning to sit down. The feet of the character stay as closely as possible to their original positions and the upper body keeps its original pose. Dragging the pelvic control point upward extends the distance from the ankles to the pelvis and re-straightens the knees so that the character returns to an upright standing position as in FIG. 11A. The feet of the character stay as closely as possible to their original positions and the upper body keeps its original pose.

Figure 12C:
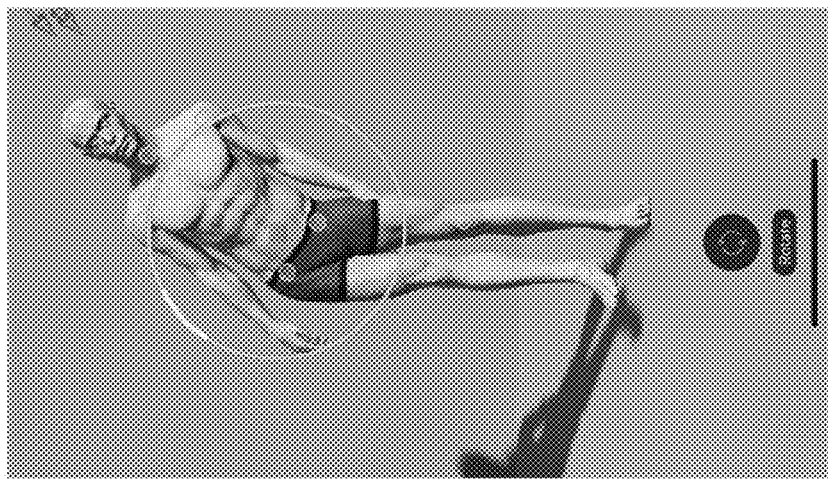
FIGS. 12A-12C are a series of screenshots showing how rotation about the pelvic control point in a first direction causes a character to lean left and right.
Figure 12B:
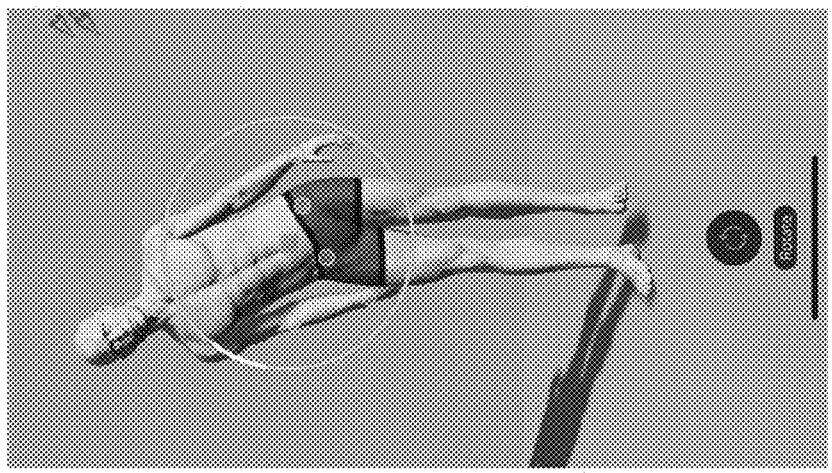
Figure 12A:
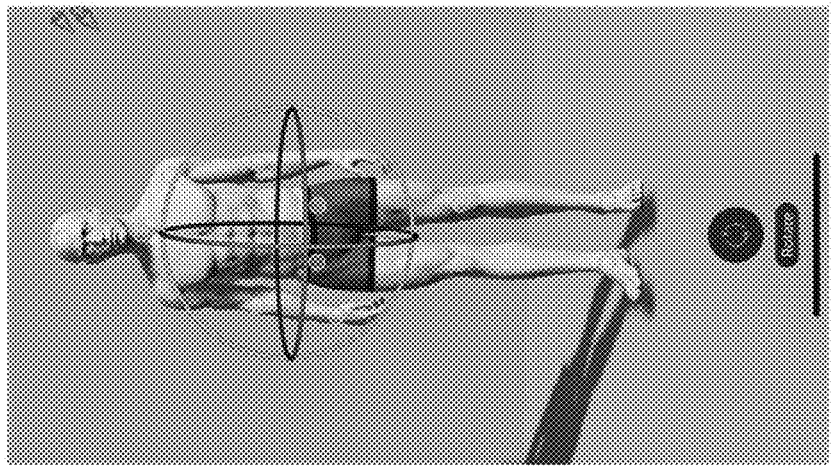
Figure 12D:
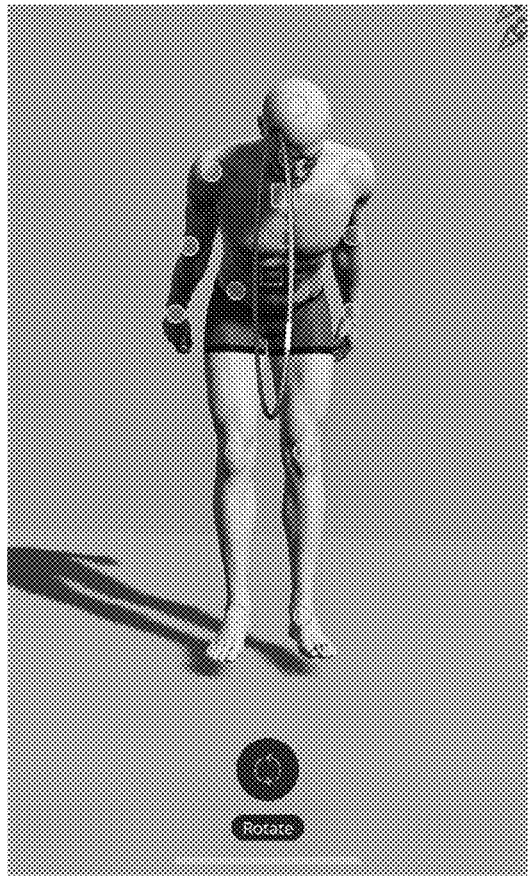
FIGS. 12D and 12E are a pair of screenshots showing how rotation about the pelvic control point in a second direction causes a character to lean forward and backward.
Figure 12E:
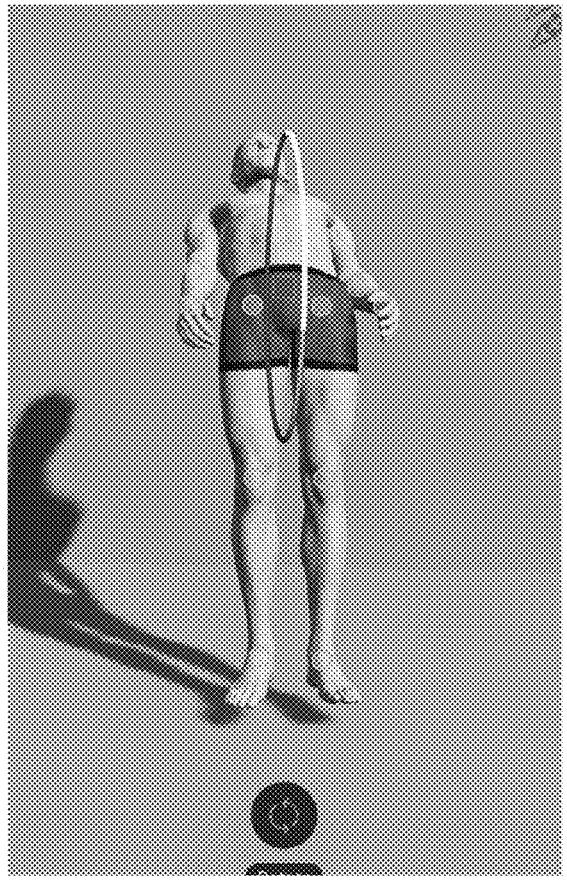
Figure 12F:
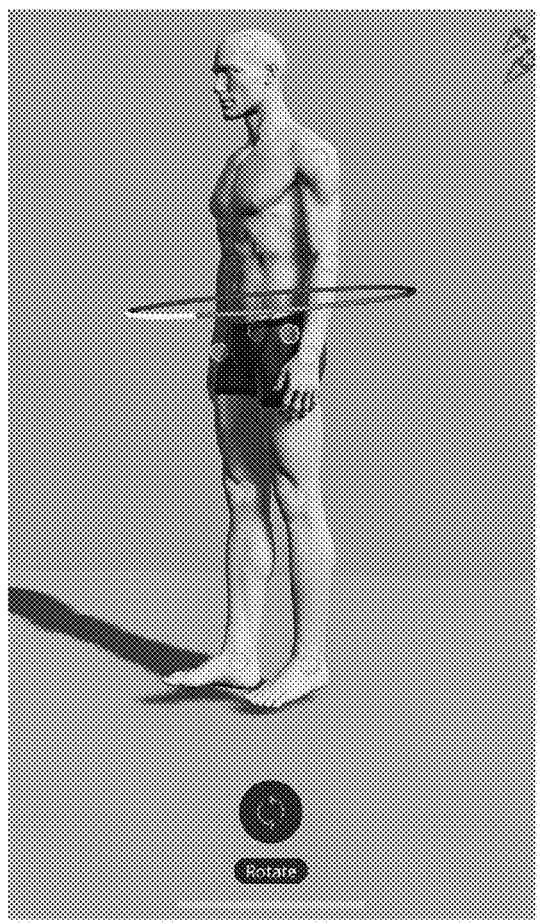
FIGS. 12F and 12G are a pair of screenshots showing how rotation about the pelvic control point in a third direction causes a character to rotate left and right.
Figure 12G:
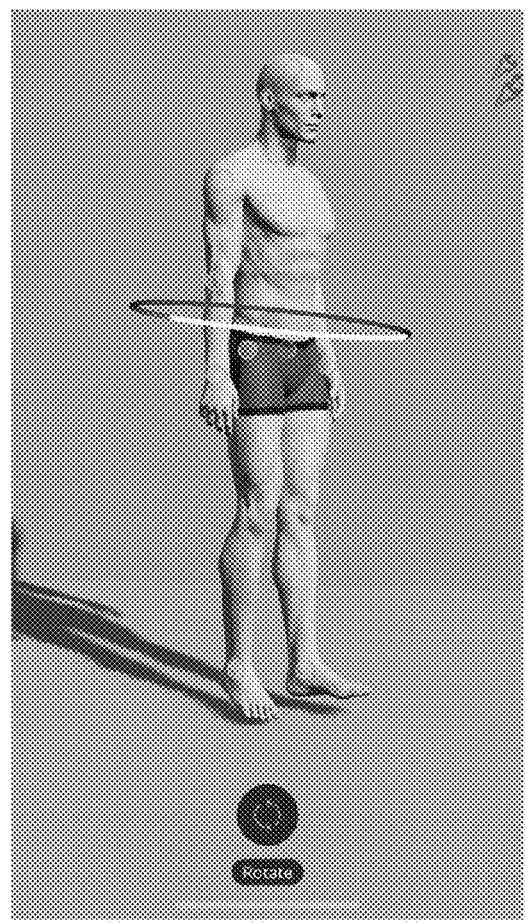
Figure 12H:
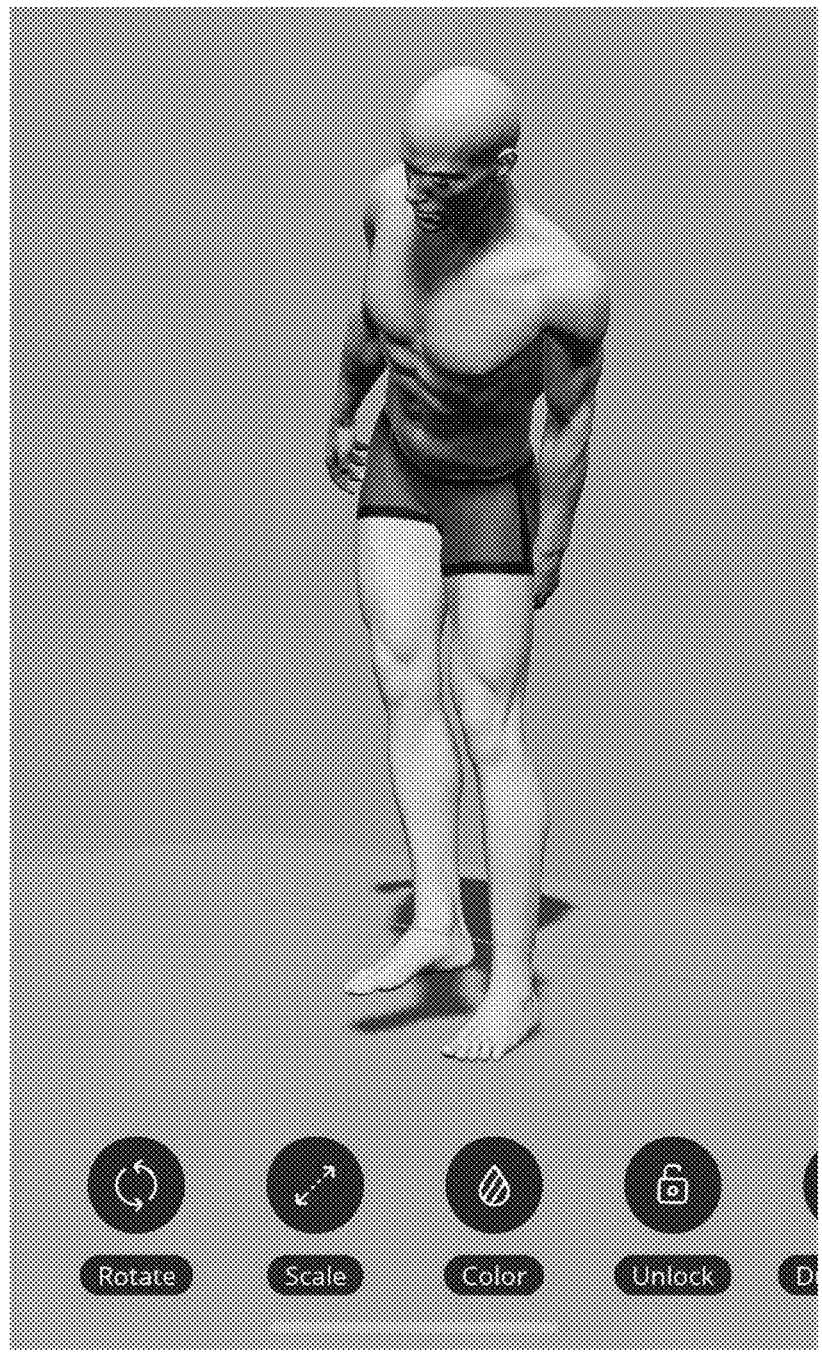
FIG. 12H is a screenshot showing the effect of rotations in multiple directions using the same pelvic control point.

In addition to being able to drag the pelvic control point, the pelvic control point can be used for rotational movement as well (by selecting the Rotate option at the lower portion of the user interface). An initially posed character shown in FIG. 12A has its pelvic control point selected and the Rotate option selected such that a set of three loops are shown indicating the rotational directions for the pelvic control point. When the pelvic control point is rotated, the entire character rotates by the same amount while keeping the feet in their original positions as much as possible. FIGS. 12B and 12C are a series of screenshots showing how rotation about the pelvic control point in a first direction causes a character to lean left and right while the feet stay as closely as possible to their original positions. FIGS. 12D and 12E show how rotation about the pelvic control point in a second direction causes a character to lean forward and backward while the feet stay as closely as possible to their original positions. FIGS. 12F and 12G show how rotation about the pelvic control point in a third direction causes a character to rotate left and right while the feet stay as closely as possible to their original positions. FIG. 12H shows the effect of rotations in multiple directions using the same pelvic control point while the feet stay as closely as possible to their original positions.

As discussed above with respect to FIGS. 5C-5F, in one embodiment, a character's hand can be positioned using preset hand configurations by selecting a wrist control point and then selecting a Presets option (as shown in FIG. 13A) (that is made available through a context sensitive menu and directed to hand presets). However, in an alternate embodiment, instead of or in addition to using preset hand configurations, a character's hand is set manually, with the ability to set finger positions on a finger-by-finger basis and a joint-by-joint basis. The direction of the fingers and hand (e.g., palm up or palm down) is separately controlled by at least one of the wrist control point, the elbow control point, and the shoulder control point which can be rotated to control the orientation of the hand as a whole.

Figure 13B:
FIG. 13B is a screenshot of a fingers control user interface including the ability to select any of the fingers of the selected hand (i.e., thumb, index, middle, ring and pinky), to select control points for the selected finger, and to curl the selected finger by manipulating a slider interface, such as to curl the ring finger to 14 percent of a closed first pose.

In a configuration supporting manual control of fingers, when the wrist control point for a character's hand is selected, a Hand option is presented to an artist (e.g., along with other options at the bottom of the user interface) as is shown in FIG. 13A. Upon selecting the Hand option, one or more sub-controls are presented to an artist, such as in the Fingers control user interface shown in FIG. 13B. As shown therein, the Fingers control user interface includes the ability to select any of the fingers of the selected hand (i.e., thumb, index, middle, ring and pinky). Each of the control points for the selected finger are then displayed on the user interface, and the control points of the non-selected fingers are hidden to reduce cluttering of the user interface. For example, FIG. 13B shows the 4 control points for the selected ring finger, but the control points of all the other fingers (i.e., pinky, middle, index, and thumb) of the same hand are hidden. A similar set of user interfaces can be provided for controlling the toes on a toe-by-toe basis. In general, for each appendage (e.g., hands and feet in humans, but including animal appendages such as hooves in animals), digit-by-digit control points can be provided for all of the joints of the modeled appendage.

Figure 13C:
FIG. 13C is a screenshot of the interface of FIG. 13B where the curl of the ring finger has been increased to 44 percent of a closed first pose.

The fingers control interface may additionally have the multi-control point controlling interface such as a slider bar or text entry portion that enables multiple control points to be modified at once. For example, as shown in FIG. 13B, a curl slider bar (and text entry box) are provided to the artist to allow the artist to curl the selected finger by simply manipulating the slider interface. FIG. 13C shows the result of curling the ring finger from 14 percent curled in FIG. 13B to 44 percent curled (while a middle finger and an index finger have a 0 percent curl). Using the curl slider to curl the finger is an application of a partial percentage-based preset pose applied to a finger. The start pose is a straight finger or the current pose of the finger. The target pose is the curled finger as in a fist. When a user drags on the curl slider to set the percentage of curling or enters the percentage of curling in the text entry, the pose of the finger is interpolated between the start pose and the target pose. As such, a finger (e.g., a ring finger) in its start pose with respect to a known straight finger is a completely straight finger when its curl percentage is 0%. By contrast, when its curl percentage is set to 100%, the finger is in the position it would be in for a closed fist. When the curl slider is set at 50%, the pose of the finger is interpolated as halfway between a straight finger and a completely curled finger.

Figure 13D:
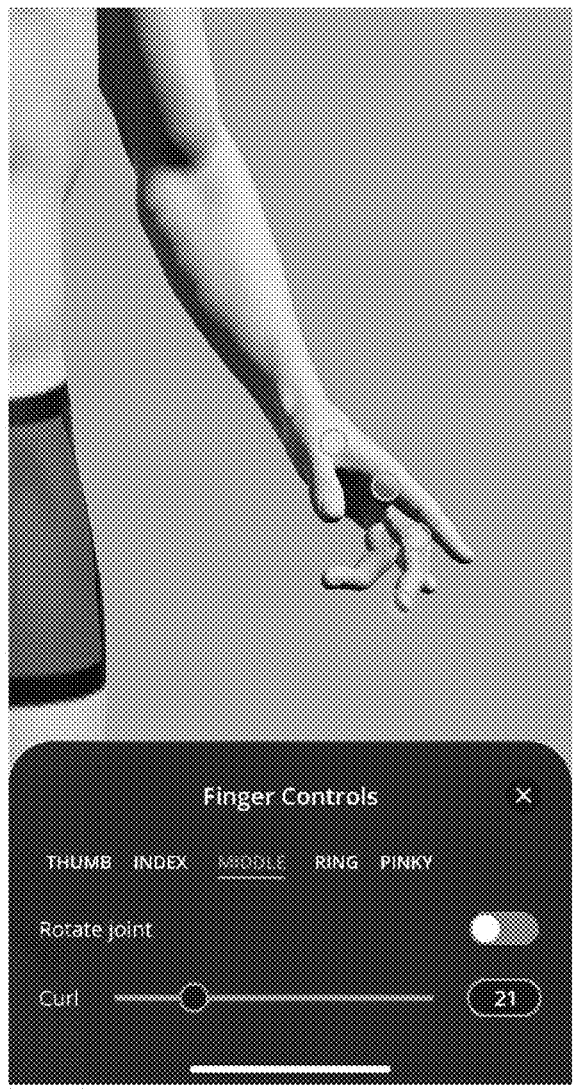
FIG. 13D is a screenshot showing the result of switching from having the ring finger selected to having the middle finger selected and having changed from a middle finger with 0 percent curl to 21 percent curl.
Figure 13E:
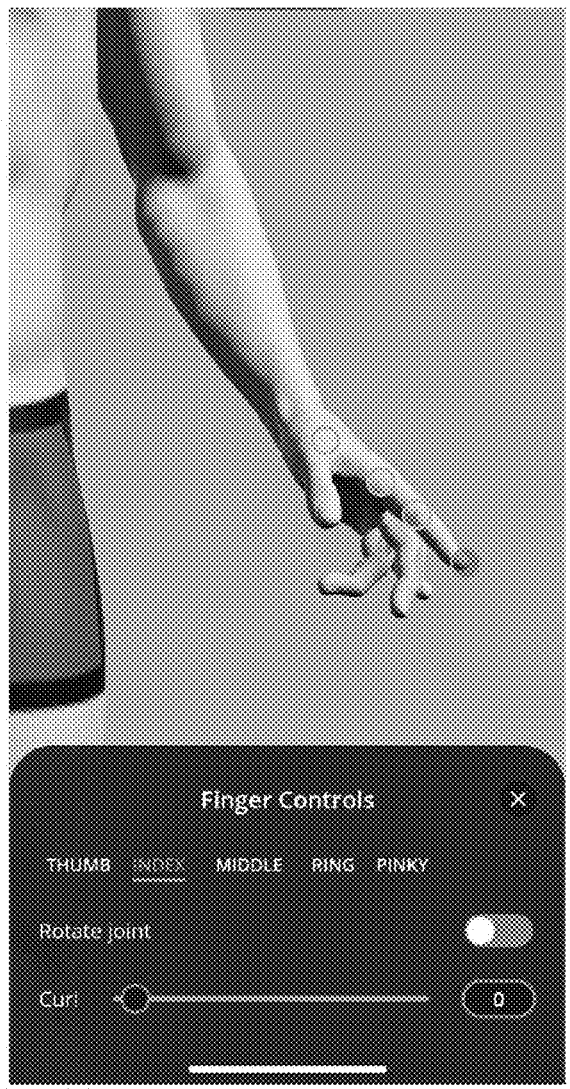
FIG. 13E is a screenshot showing the result of switching from having the middle finger selected to having the index finger selected and selecting to use a first knuckle control point of the index finger for more free-form manipulation.
Figure 13F:
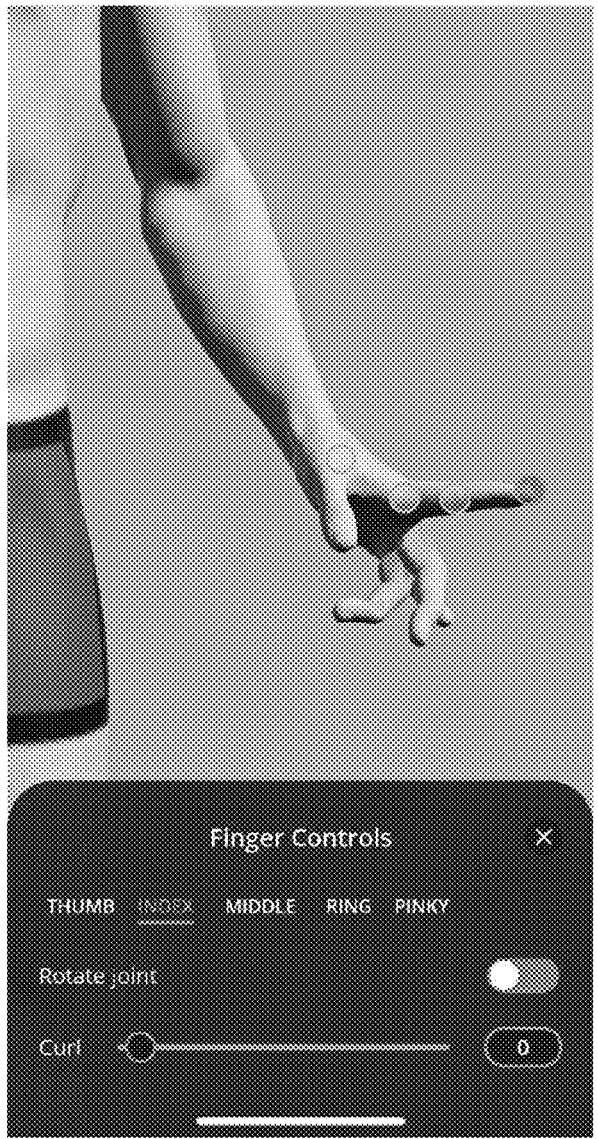
FIG. 13F is a screenshot showing a first result of using a first knuckle control point of the index finger to automatically pose all of the bones in the index finger using a single drag operation in a manner not possible with the curl function.
Figure 13G:
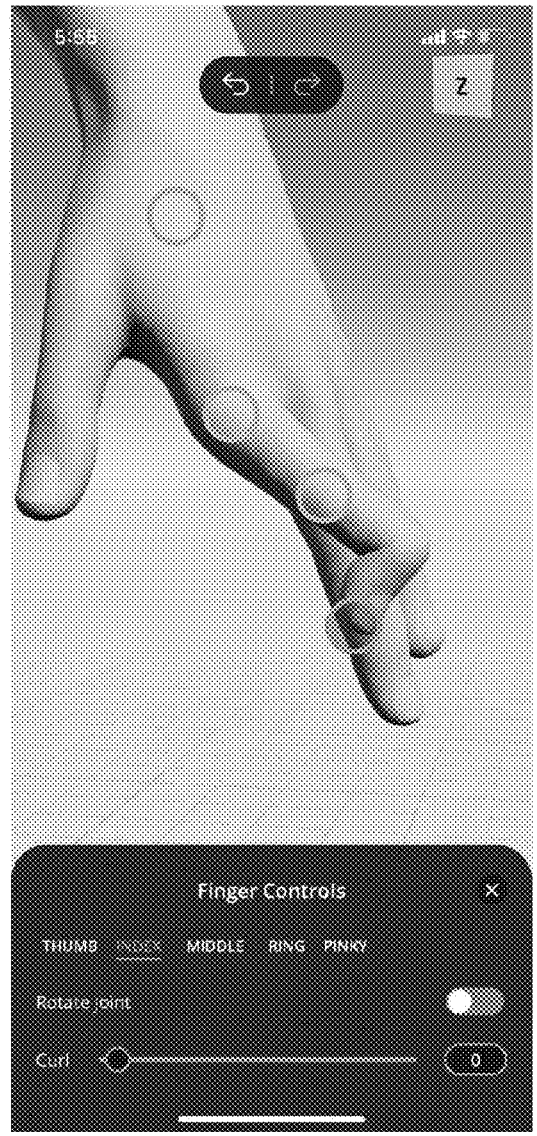
FIG. 13G is a screenshot showing a second result of using a first knuckle control point of the index finger to automatically pose all of the bones in the index finger using a single drag operation in a manner not possible with the curl function.

FIG. 13D shows the result of switching from having the ring finger selected to having the middle finger selected and from having changed from a middle finger with 0 percent curl to 21 percent curl. FIG. 13E shows the result of switching from having the middle finger selected to having the index finger selected. In FIG. 13E, rather than using the curling function, the first knuckle control point of the index finger is selected for more free-form manipulation. Dragging any of the finger control points allows artists to pose the fingers more freely than utilizing the curling function. For example, as shown in FIG. 13F, a first knuckle control point of a left index finger was selected and dragged to more freely pose all of the bones in the index finger in a manner not possible with the curl function. FIG. 13G shows a second result also not possible using the curl function. During movement of the fingers, all of the connected bones in the selected finger move in synchronization, according to the inverse kinematics model. For example, a movement of a first knuckle of an index finger can cause movement in the second and third knuckles as well as the carpometacarpal joint of the index finger.

When the artist has finished manipulating the fingers, the finger specific menu options can be closed by selecting the close icon (e.g., the "x" in the upper right hand corner of the finger specific menu options).

In each of the interfaces of FIGS. 13B-13E, a toggle switch for "Rotate joint" is present to enable any of the selected finger joints to be rotated. With respect to rotating the metacarpophalangeal joints, the system provides three rotation directions for those joints. Moreover, all the joints in the fingers, that is, distal interphalangeal joints (the first knuckle or the joint closest to the fingertip), the proximal interphalangeal joints (the second knuckle or the joint in the middle of the finger), the metacarpophalangeal joints (the third knuckle or the joint at the base of the finger), and the carpometacarpal joint (the joints that connect the wrist to the five bones that comprise the middle part of the hand), are mapped one-to-one to the control points in the fingers. Allowing artists to rotate the carpometacarpal joints in one or two directions allows the first pose to look much more realistic because all the metacarpal bones (especially the metacarpal bones connecting to the thumb and the pinky) squeeze slightly together when making a fist.

Figure 14A:
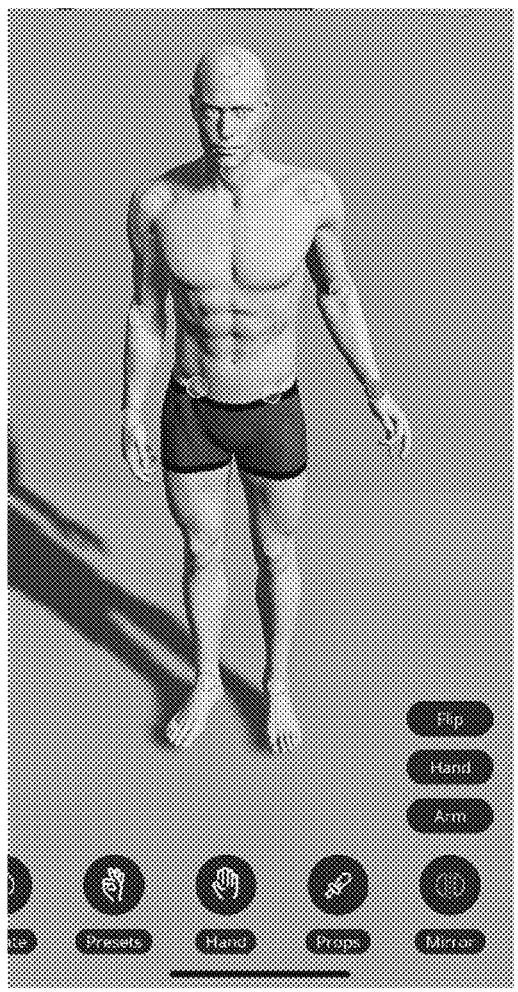
FIGS. 14A and 14B are screenshots showing a hand and arm configuration switching from the character's right side and the character's left side as a result of selecting the "Flip" option in the Mirror Menu.
Figure 14B:
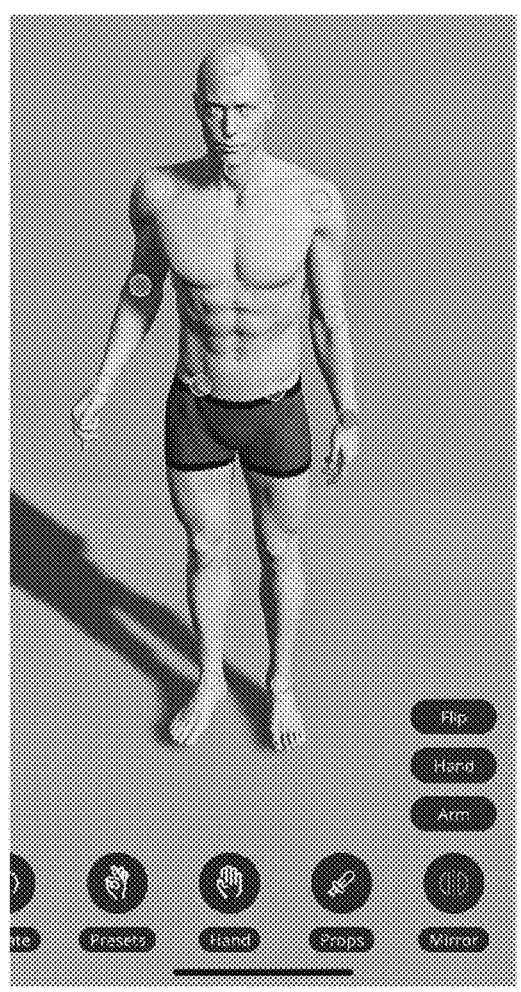
Figure 14C:
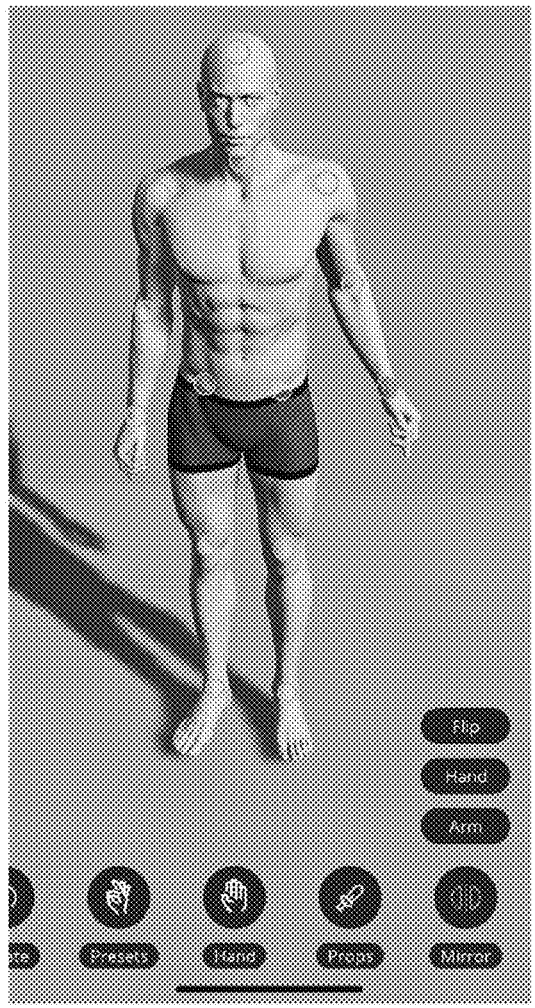
FIG. 14C is a screenshot of the result of using a Hand option of the Mirror Menu to create a mirror image of the selected hand on the opposite hand.
Figure 14D:
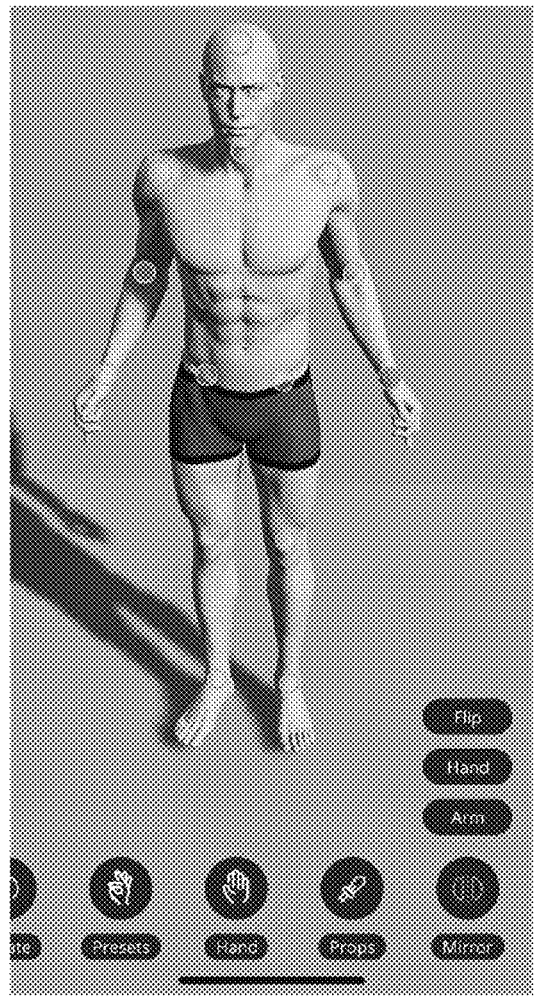
FIG. 14D is a screenshot showing the result of using an Arm option of the Mirror Menu to mirror an arm pose (without changing the pose of the hand) between arms.

As shown in FIG. 13A, when the wrist control point is selected on a character, one of the options provided to an artist is a Mirror option. Such an option can be used to pull up a series of sub-options, such as Flip, Hand, and Arm. The Flip sub-option causes the pose of the selected hand and arm to be switched with the opposite hand and arm as can be seen when comparing FIGS. 14A and 14B. Alternatively, the Hand sub-option of the Mirror option creates a mirror image of the selected hand on the opposite hand, as shown in FIG. 14C (without changing the pose of the arm). An arm position can likewise be mirrored using the Arm sub-option of the Mirror option (without changing the pose of the hand), and an exemplary result is shown in FIG. 14D.

The posing of feet is performed in the same manner as that of the hands, and the individual joints may be manipulated individually or in multi-control point groups (e.g., on a toe-by-toe basis). The feet and legs likewise may be mirrored or flipped.

In addition to the embodiments described above, additional embodiments are described in the following list.

(1) A computer graphics production control method including, but not limited to: receiving a computer model of a deformable character and modeling (1) a bone structure having plural bones and (2) skin, surrounding the bone structure, having plural skin regions such that skin regions of the plural skin regions are moved in relation to movements of respective bones of the plural bones; providing a user interface for receiving input from a user for controlling the deformable character using a set of control points, wherein the user interface includes at least one of (1) a set of multi-style control points with varying transparency as the set of control points, (2) multipoint head and neck controls, (3) a multiplicity of torso control points including a chest control point, a waist control point, and a pelvic control point, (4) camera rotation using locked objects, (5) an appendage posing control for displaying digit-by-digit control points, (6) a percentage-based preset pose interface, and (7) a flip pose interface for exchanging a first pose of at least one of a first limb and a first appendage from a first side of the deformable character with a second pose of at least one of a second limb and a second appendage from a second side of the deformable character opposite the first side; and displaying the deformable character in a computer graphics environment in response to the input received from the user using the user interface.

(2) The computer graphics production control method as in (1), further including, but not limited to: storing a static image based on the displayed deformable character displayed in response to the input received from the user using the user interface.

(3) The computer graphics production control method as in any one of (1) and (2), further including, but not limited to: storing a series of images as a digital movie based on the displayed deformable character displayed in response to the input received from the user using the user interface.

(4) The computer graphics production control method as in any one of (1)-(3), wherein providing the user interface including the set of multi-style control points includes, but is not limited to: determining a camera perspective of how the deformable character is being viewed by a camera; displaying first portions of the set of multi-style control points in a first style when the first portions are visible from the determined camera perspective; and displaying second portions of the set of multi-style control points in a second style when the second portions are occluded from the determined camera perspective.

(5) The computer graphics production control method as in (4), wherein the second style is more faded than the first style.

(6) The computer graphics production control method as in (5), wherein an amount of fade used to display the second portions varies based on a function of a ray from the camera to the second portions, respectively.

(7) The computer graphics production control method as in (5), wherein an amount of fade used to display the second portions varies based on distances from the camera to the second portions, respectively.

(8) The computer graphics production control method as in (5), wherein an amount of fade used to display the second portions varies based on (a) a function of a ray from the camera to the second portions, respectively and (b) distances from the camera to the second portions, respectively.

(9) The computer graphics production control method as in (5), wherein an amount of fade used to display the second portions varies based on a difference between (a) a function of a ray from the camera to the second portions, respectively and (b) distances from the camera to the second portions, respectively.

(10) The computer graphics production control method as in (5), wherein an amount of fade used to display the second portions varies based on a number of times a ray from the camera to the second portions, respectively, passes through the deformable character.

(11) The computer graphics production control method as in any one of (1)-(10), wherein the plural bones for modeling the deformable character include (1) a first set of bones forming an entirety of a neck and (2) a second set of bones connected to an atlanto-occipital joint, and wherein providing the user interface including the multipoint head and neck controls includes but is not limited to: providing a neck control point for rotationally controlling the first set of bones, and providing, separate from the neck control point, a head control point for controlling the second set of bones when rotated and controlling the first set of bones when dragged.

(12) The computer graphics production control method as in any one of (1)-(11), wherein the plural bones for modeling the deformable character include (1) a first set of bones forming an entirety of a chest, (2) a second set of bones forming an entirety of a waist, and (3) a third set of bones forming a pelvis, wherein providing the user interface including the multiplicity of torso control points includes, but is not limited to: providing a chest control point for controlling the first set of bones, providing, separate from the chest control point, a waist control point for controlling the second set of bones, and providing, separate from the chest and waist control points, a pelvic control point for controlling the third set of bones.

(13) The computer graphics production control method as in any one of (1)-(12), wherein providing the user interface including camera rotation using locked objects includes, but is not limited to: receiving from the user an input indicating that a portion of a computer graphics scene has been locked in place; receiving from the user a drag operation (a) starting at a start point within the computer graphics scene and (b) ending at an end point in the computer graphics scene; determining if the start point is within the portion of the computer graphics scene that has been locked in place; moving an object at the start point in the computer graphics scene to the end point in the computer graphics scene if the determining has determined that the start point is within the object and is not within the portion of the computer graphics scene that has been locked in place; and rotating the camera based on a distance between the start and end point if the determining has determined that the start point is within the portion of the computer graphics scene that has been locked in place.

(14) The computer graphics production control method as in (13), wherein receiving from the user an input indicating that a portion of the computer graphics scene has been locked in place comprises receiving from the user an input indicating an object has been locked in place.

(15) The computer graphics production control method as in any one of (1)-(14), further including, but not limited to, receiving a first user input indicating that digit-by-digit control of digit-specific control points of a selected appendage should be displayed to a user, wherein providing the user interface including the appendage posing control for displaying digit-by-digit control points comprises providing an interface for selecting which digit of the selected appendage is to be posed, wherein the method further includes, but is not limited to: receiving a second user input selecting which digit of the selected appendage is to be posed; hiding control points of the set of control points that do not correspond to the selected digit; displaying control points of the set of control points that correspond to the selected digit; and receiving a third input for controlling the control points of the set of control points that correspond to the selected digit.

(16) The computer graphics production control method as in (15), wherein receiving the third input for controlling the control points of the set of control points that correspond to the selected digit includes, but is not limited to: providing a percentage interface for controlling the control points of the set of control points that correspond to the selected digit; and receiving as the third input a change in the percentage interface, wherein displaying the deformable character in the computer graphics environment in response to the input received from the user using the user interface comprises displaying the selected digit move in response to the third input.

(17) The computer graphics production control method as in (15), wherein receiving the third input for controlling the control points of the set of control points that correspond to the selected digit include, but is not limited to: providing a slider bar including a slider as a percentage interface for controlling the control points of the set of control points that correspond to the selected digit; and receiving as the third input a drag operation to set a position of the slider on the slider bar, wherein displaying the deformable character in the computer graphics environment in response to the input received from the user using the user interface comprises displaying the selected digit move in response to the drag operation.

(18) The computer graphics production control method as in (15), wherein receiving the third input for controlling the control points of the set of control points that correspond to the selected digit includes, but is not limited to: receiving as the third input a drag operation to set a position of one of the control points of the set of control points that correspond to the selected digit, wherein displaying the deformable character in the computer graphics environment in response to the input received from the user using the user interface comprises displaying the selected digit move in response to the drag operation.

(19) The computer graphics production control method as in any one of (1)-(18), wherein providing the user interface including the percentage-based preset pose interface includes, but is not limited to: providing visual representation of a set of percentage-based preset poses that can be selected by the user to be applied to a first set of bones of the plural bones of the deformable character; and providing a percentage interface for selecting a percentage for controlling positions of the first set of bones of the plural bones of the deformable character; wherein the method further includes, but is not limited to: receiving a selection of a percentage-based preset pose of the set of percentage-based preset poses, receiving from the percentage interface the selected percentage for controlling positions of the first set of bones of the plural bones of the deformable character, applying to the first set of bones of the plural bones the selected percentage-based preset pose of the set of percentage-based preset poses based on the selected percentage for controlling positions of the first set of bones of the plural bones of the deformable character, and displaying the deformable character in the computer graphics environment in response to the applying to the first set of bones the selected percentage-based preset pose of the set of percentage-based preset poses based on the selected percentage for controlling positions of the first set of bones of the plural bones of the deformable character.

(20) The computer graphics production control method as in (19), wherein the percentage interface comprises a slider bar including a slider for selecting the selected percentage.

(21) The computer graphics production control method as in (19), wherein the percentage interface comprises textual interface for at least one of selecting and displaying the selected percentage.

(22) The computer graphics production control method as in any one of (1)-(21), further including, but not limited to: displaying in the computer graphics environment along with the deformable character at least one of props, lights, a perspective grid, and a sky.

(23) The computer graphics production control method as in any one of (1)-(22), further including, but not limited to: storing in a 3D file format, at least one of objects, scenes, scene components, and animations.

(24) The computer graphics production control method as in any one of (1)-(23), wherein providing the flip pose interface for exchanging the first pose of at least one of the first limb and the first appendage with the second pose of at least one of the second limb and the second appendage comprises an arm and hand pose interface for exchanging (1) a first pose of the first side of a first arm and a first hand and (2) a second pose of the second side of a second arm and a second hand.

(25) The computer graphics production control method as in any one of (1)-(23), wherein providing the flip pose interface for exchanging the first pose of at least one of the first limb and the first appendage with the second pose of at least one of the second limb and the second appendage comprises an arm and hand pose interface for exchanging together (1) poses of the first side of a first arm and a first hand and (2) poses of the second side of a second arm and a second hand.

(26) The computer graphics production control method as in any one of (1)-(23), wherein providing the flip pose interface for exchanging the first pose of at least one of the first limb and the first appendage with the second pose of at least one of the second limb and the second appendage comprises leg and foot pose interface for exchanging (1) a first pose of the first side of a first leg and a first foot and (2) a second pose of the second side of a second leg and a second foot.

(27) The computer graphics production control method as in any one of (1)-(23), wherein providing the flip pose interface for exchanging the first pose of at least one of the first limb and the first appendage with the second pose of at least one of the second limb and the second appendage comprises leg and foot pose interface for exchanging together (1) poses of the first side of a first leg and a first foot and (2) poses of the second side of a second leg and a second foot.

(28) The computer graphics production control method as in any one of (1)-(23), wherein providing the flip pose interface for exchanging the first pose of at least one of the first limb and the first appendage with the second pose of at least one of the second limb and the second appendage comprises an arm pose interface for exchanging (1) a first pose of a first arm of the first side and (2) a second pose of a second arm of the second side without exchanging a third pose of a first hand of the first side and a fourth pose of a second hand of the second side.

(29) The computer graphics production control method as in any one of (1)-(23), wherein providing the flip pose interface for exchanging the first pose of at least one of the first limb and the first appendage with the second pose of at least one of the second limb and the second appendage comprises a leg pose interface for exchanging (1) a first pose of a first leg of the first side and (2) a second pose of a second leg of the second side without exchanging a third pose of a first foot of the first side and a fourth pose of a second foot of the second side.

(30) The computer graphics production control method as in any one of (1)-(23), wherein providing the flip pose interface for exchanging the first pose of at least one of the first limb and the first appendage with the second pose of at least one of the second limb and the second appendage comprises a hand pose interface for exchanging (1) a first pose of a first hand of the first side and (2) a second pose of a second hand of the second side without exchanging a third pose of a first arm of the first side and a fourth pose of a second arm of the second side.

(31) The computer graphics production control method as in any one of (1)-(23), wherein providing the flip pose interface for exchanging the first pose of at least one of the first limb and the first appendage with the second pose of at least one of the second limb and the second appendage comprises a foot pose interface for exchanging (1) a first pose of a first foot of the first side and (2) a second pose of a second foot of the second side without exchanging a third pose of a first leg of the first side and a fourth pose of a second leg of the second side.

(32) A computer graphics production control method including, but not limited to: receiving a computer model of a computer graphics scene; receiving from the user an input indicating that a portion of the computer graphics scene has been locked in place; receiving from the user a drag operation (a) starting at a start point within the computer graphics scene and (b) ending at an end point in the computer graphics scene; determining if the start point is within the portion of the computer graphics scene that has been locked in place; moving an object at the start point in the computer graphics scene to the end point in the computer graphics scene if the determining has determined that the start point is within the object and is not within the portion of the computer graphics scene that has been locked in place; and rotating the camera based on a distance between the start and end point if the determining has determined that the start point is within the portion of the computer graphics scene that has been locked in place; and displaying a computer graphics environment in response to the input received from the user using the user interface.

(33) A computer graphics production control method including, but not limited to: receiving a computer model of a computer graphics scene including a plurality of objects; providing a user interface including a set of multi-style control points for controlling the plurality of objects by:
(a) determining a camera perspective of how the plurality of objects are being viewed by a camera; displaying first portions of the set of multi-style control points in a first style when the first portions are visible from the determined camera perspective; and displaying second portions of the set of multi-style control points in a second style when the second portions are occluded from the determined camera perspective.

(34) The computer graphics production control method as in (33), wherein the objects are bones of a deformable character.

(35) The computer graphics production control method as in any one of (33)-(34), wherein the second style is more faded than the first style.

(36) The computer graphics production control method as in any one of (33)-(34), wherein an amount of fade used to display the second portions varies based a function of a ray from the camera to the second portions, respectively.

(37) The computer graphics production control method as in any one of (33)-(34), wherein an amount of fade used to display the second portions varies based on distances from the camera to the second portions, respectively.

(38) The computer graphics production control method as in any one of (33)-(34), wherein an amount of fade used to display the second portions varies based a number of times a ray from the camera to the second portions, respectively, passes through the object corresponding to the second portion.

(39) A computer graphics production control system including, but not limited to: a computer processor; and a computer memory accessible to the computer processor and configured to store computer processor instructions configured to, when executed by the computer processor, cause the computer graphics production control system to be configured to perform the methods of any one of (1)-(38).

(40) A computer program product including, but not limited to: a computer storage medium configured to store computer processor instructions configured to, when executed by a computer processor of a computer, cause the computer to be configured to perform the methods of any one of: (1)-(38).

While certain implementations have been described, these implementations have been presented by way of example only and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A computer graphics production control method comprising:
   receiving a computer model of a deformable character and modeling (1) a bone structure having plural bones and (2) skin, surrounding the bone structure, having plural skin regions such that skin regions of the plural skin regions are moved in relation to movements of respective bones of the plural bones;
   providing a user interface for receiving input from a user for controlling the deformable character using a set of control points for controlling the plural bones, wherein the user interface includes a set of multi-style control points with varying transparency when displayed as the set of control points; and
   displaying the deformable character in a computer graphics environment in response to the input received from the user using the user interface, wherein providing the user interface including the set of multi-style control points comprises:
   determining a camera perspective of how the deformable character is being viewed by a camera;
   displaying first portions of the set of multi-style control points in a first style when the first portions are visible from the determined camera perspective; and
   displaying second portions of the set of multi-style control points in a second style when the second portions are occluded from the determined camera perspective.

2. The computer graphics production control method as claimed in claim 1, further comprising:
   storing a static image based on the displayed deformable character displayed in response to the input received from the user using the user interface.

3. The computer graphics production control method as claimed in claim 1, further comprising:

storing a series of images as a digital movie based on the displayed deformable character displayed in response to the input received from the user using the user interface.

4. The computer graphics production control method as claimed in claim 1, wherein the second style is more faded than the first style.

5. The computer graphics production control method as claimed in claim 4, wherein an amount of fade used to display the second portions varies based on a function of a ray from the camera to the second portions, respectively.

6. The computer graphics production control method as claimed in claim 1,
wherein the plural bones for modeling the deformable character further include (1) a first set of bones forming an entirety of a chest, (2) a second set of bones forming an entirety of a waist, and (3) a third set of bones forming a pelvis,
wherein providing the user interface further includes providing a multiplicity of torso control points by:
providing a chest control point for controlling the first set of bones,
providing, separate from the chest control point, a waist control point for controlling the second set of bones, and
providing, separate from the chest and waist control points, a pelvic control point for controlling the third set of bones.

7. The computer graphics production control method as claimed in claim 1, further comprising providing an arm and hand pose interface for exchanging (1) a first pose of a first side of a first arm and a first hand and (2) a second pose of a second side of a second arm and a second hand.

8. The computer graphics production control method as claimed in claim 1, further comprising storing in a 3D file format a scene.

9. A computer graphics production control method comprising:
receiving a computer model of a deformable character and modeling (1) a bone structure having plural bones and (2) skin, surrounding the bone structure, having plural skin regions such that skin regions of the plural skin regions are moved in relation to movements of respective bones of the plural bones;
providing a user interface for receiving input from a user for controlling the deformable character using a set of control points for controlling the plural bones, wherein the user interface includes a draggable head control point for bending a neck of the plural bones and a rotatable neck control point, separate from the head control point, as the set of control points; and
displaying the deformable character in a computer graphics environment in response to the input received from the user using the user interface,
wherein the plural bones for modeling the deformable character include (1) a first set of bones forming an entirety of a neck and (2) a second set of bones connected to an atlanto-occipital joint, and
wherein providing the user interface including the draggable head control point for bending the neck of the plural bones and the rotatable neck control point comprises:
providing the neck control point for rotationally controlling the first set of bones, and
providing the head control point for controlling the second set of bones when rotated and controlling the first set of bones when dragged.

10. A computer graphics production control method comprising:
receiving a computer model of a deformable character and modeling (1) a bone structure having plural bones and (2) skin, surrounding the bone structure, having plural skin regions such that skin regions of the plural skin regions are moved in relation to movements of respective bones of the plural bones;
providing a user interface for receiving a first input from a user for controlling the deformable character using a set of control points for controlling the plural bones;
displaying the deformable character in a computer graphics environment in response to the input received from the user using the user interface; and
providing camera rotation using locked objects by:
receiving from the user a second input indicating that a portion of a computer graphics scene has been locked in place;
receiving from the user a drag operation (a) starting at a start point within the computer graphics scene and (b) ending at an end point in the computer graphics scene;
determining if the start point is within the portion of the computer graphics scene that has been locked in place;
moving an object at the start point in the computer graphics scene to the end point in the computer graphics scene if the determining has determined that the start point is within the object and is not within the portion of the computer graphics scene that has been locked in place; and
rotating the camera based on a distance between the start and end point if the determining has determined that the start point is within the portion of the computer graphics scene that has been locked in place.

11. The computer graphics production control method as claimed in claim 10, wherein receiving from the user the second input indicating that the portion of the computer graphics scene has been locked in place comprises receiving from the user an input indicating an object has been locked in place.

12. A computer graphics production control method comprising:
receiving a computer model of a deformable character and modeling (1) a bone structure having plural bones and (2) skin, surrounding the bone structure, having plural skin regions such that skin regions of the plural skin regions are moved in relation to movements of respective bones of the plural bones;
providing a user interface for receiving an input from a user for controlling the deformable character using a set of control points for controlling the plural bones;
displaying the deformable character in a computer graphics environment in response to the input received from the user using the user interface; and
receiving a first user input indicating that digit-by-digit control of digit-specific control points of a selected appendage should be displayed to the user,
wherein providing the user interface comprises providing an appendage posing control for displaying digit-by-digit control points and for selecting which digit of the selected appendage is to be posed,
wherein the method further comprises:
receiving a second user input selecting which digit of the selected appendage is to be posed;
hiding control points of the set of control points that do not correspond to the selected digit;

displaying control points of the set of control points that correspond to the selected digit;

receiving a third user input for controlling the control points of the set of control points that correspond to the selected digit.

13. The computer graphics production control method as claimed in claim 12, wherein receiving the third user input for controlling the control points of the set of control points that correspond to the selected digit comprises:

providing a percentage interface for controlling the control points of the set of control points that correspond to the selected digit;

receiving as the third input a change in the percentage interface, and displaying the selected digit move in response to the third user input.

14. The computer graphics production control method as claimed in claim 12, wherein receiving the third user input for controlling the control points of the set of control points that correspond to the selected digit comprises:

providing a slider bar including a slider as a percentage interface for controlling the control points of the set of control points that correspond to the selected digit;

receiving as the third user input a drag operation to set a position of the slider on the slider bar, and displaying the selected digit move in response to the drag operation.

15. The computer graphics production control method as claimed in claim 12, wherein receiving the third user input for controlling the control points of the set of control points that correspond to the selected digit comprises:

receiving as the third user input a drag operation to set a position of one of the control points of the set of control points that correspond to the selected digit, and displaying the selected digit move in response to the drag operation.

16. A computer graphics production control method comprising:

receiving a computer model of a deformable character and modeling (1) a bone structure having plural bones and (2) skin, surrounding the bone structure, having plural skin regions such that skin regions of the plural skin regions are moved in relation to movements of respective bones of the plural bones;

providing a user interface for receiving input from a user for controlling the deformable character using a set of control points for controlling the plural bones by providing the user interface with a percentage-based preset pose interface by:

providing visual representation of a set of percentage-based preset poses that can be selected by the user to be applied to a first set of bones of the plural bones of the deformable character; and providing a percentage interface for selecting a percentage for controlling positions of the first set of bones of the plural bones of the deformable character;

receiving a selection of a percentage-based preset pose of the set of percentage-based preset poses, receiving from the percentage interface the selected percentage for controlling positions of the first set of bones of the plural bones of the deformable character, applying to the first set of bones of the plural bones the selected percentage-based preset pose of the set of percentage-based preset poses based on the selected percentage for controlling positions of the first set of bones of the plural bones of the deformable character, and displaying the deformable character in the computer graphics environment in response to the applying to the first set of bones the selected percentage-based preset pose of the set of percentage-based preset poses based on the selected percentage for controlling positions of the first set of bones of the plural bones of the deformable character.

17. The computer graphics production control method as claimed in claim 16, wherein the percentage interface comprises a slider bar including a slider for selecting the selected percentage.

18. A computer graphics production control system comprising:

a computer processor;

a computer memory accessible to the computer processor and configured to store computer processor instructions configured to, when executed by the computer processor, cause the computer graphics production control system to be configured to:

receive a computer model of a deformable character and modeling (1) a bone structure having plural bones and (2) skin, surrounding the bone structure, having plural skin regions such that skin regions of the plural skin regions are moved in relation to movements of respective bones of the plural bones;

provide a user interface for receiving input from a user for controlling the deformable character using a set of multi-style control points with varying transparency when displayed for controlling the plural bones by (a) determining a camera perspective of how the deformable character is being viewed by a camera, (b) displaying first portions of the set of multi-style control points in a first style when the first portions are visible from the determined camera perspective, and (c) displaying second portions of the set of multi-style control points in a second style when the second portions are occluded from the determined camera perspective; and display the deformable character in a computer graphics environment in response to the input received from the user using the user interface.

19. A computer program product comprising:

a non-transitory computer storage medium configured to store computer processor instructions configured to, when executed by a computer processor of a computer, cause the computer to be configured to:

receive a computer model of a deformable character and modeling (1) a bone structure having plural bones and (2) skin, surrounding the bone structure, having plural skin regions such that skin regions of the plural skin regions are moved in relation to movements of respective bones of the plural bones;

provide a user interface for receiving input from a user for controlling the deformable character using a set of multi-style control points with varying transparency when displayed for controlling the plural bones by (a) determining a camera perspective of how the deformable character is being viewed by a camera, (b) displaying first portions of the set of multi-style control points in a first style when the first portions are visible from the determined camera perspective, and (c) displaying second portions of the set of multi-style control points in a second style when the second portions are occluded from the determined camera perspective; and display the deformable character in a computer graphics environment in response to the input received from the user using the user interface.

\* \* \* \* \*